US012792334B2

(12) United States Patent
Wang et al.

(10) Patent No.: US 12,792,334 B2
(45) Date of Patent: Nov. 10, 2026

(54) METHOD FOR CONFIGURING OPERATING SYSTEM VENDOR COUNTRY, DEVICE, AND STORAGE MEDIUM

(71) Applicant: Honor Device Co., Ltd., Shenzhen (CN)

(72) Inventors: Yanzhao Wang, Shenzhen (CN); Chao Chen, Shenzhen (CN); Zenghui Zhang, Shenzhen (CN); Jiulin Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 527 days.

(21) Appl. No.: 18/039,151

(22) PCT Filed: May 20, 2022

(86) PCT No.: PCT/CN2022/094159

§ 371 (c)(1),
(2) Date: May 26, 2023

(87) PCT Pub. No.: WO2023/005371

PCT Pub. Date: Feb. 2, 2023

(65) Prior Publication Data

US 2024/0296035 A1 Sep. 5, 2024

(30) Foreign Application Priority Data

Jul. 30, 2021 (CN) ......................... 202110872082.9

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC ................................ G06F 8/65; G06F 9/4406
See application file for complete search history.

(56) References Cited

U.S. PATENT DOCUMENTS

2002/0184484 A1 12/2002 Abboud et al.
2016/0092207 A1* 3/2016 Chhatwal .................. G06F 8/65 717/121

(Continued)

FOREIGN PATENT DOCUMENTS

CN 103729210 A 4/2014
CN 107786729 A 3/2018

(Continued)

OTHER PUBLICATIONS

Ozga et al. “A practical approach for updating an integrity-enforced operating system.” Proceedings of the 21st International Middleware Conference. 2020. Retrieved from the Internet: URL<https://dl.acm.org/doi/pdf/10.1145/3423211.3425674> (Year: 2020).*

(Continued)

*Primary Examiner* — S. Sough
*Assistant Examiner* — Cheneca Smith
(74) *Attorney, Agent, or Firm* — Slater Matsil, LLP

(57) ABSTRACT

The method is applied to an electronic device; a memory of the electronic device includes at least a basic partition, a first static partition, and a second static partition; a first vendor country file is loaded when the electronic device starts from the first static partition, and a second vendor country file is loaded when the electronic device starts from the second static partition. The method includes: obtaining an operating system upgrade package that includes a third vendor country file; writing vendor country content of the third vendor country file into the second vendor country file; restarting to enter a recovery mode; restoring factory settings of the electronic device; and restarting, starting from the second static partition, creating a vendor country configuration file (Continued)

TO
FIG. 5A(2)

in the initialization step after a second restart, and writing vendor country content of the second vendor country file into the vendor country configuration file.

20 Claims, 27 Drawing Sheets

(56) References Cited

U.S. PATENT DOCUMENTS

| | | | | |
|---|---|---|---|---|
| 2018/0314832 | A1 | 11/2018 | Nunami et al. | |
| 2022/0019446 | A1* | 1/2022 | Maloney | G06F 40/30 |

FOREIGN PATENT DOCUMENTS

| | | | |
|---|---|---|---|
| CN | 107885535 | A | 4/2018 |
| CN | 110543321 | A | 12/2019 |
| WO | 2018032757 | A1 | 2/2018 |

OTHER PUBLICATIONS

Šoić et al. “How to upgrade an existing information system.” 2018 41st International Convention on Information and Communication Technology, Electronics and Microelectronics (MIPRO). IEEE, 2018. Retrieved from the Internet: URL <https://ieeexplore.ieee.org/stamp/stamp.jsp?tp=&arnumber=8400102> (Year: 2018).*

* cited by examiner

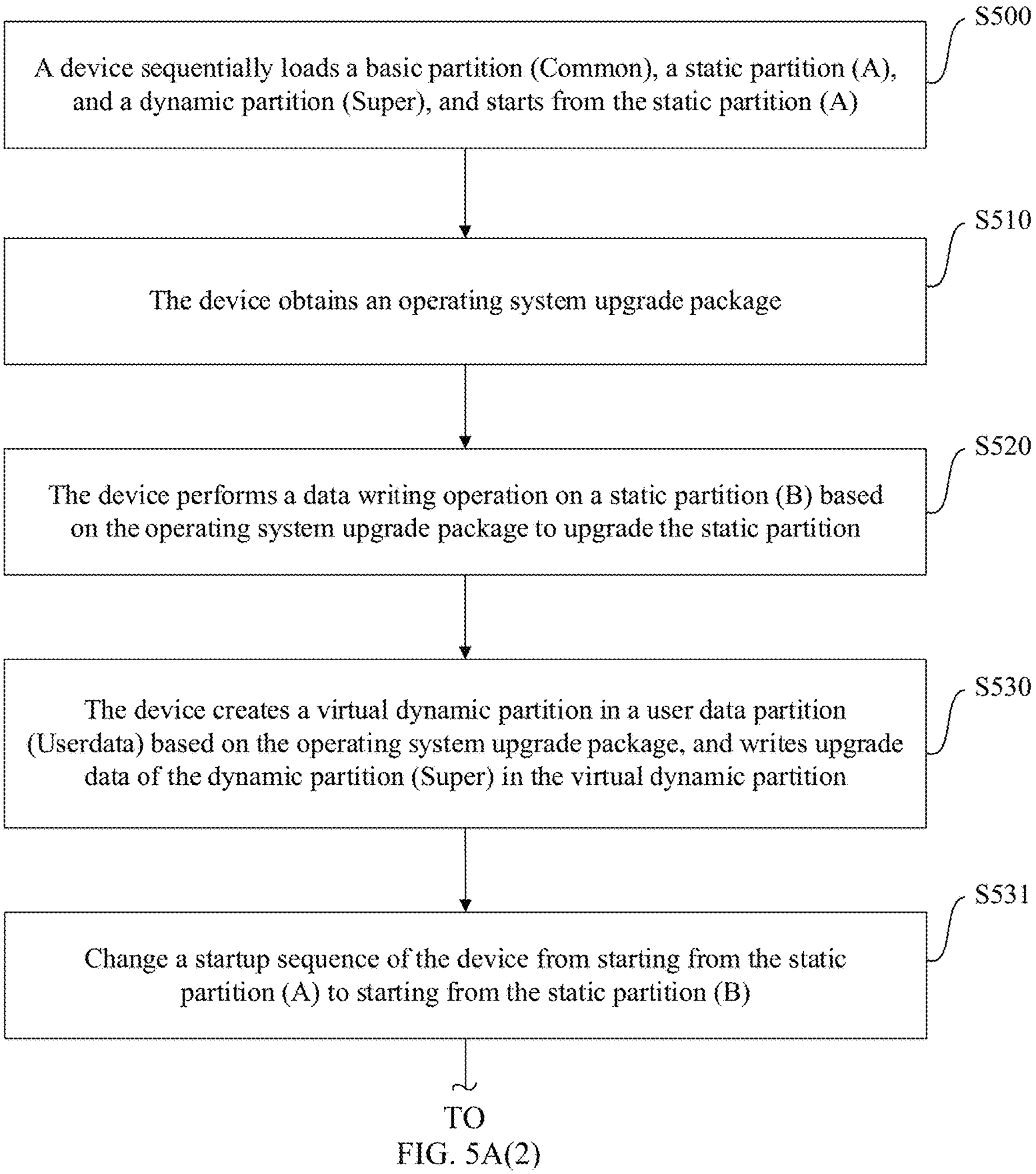
FIG. 5A(1)

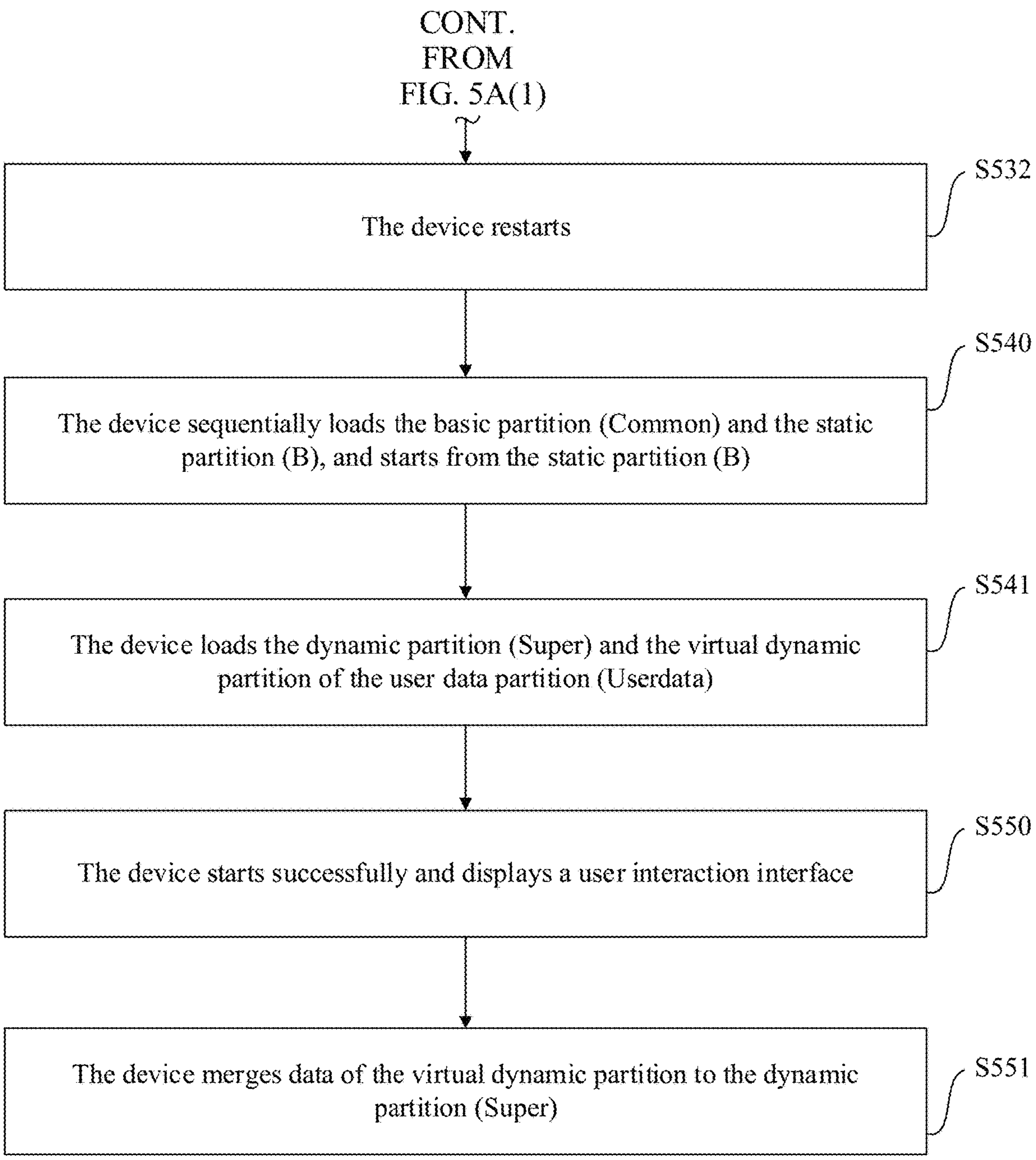
FIG. 5A(2)

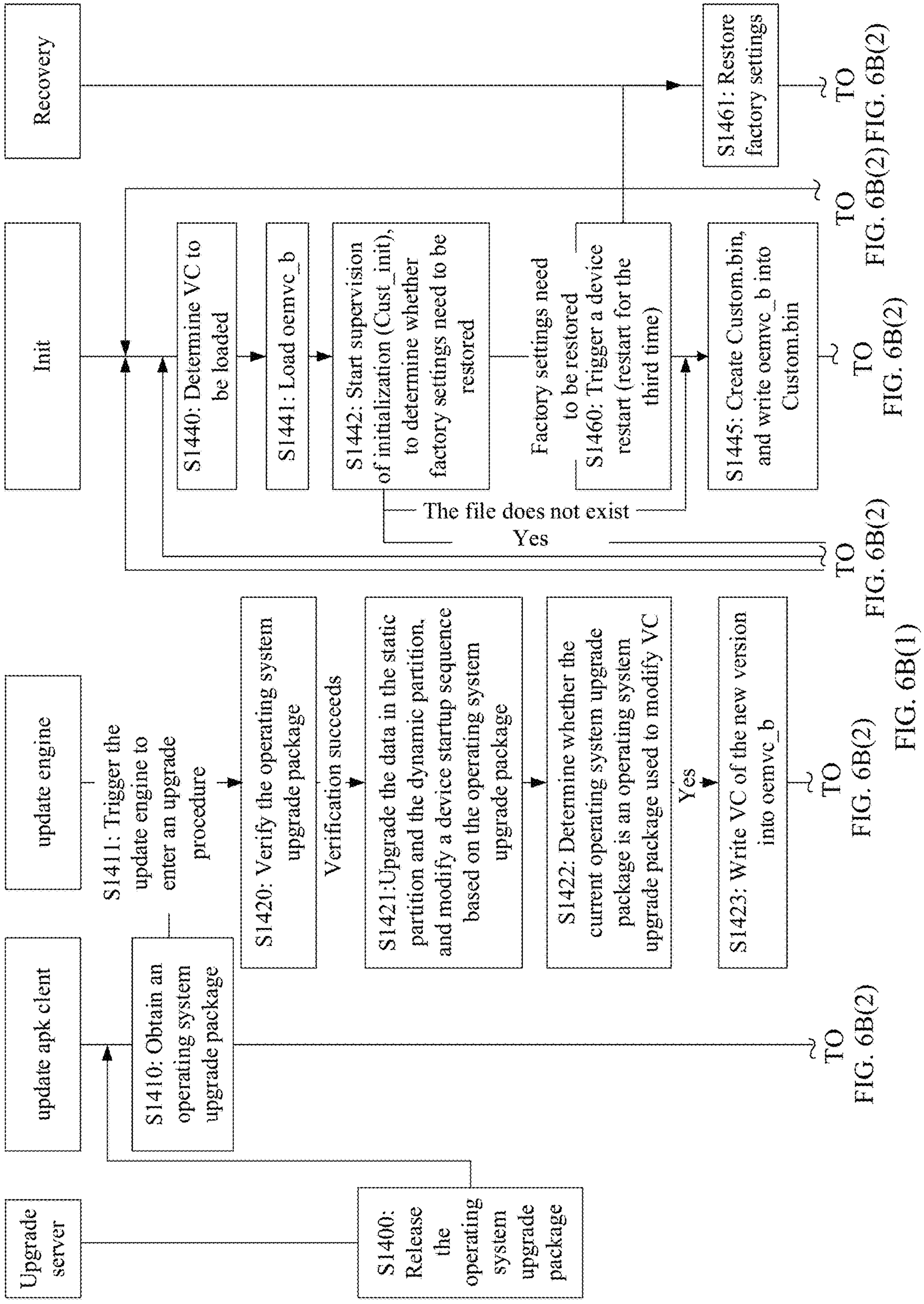
FIG. 6B(1)

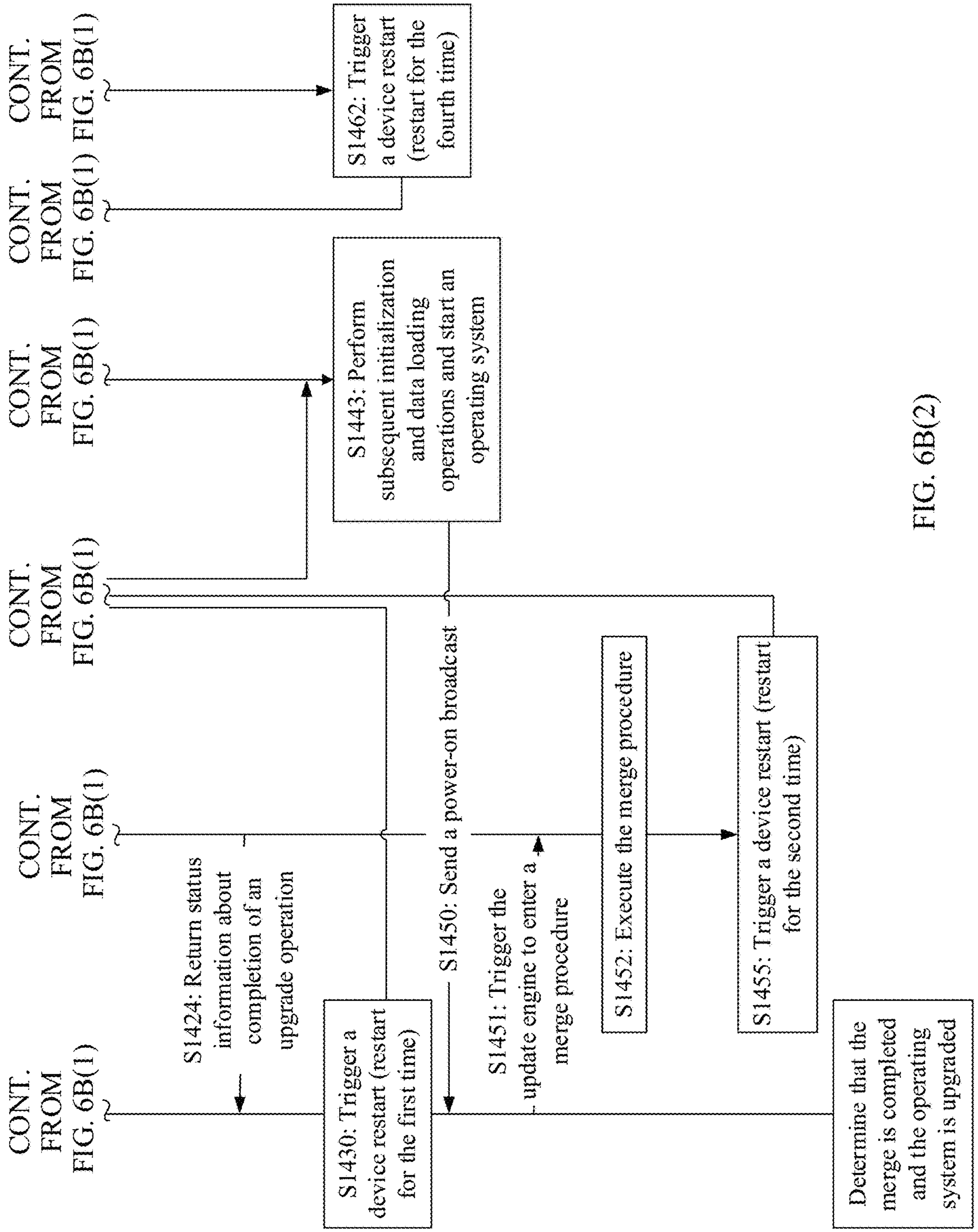
FIG. 6B(2)

CONT. FROM FIG. 8A

TO FIG. 8C

CONT. FROM FIG. 8B

CONT. FROM FIG. 9A

TO FIG. 9C

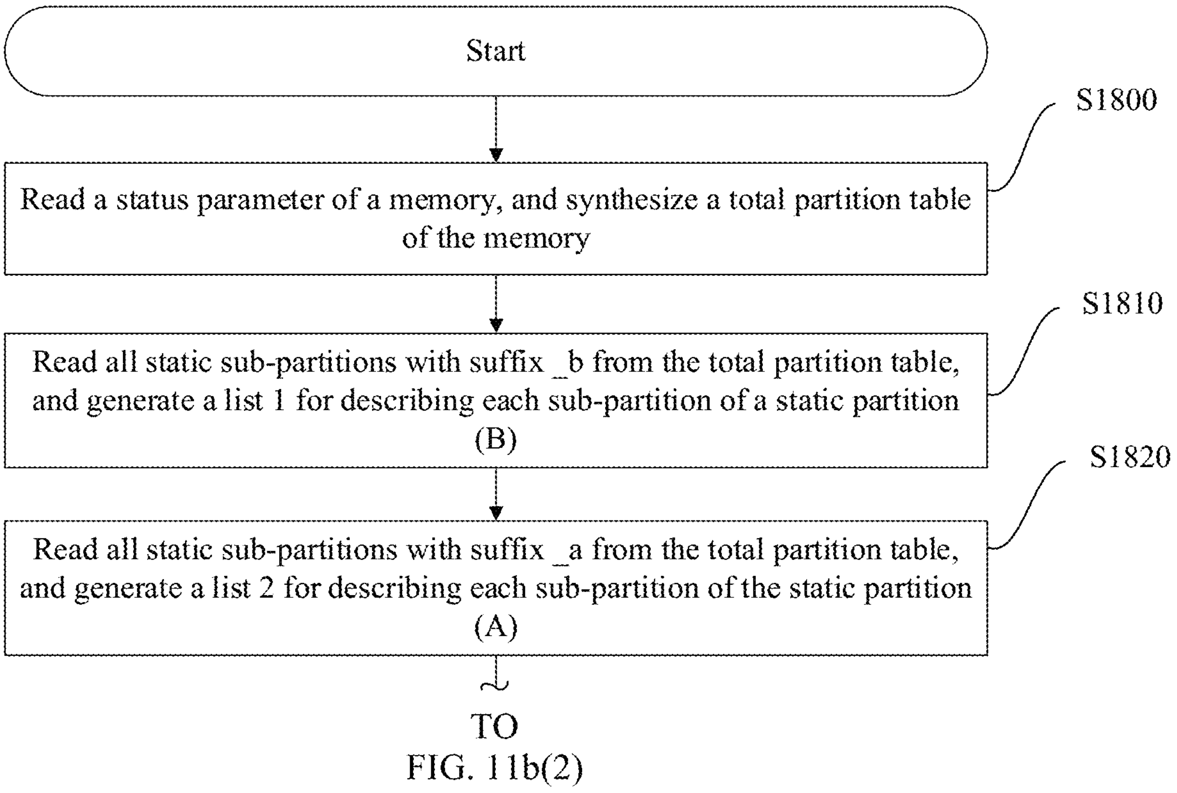
FIG. 11B(1)

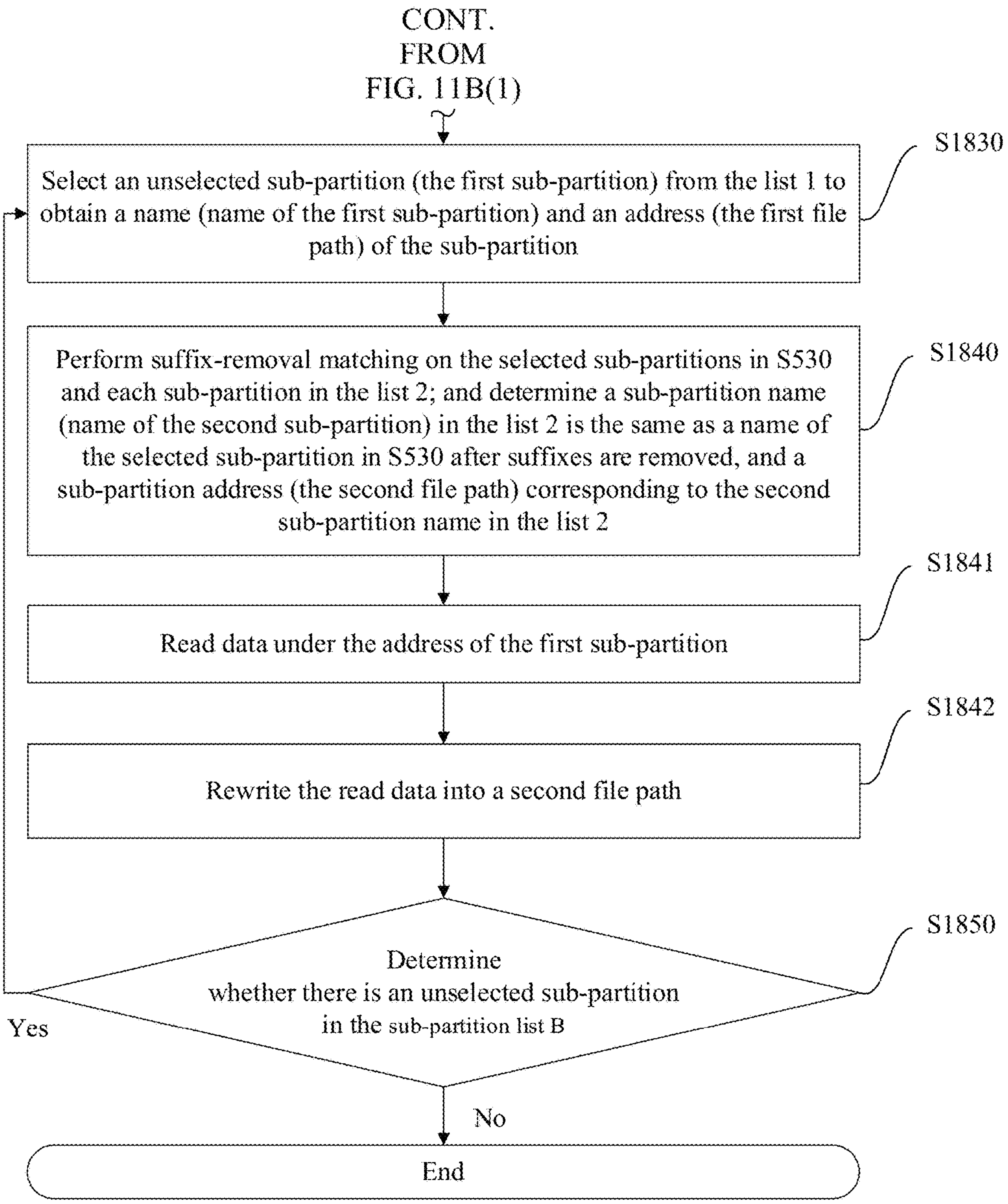
FIG. 11B(2)

METHOD FOR CONFIGURING OPERATING SYSTEM VENDOR COUNTRY, DEVICE, AND STORAGE MEDIUM

CROSS-REFERENCE TO RELATED APPLICATIONS

This application is a national stage of International Application No. PCT/CN2022/094159, filed on May 20, 2022, which claims priority to Chinese Patent Application No. 202110872082.9, filed on Jul. 30, 2021. The disclosures of both of the aforementioned applications are hereby incorporated by reference in their entireties.

TECHNICAL FIELD

This application relates to the field of computer technologies, and in particular, to a method for configuring an operating system vendor country, a device, a storage medium, and a computer program product.

BACKGROUND

In an application scenario of a conventional technology, an operating system needs to be installed on a user terminal to be used by a user. For example, a mobile phone operating system (such as an IOS system or an Android system) needs to be installed on a mobile phone to be used by the user. In the wireless communication field, based on a location of a wireless communication device (for example, a mobile phone) and an operator's wireless communication network accessed by the wireless communication device, an operating system of the wireless communication device needs to be configured with a corresponding vendor country (vendor_country, VC), for example, all cn (universal Chinese vendor country) or cmcc cn (China Mobile Chinese vendor country).

Generally, when an initial operating system is installed before a wireless communication device leaves a factory, an operating system configured with a corresponding vendor country is installed based on a sales area of the wireless communication device. After the wireless communication device leaves the factory, a vendor country of the operating system does not need to be changed. However, in an actual application scenario, a vendor country of an operating system of a wireless communication device may need to be changed. For example, if vendor_country in an original prototype stocked in an overseas country is xxxx_ru (a Russian vendor country of an operator xxxx), a mobile phone vendor country needs to be adjusted to a matching vendor country before being transferred because of the overstocking of the goods or the shortage of goods in another country. Therefore, a method for changing a vendor country of an operating system of a wireless communication device is required.

SUMMARY

In view of this, this application provides a method for configuring an operating system vendor country, a device, a storage medium, and a computer program product, so as to resolve a problem of how to change an operating system vendor country in a conventional technology.

According to a first aspect, an embodiment of this application provides a method for configuring an operating system vendor country, applied to an electronic device, where the electronic device includes a processor and a memory, the memory includes a basic partition, a first static partition, a second static partition, a dynamic partition, and a user data partition; a process of starting an operating system by the electronic device includes an initialization step, a first vendor country file and a second vendor country file are stored in the basic partition, and when the electronic device starts the operating system from the first static partition, the first vendor country file is loaded in the initialization step; when the electronic device starts the operating system from the second static partition, the second vendor country file is loaded in the initialization step; current vendor country content of the first vendor country file is a first vendor country, and the electronic device loads data from the basic partition, the first static partition, and the dynamic partition after being started, so as to start the operating system from the first static partition; and after the operating system is started, the method includes:

- obtaining an operating system upgrade package, where the operating system upgrade package includes a third vendor country file, and vendor country content of the third vendor country file is a second vendor country;
- modifying a startup sequence of the electronic device to start from the second static partition;
- extracting the third vendor country file;
- writing the vendor country content of the third vendor country file into the second vendor country file;
- triggering a first restart of the electronic device;
- entering, by the electronic device, a recovery mode after the first restart;
- restoring factory settings of the electronic device in the recovery mode, including: deleting a vendor country configuration file stored in the user data partition; and
- triggering a second restart of the electronic device, where the electronic device starts the operating system from the second static partition after the second restart, and an initialization step after the second restart at least includes: creating a vendor country configuration file in the user data partition, and writing the vendor country content of the second vendor country file into the vendor country configuration file.

According to the method of the first aspect, a vendor country of the operating system may be modified by using a virtual A/B upgrade solution. According to the method in the first aspect, no additional modification tool needs to be configured. The device may perform the modification operation by downloading the operating system upgrade package, thereby greatly simplifying a modification procedure and reducing difficulty of the modification.

In an implementation of the first aspect, after the obtaining an operating system upgrade package, the method further includes:

- determining whether the operating system upgrade package is used to rewrite a vendor country, and when the operating system upgrade package is used to rewrite a vendor country, performing the step of extracting the third vendor country file.

In an implementation of the first aspect, the determining whether the operating system upgrade package is used to rewrite a vendor country includes: determining whether the third vendor country file exists in the operating system upgrade package.

In an implementation of the first aspect, the initialization step after the second restart further includes:

- determining whether the vendor country configuration file exists in the user data partition, and when the vendor country configuration file does not exist in the user data partition, creating a vendor country configuration file in the user data partition, and writing the vendor country content of the second vendor country file into the vendor country configuration file.

In an implementation of the first aspect, a first operating system and a second operating system are operating systems corresponding to different vendor countrys, the first operating system is corresponding to the first vendor country, and the second operating system is corresponding to the second vendor country; the operating system upgrade package further includes dynamic partition upgrade data, and the dynamic partition upgrade data is used to update dynamic partition data of the first operating system to dynamic partition data of the second operating system; and before the obtaining an operating system upgrade package, the electronic device loads data from the basic partition, the first static partition, and the dynamic partition after being started, so as to start the first operating system from the first static partition; and before the modifying a startup sequence of the electronic device to start from the second static partition, the method further includes:

creating a virtual dynamic partition in the user data partition, and writing the dynamic partition upgrade data into the virtual dynamic partition;

after the writing the vendor country content of the third vendor country file into the second vendor country file, and before the triggering a first restart of the electronic device, the method further includes:

triggering a third restart of the electronic device;

a process in which the electronic device starts the operating system from the second static partition after the third restart includes: loading data from the basic partition, the second static partition, the dynamic partition, and the virtual dynamic partition to start the second operating system; and after the electronic device starts the second operating system after the third restart, merging the data from the virtual dynamic partition to the dynamic partition.

According to the method of the foregoing implementation of the first aspect, dynamic partition data may be updated at the same time of vendor country modification, so that the operating system is upgraded to a corresponding customized operating system version at the same time of vendor country modification, thereby avoiding a plurality of operating system upgrade operations, greatly simplifying an operating system upgrade procedure, and improving user experience.

In an implementation of the first aspect, the operating system upgrade package further includes static partition upgrade data, and the static partition upgrade data is used to update static partition data of the first operating system to static partition data of the second operating system; and before the modifying a startup sequence of the electronic device to start from the second static partition, the method further includes: updating data in the second static partition based on the static partition upgrade data.

According to the method of the foregoing implementation of the first aspect, the static partition data may be updated at the same time of vendor country modification, so that the operating system is upgraded to a corresponding customized operating system version at the same time of vendor country modification, thereby avoiding a plurality of operating system upgrade operations, greatly simplifying an operating system upgrade procedure, and improving user experience.

In an implementation of the first aspect, the method further includes:

after the electronic device starts the second operating system after the third restart, synchronizing the data from the second static partition to the first static partition.

In an implementation of the first aspect, after the merging the data from the virtual dynamic partition to the dynamic partition, the first restart is triggered.

In an implementation of the first aspect, in a process of writing the vendor country content in the third vendor country file into the second vendor country file, the electronic device starts the operating system from the second static partition after the third restart, where it is determined, in the initialization step after the third restart, whether factory settings need to be restored, and when it is determined that factory settings do not need to be restored, a subsequent operating system startup operation is continued.

In an implementation of the first aspect, after the obtaining an operating system upgrade package, the method further includes: determining whether the operating system upgrade package is used to rewrite a vendor country, and when the operating system upgrade package is used to rewrite a vendor country, marking a vendor country rewrite flag bit as a first value;

the determining, in the initialization step after the third restart, whether factory settings need to be restored includes: when a merging status is “wait for merge”, and the vendor country rewrite flag bit is the first value, determining that factory settings of the electronic device do not need to be restored; and after the merging the data from the virtual dynamic partition to the dynamic partition, marking the vendor country rewrite flag bit as a second value.

In an implementation of the first aspect, after the merging the data from the virtual dynamic partition to the dynamic partition, and before the triggering a first restart of the electronic device, the method further includes:

triggering a fourth restart of the electronic device, and starting, by the electronic device, an operating system from the second static partition after the fourth restart, where it is determined, in the initialization step after the fourth restart, whether factory settings need to be restored, and when it is determined that factory settings need to be restored, an operating system startup operation is interrupted, and the first restart is triggered.

In an implementation of the first aspect, the determining, in the initialization step after a fourth restart, whether factory settings need to be restored includes:

determining whether the vendor country configuration file stored in the user data partition matches the second vendor country file; and if the two do not match, determining that factory settings of the electronic device need to be restored.

In an implementation of the first aspect, after the obtaining an operating system upgrade package, the method further includes: determining whether the operating system upgrade package is used to rewrite a vendor country, and when the operating system upgrade package is used to rewrite a vendor country, marking a vendor country rewrite flag bit as a first value;

after the merging the data from the virtual dynamic partition to the dynamic partition, marking the vendor country rewrite flag bit as a second value; and the determining, in the initialization step after the fourth restart, whether factory settings need to be restored includes: when a merging status is “wait for merge”, or when the vendor country rewrite flag bit is the second value, determining whether the vendor country configuration file stored in the user data partition matches the second vendor country file; and if the two match, determining that factory settings of the electronic device do not need to be restored; or if the two do not match, determining that factory settings of the electronic device need to be restored.

In an implementation of the first aspect, the operating system includes an upgrade package obtaining tool and an upgrade engine, the first operating system and the second operating system are operating systems corresponding to different vendor countrys, the first operating system is corresponding to the first vendor country, and the second operating system is corresponding to the second vendor country; before the obtaining an operating system upgrade package, the electronic device loads data from the basic partition, the first static partition, and the dynamic partition after being started, so as to start the first operating system from the first static partition; and after the first operating system is started, the method includes:

obtaining, by the upgrade package obtaining tool, the operating system upgrade package, where the operating system upgrade package includes the third vendor country file, the static partition upgrade data, and the dynamic partition upgrade data;

triggering, by the upgrade package obtaining tool, the upgrade engine to enter an upgrade procedure;

updating, by the upgrade engine, the data in the second static partition based on the static partition upgrade data;

creating, by the upgrade engine, a virtual dynamic partition in the user data partition, writing the dynamic partition upgrade data into the virtual dynamic partition, and marking a merging status as "wait for merge";

modifying, by the upgrade engine, a startup sequence of the electronic device to start from the second static partition;

determining, by the upgrade engine, whether the operating system upgrade package is used to rewrite a vendor country;

when the operating system upgrade package is used to rewrite a vendor country, writing, by the upgrade engine, the vendor country content of the third vendor country file into the second vendor country file, and marking a vendor country rewrite flag bit as a first value;

returning, by the upgrade engine, status information of upgrade operation completion to the upgrade package obtaining tool;

triggering, by the upgrade package obtaining tool, a third restart of the electronic device, where after the third restart, the electronic device loads data from the basic partition, the second static partition, the dynamic partition, and the virtual dynamic partition to start the second operating system;

in the initialization step of starting the second operating system after the third restart: after the second vendor country file is loaded, when the merging status is "wait for merge", and the vendor country rewrite flag bit is the first value, it is determined that factory settings of the electronic device do not need to be restored, and an operating system startup operation is continued;

after the second operating system is started after the third restart, triggering, by the upgrade package obtaining tool, the upgrade engine to enter a merging procedure;

in the merging procedure, merging, by the upgrade engine, the data from the virtual dynamic partition to the dynamic partition, and marking the merging status as "wait for merge"; synchronizing the data from the second static partition to the first static partition; and marking the vendor country rewrite flag bit as a second value;

triggering, by the upgrade engine, a fourth restart of the electronic device, where after the fourth restart, the electronic device loads the data from the basic partition, the second static partition, and the dynamic partition to start the second operating system;

in the initialization step in which the second operating system is started after the fourth restart: after the second vendor country file is loaded, when the merging status is "wait for merge", or when the vendor country rewrite flag bit is the second value, it is determined whether the vendor country configuration file stored in the user data partition matches the second vendor country file; and when the two do not match, it is determined that factory settings of the electronic device need to be restored, the operating system startup operation is interrupted, and the first restart is triggered; and entering, by the electronic device, a recovery mode after the first restart; restoring factory settings of the electronic device in the recovery mode; triggering the second restart, and starting, by the electronic device, an operating system from the second static partition after the second restart, and in the initialization step after the second restart: creating the vendor country configuration file in the user data partition, and writing the vendor country content of the second vendor country file into the vendor country configuration file.

According to a second aspect, an embodiment of this application provides an electronic device, where the electronic device includes a processor and a memory. The memory includes a basic partition, a first static partition, a second static partition, a dynamic partition, and a user data partition. A process of starting an operating system by the electronic device includes an initialization step. A first vendor country file and a second vendor country file are stored in the basic partition. When the electronic device starts the operating system from the first static partition, the first vendor country file is loaded in the initialization step. When the electronic device starts the operating system from the second static partition, the second vendor country file is loaded in the initialization step. Current vendor country content of the first vendor country file is a first vendor country. The processor is configured to execute software code stored in the memory, so that the electronic device loads data from the basic partition, the first static partition, and the dynamic partition after being started, so as to start an operating system from the first static partition.

In addition, after the operating system is started, the electronic device is enabled to perform the method procedure in the first aspect.

According to a third aspect, an embodiment of this application provides a computer-readable storage medium. A computer program is stored in the computer-readable storage medium, and when the computer program is run on a computer, the computer is enabled to execute the method according to the first aspect.

According to a fourth aspect, an embodiment of this application provides a computer program product. The computer program product includes a computer program, and when the computer program product runs on a computer, the computer is enabled to execute the method according to the first aspect.

BRIEF DESCRIPTION OF THE DRAWINGS

To describe technical solutions in embodiments of this application more clearly, the following briefly describes accompanying drawings required for describing the embodiments. Apparently, the accompanying drawings in the following description show only some embodiments of this application, and a person of ordinary skill in the art may still derive other drawings from these accompanying drawings without creative efforts.

FIG. 5A(1)-FIG. 5A(2) are a flowchart of upgrading an operating system for the operating system data storage structure in the embodiment shown in FIG. 4;

FIG. 6B(1)-FIG. 6B(2) are a flowchart of upgrading an operating system according to an embodiment of this application;

FIG. 11B(1)-FIG. 11B(2) are a partial flowchart of upgrading an operating system according to an embodiment of this application;

DETAILED DESCRIPTION OF ILLUSTRATIVE EMBODIMENTS

To better understand the technical solutions of this application, the following describes embodiments of this application in detail with reference to the accompanying drawings.

It should be noted that the described embodiments are merely some rather than all of embodiments of this application. Based on embodiments of this application, all other embodiments obtained by a person of ordinary skill in the art without creative efforts shall fall within the protection scope of this application.

Terms used in embodiments of this application are merely intended to describe specific embodiments, but are not intended to limit this application. The terms "one", "a", "the", "the foregoing", "this", and "the one" of singular forms used in this specification and the appended claims of this application are also intended to include plural forms, unless otherwise specified in the context clearly.

It should be understood that the term "and/or" used in the text merely describes an association relationship between associated objects, and indicates that three relationships may exist. For example, A and/or B may indicate the following cases: Only A exists, both A and B exist, and only B exists. In addition, the character "/" in this specification usually indicates an "or" relationship between the associated objects.

Figure 1:
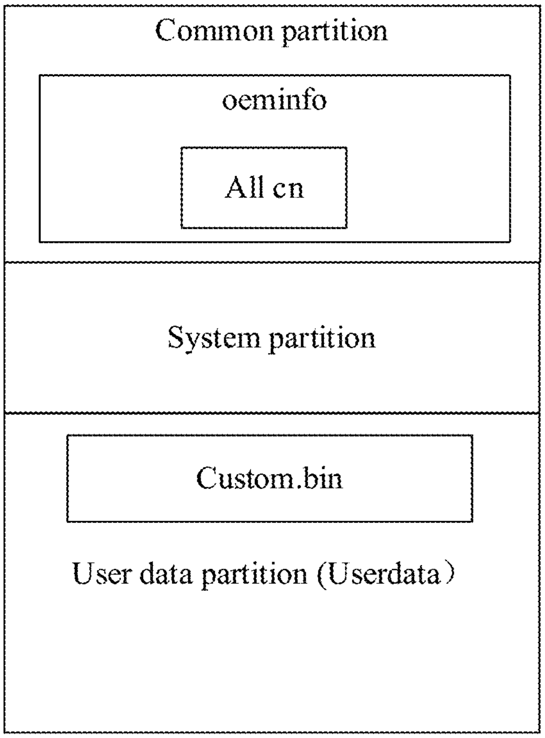
FIG. 1 is a schematic diagram of a partition architecture of an operating system according to an embodiment of this application.

FIG. 1 is a schematic diagram of a partition architecture of an operating system according to an embodiment of this application. As shown in FIG. 1, the Common partition is a basic partition that stores system data that is not used for updating the operating system. The user data partition (Userdata) is used to store personal data of a user. For example, personal data such as an APP installed by the user personally, and a picture, a document, and a video stored by the user personally. The system partition is used to store operating system data, and the operating system upgrade is to upgrade data in the system partition. The system partition includes a plurality of sub-partitions, such as bootloader, boot, vendor_boot, dtbo, vbmeta, and Super. Further, the Super partition includes a plurality of sub-partitions, such as System, system_ext, vendor, product, Cust, and Odm.

Generally, vendor country information VC (for example, All cn, cmcc cn) of an operating system is stored in a separate sub-partition in the Common partition, for example, stored in an oeminfo sub-partition or an nv sub-partition of the Common partition. In a process in which a device starts the operating system, the device reads and loads VC information in the Common partition, and the VC information is further written into customized information (Custom.bin file) stored in the user data partition (Userdata), so as to be invoked in a running process of the operating system.

Because VC is stored in the Common partition that is not used for updating the operating system, a normal operating system upgrade operation cannot rewrite VC data. A feasible manner of rewriting VC is to rewrite VC by using a computer modification tool.

Figure 2A:
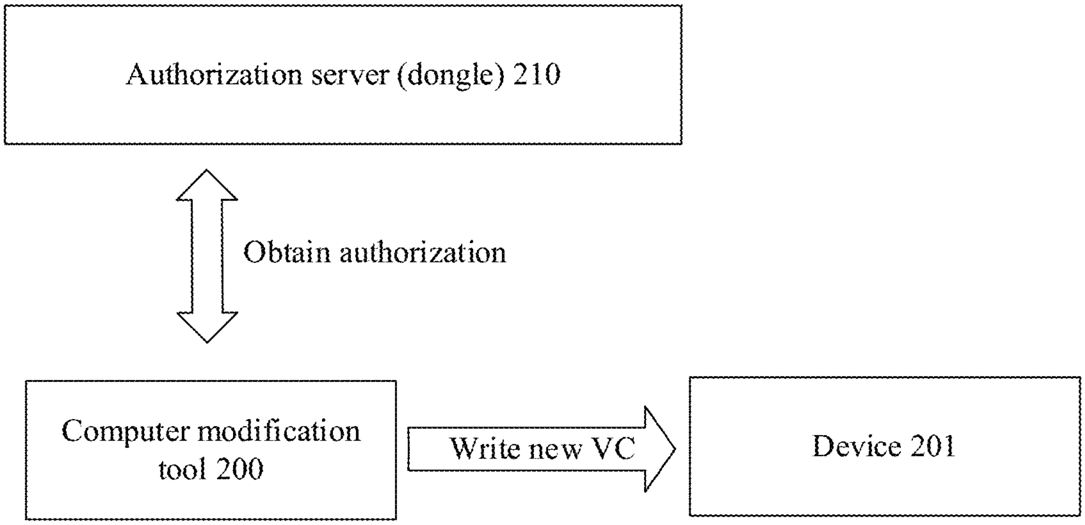
FIG. 2A is a schematic diagram of an architecture of a modification system according to an embodiment of this application.

FIG. 2A is a schematic diagram of a structure of a modification system according to an embodiment of this application. A computer modification tool 200 accesses a device 201 (for example, a mobile phone) and connects to an authorization server (dongle) 210 through a network. When the computer modification tool 200 accesses the device 201, an operating system of the device 201 does not start normally, and the computer modification tool 200 can write data into the device 201. For example, after the mobile phone is powered on, the mobile phone enters a debugging mode instead of starting an operating system. In the debugging mode, an authorized computer modification tool can write data into a memory on the mobile phone.

Figure 2B:
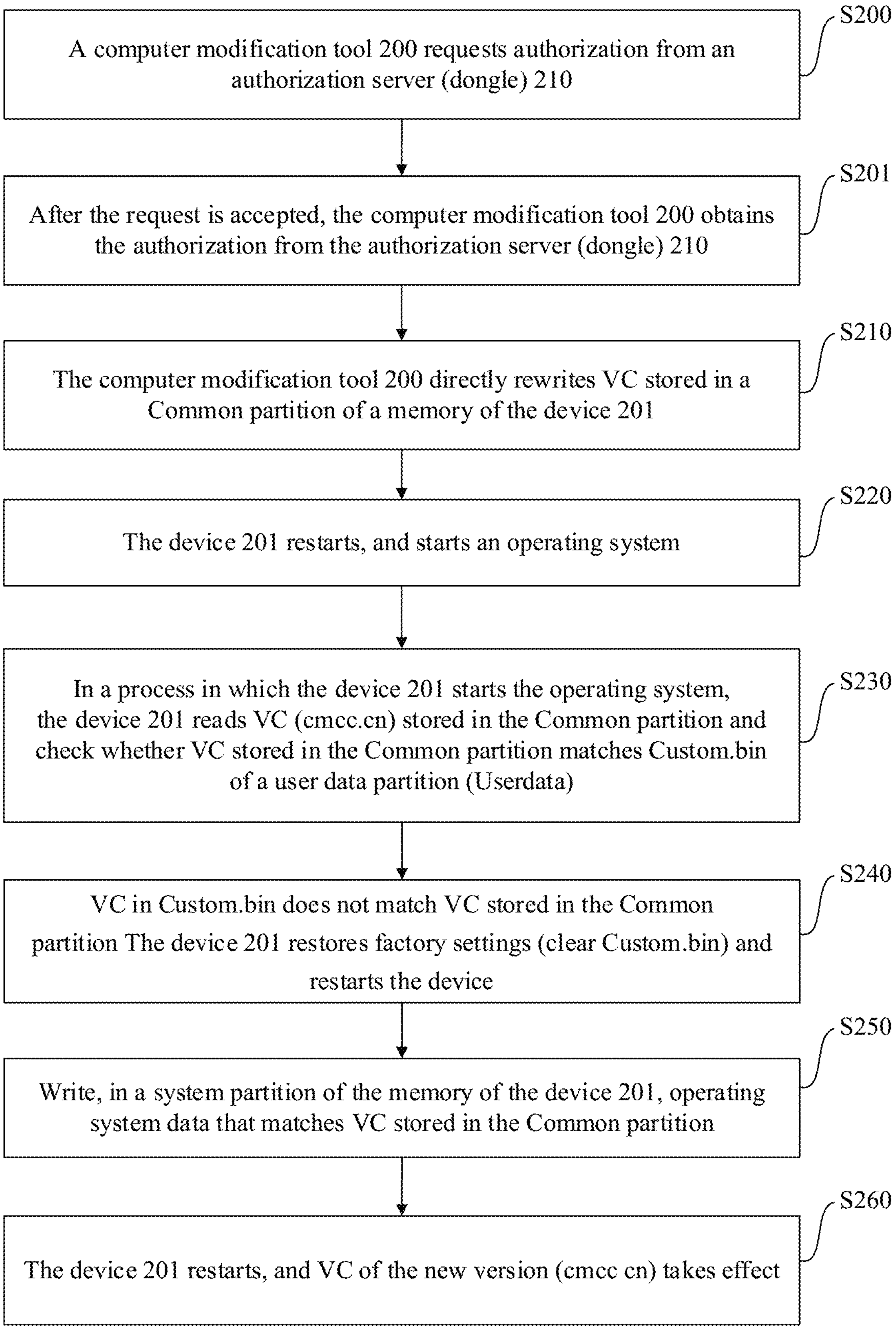
FIG. 2B is a schematic diagram of a modification procedure according to an embodiment of this application.

FIG. 2B is a schematic diagram of a modification procedure according to an embodiment of this application. As shown in FIG. 2B:

S200: A computer modification tool 200 requests authorization from an authorization server (dongle) 210.

S201: After the request is accepted, the computer modification tool 200 obtains the authorization from the authorization server (dongle) 210.

After the computer modification tool 200 obtains the authorization, S210 is performed. The computer modification tool 200 directly rewrites VC stored in the Common partition of a memory of the device 201. For example, VC stored in the oeminfo sub-partition of the Common partition is rewritten from All cn to cmcc cn.

Before S210, VC stored in the Common partition of the device 201 is All cn. Therefore, VC in Custom.bin of the user data partition (Userdata) of the device 201 memory before S210 is All cn. In S210, the computer modification tool 200 rewrites only VC stored in the Common partition. Therefore, after S210, VC in Custom.bin of the user data partition (Userdata) is still All cn.

S220: The device 201 restarts. Specifically, a restart of the device 201 may be triggered by the computer modification tool 200. For example, the computer modification tool 200 sends a restart instruction to the device 201 after rewriting VC of the device 201. Alternatively, the user may restart the device 201.

After 220, the device 201 normally starts the operating system. In a process in which the device 201 starts the operating system, the device performs S230. The device 201 reads VC (cmcc.cn) stored in the Common partition, and checks whether VC stored in the Common partition matches Custom.bin of the user data partition (Userdata). Because VC in Custom.bin is still All cn, VC in Custom.bin does not match VC stored in the Common partition.

S240: The device 201 restores factory settings (clear Custom.bin), and restarts the device.

In an actual application scenario, for different VC, an operating system vendor generally provides different operating system customization content. For example, for China Mobile (cmcc), the operating system vendor may embed a dedicated data connection platform of China Mobile in the operating system. Therefore, in some application scenarios, when VC is changed, to ensure integrity of an operating system function, operating system data (a current operating system version corresponding to old VC is upgraded to an operating system version corresponding to new VC) needs to be synchronized and rewritten.

Therefore, after S240, S250 is performed to write, in a system partition of the memory of the device 201, operating system data that matches VC stored in the Common partition; for example, operating system mirror data that matches VC stored in the Common partition is used to rewrite the data in the system partition.

Further, if the operating system is not customized for different VC, the operating system data does not need to be rewritten.

S260: The device 201 restarts, and VC of the new version (cmcc cn) takes effect.

Figure 3:
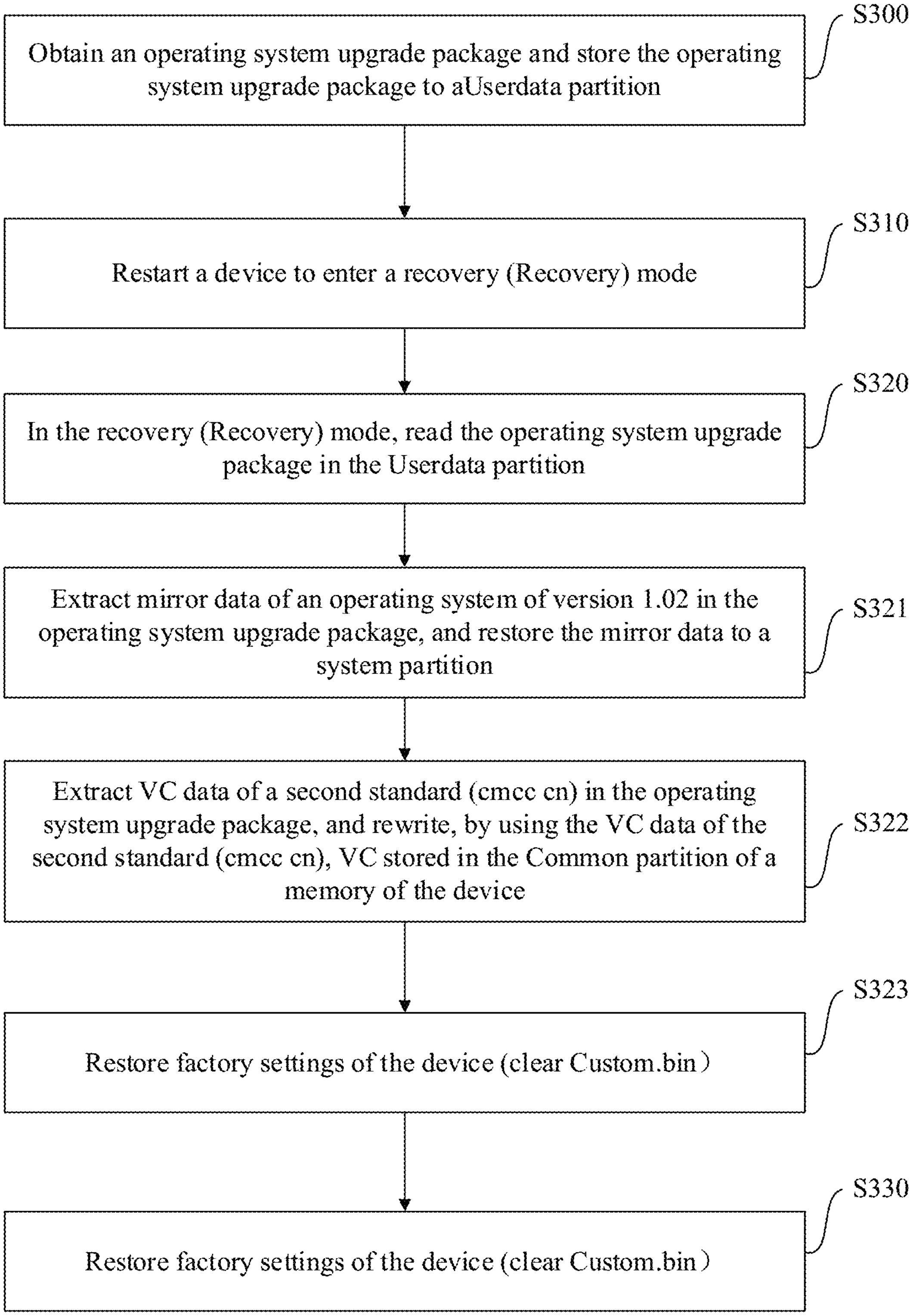
FIG. 3 is a flowchart of upgrading an operating system according to an embodiment of this application.

Based on the embodiments shown in FIG. 2 and FIG. 3, although VC may be rewritten, because the rewriting operation must be performed by a computer modification tool, hardware costs of the rewriting operation are relatively high. In addition, in some network environments, no authorization server (dongle) node can be deployed, and therefore, it is difficult to implement the modification operation.

For VC rewriting, another feasible manner is to exit the operating system, to enter a recovery (Recovery) mode, to rewrite VC data in the Common partition in the memory of the device in the Recovery mode, and to rewrite data in the system partition.

Specifically, FIG. 3 is a flowchart of upgrading an operating system according to an embodiment of this application. It is assumed that VC corresponding to an operating system of version 1.01 is a first vendor country (for example, All cn), and VC corresponding to an operating system of version 1.02 is a second vendor country (for example, cmcc cn). As shown in FIG. 3, the device performs the following procedure to upgrade the operating system from version 1.01 to version 1.02:

S300: Obtain an operating system upgrade package, and store the operating system upgrade package to a Userdata partition. The operating system upgrade package includes VC data of a second vendor country (cmcc cn) and mirror data of an operating system of version 1.02.

S310: Restart a device to enter a recovery (Recovery) mode.

S320: In the recovery (Recovery) mode, read the operating system upgrade package from the Userdata partition.

S321: Extract the mirror data of the operating system of version 1.02 from the operating system upgrade package, and restore the mirror data to a system partition. A purpose of S321 is to upgrade an operating system version of the device to an operating system version that matches the second vendor country (cmcc cn). If the operating system is not customized for All cn and cmcc cn, the operating system upgrade package does not need to include mirror data of the operating system.

S322: Extract VC data of a second vendor country (cmcc cn) in an operating system upgrade package, and rewrite, by using the VC data of the second vendor country (cmcc cn), VC stored in a Common partition of a memory of the device (for example, All cn stored in an oeminfo sub-partition).

S323: Restore factory settings of the device (clear Custom.bin).

S330: Restart the device, start the operating system, and VC of the new version (cmcc cn) takes effect.

Although VC may be rewritten based on the procedure shown in FIG. 3, with continuous improvement of data security requirements, access to user personal data in the recovery (Recovery) mode is prohibited in some operating systems. Therefore, the device cannot rewrite operating system data in a partition in the recovery (Recovery) mode.

Figure 4:
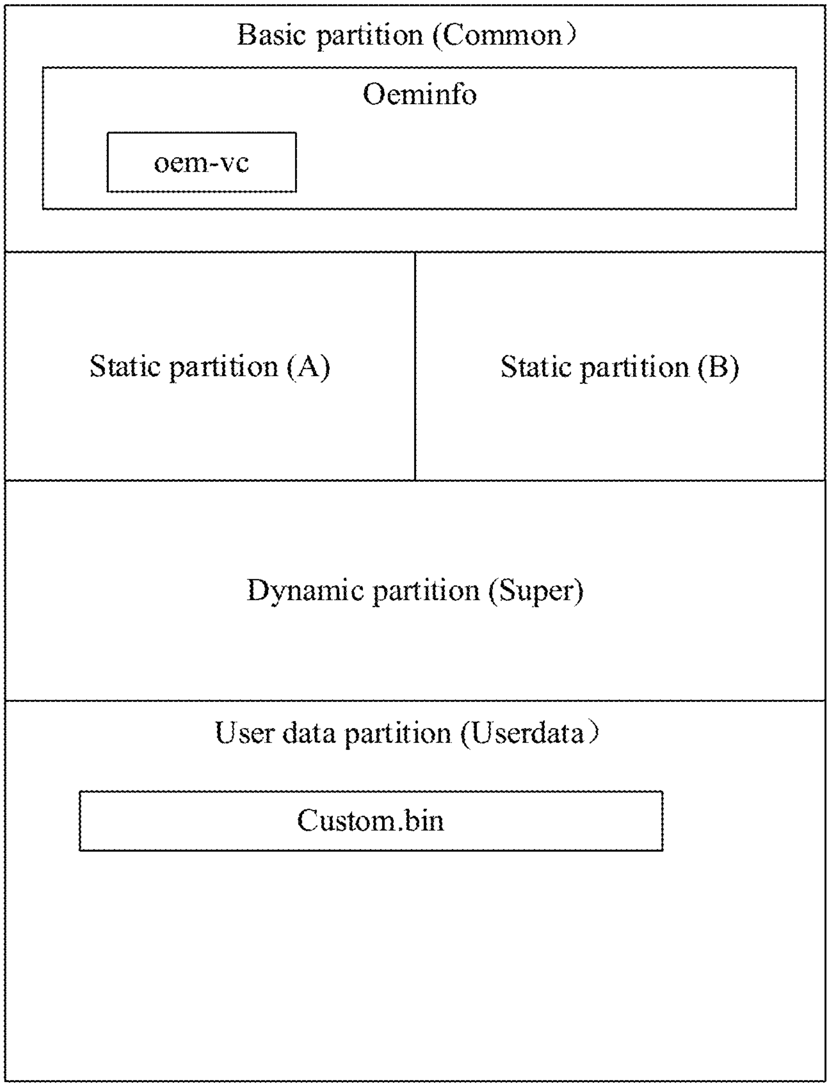
FIG. 4 is a schematic diagram of data storage structure according to an embodiment of this application.

An Android system in a virtual A/B upgrade manner is used as an example. FIG. 4 is a schematic diagram of a data storage structure according to an embodiment of this application. As shown in FIG. 4, a data storage area of an Android system includes a basic partition (Common), a static partition (A), a static partition (B), a dynamic partition (Super), and a user data partition (Userdata).

The user data partition (Userdata) is used to store personal data of a user. For example, personal data such as an APP installed by the user personally, and a picture, a document, and a video stored by the user personally. Data stored in the basic partition is system data that is not used for updating the operating system. A structure of the static partition (A) and a structure of the static partition (B) correspond to each other, and sub-partition names are distinguished from each other by using suffixes _a and b. For example, the static partition (A) includes bootloader_a, boot_a, vendor_boot_a, dtbo_a, vbmeta_a, and the static partition (B) includes bootloader_b, boot_b, vendor_boot_b, dtbo_b, and vbmeta_b. The dynamic partition (Super) includes a plurality of sub-partitions (System, system_ext, vendor, product, Cust, and Odm).

A vendor country file oem-vc is stored in an oeminfo sub-partition of the Common partition, and content of oem-vc is a vendor country of a device, for example, all cn.

When the device starts, the device starts from a static partition. For example, the device starts from the static partition (A): the basic partition (Common), the static partition (A), and the dynamic partition (Super) are sequentially loaded, an initialization step is performed in a process of loading the static partition (A), and a device vendor country (oem-vc) is loaded in the initialization step. The device starts from the static partition (B): the basic partition (Common), the static partition (A), and the dynamic partition (Super) are sequentially loaded, an initialization step is performed in a process of loading the static partition (B), and a device vendor country (oem-vc) is loaded in the initialization step.

A universal flash storage (Universal Flash Storage, UFS) in a master boot record (Master Boot Record, MBR) format is used as an example. A device startup sequence description is stored in the MBR (master boot sector, a first sector of the UFS, that is, cylinder 0, head 0, sector 1 of a C/H/S address) of the UFS. For example, the device starts from the static partition (A) (startup sequence flag is A) or starts from the static partition (B) (startup sequence flag is A). After the device starts, the device reads a device startup sequence from the MBR of the UFS.

FIG. 5A(1)-FIG. 5A(2) are a flowchart of upgrading an operating system for the operating system data storage structure in the embodiment shown in FIG. 4. When the device currently starts from the static partition (A), the device upgrades the operating system according to a procedure shown in FIG. 5A(1)-FIG. 5A(2).

S500: A device sequentially loads a basic partition (Common), a static partition (A), and a dynamic partition (Super), and starts from the static partition (A).

S510: The device obtains an operating system upgrade package.

For example, in a feasible implementation, the device periodically initiates a packet search request to a packet search server, where the packet search request includes a version number (for example, version 1.1) of an operating system that is currently running on the device. The packet search server checks, based on the operating system version number in the packet search request, whether an operating system installation package with an updated version number (for example, version 1.2) currently exists. When the operating system installation package with an updated version exists, the packet search server feeds back a download address of the operating system upgrade package (for example, a system incremental upgrade installation package used for upgrading from version 1.1 to version 1.2) to the device. The device downloads the operating system upgrade package based on the download address of the operating system upgrade package.

S520: The device performs a data writing operation on a static partition (B) based on the operating system upgrade package to upgrade the static partition.

In a process of performing S520, there is a case in which the performing of S520 fails (static partition upgrade fails). In this case, the device may interrupt an entire operating system upgrade operation, output an upgrade failure prompt (for example, displaying a dialog box indicating an upgrade failure) to the user, and automatically re-upgrade, or the user determines whether to upgrade again or abort the upgrade.

To detect whether there is a static partition upgrade failure in S520, in S520, data verification is performed on a static partition (B) into which data is written, to determine whether the data is successfully written into the static partition.

For example, in an application scenario, the system upgrade installation package for upgrading from version 1.1 to version 1.2 includes full data in a static partition of version 1.2 and a hash value of the full data in the static partition of version 1.2. The device rewrites the full data in the static partition of version 1.2 into the static partition (B). After the data is written, the device calculates a hash value of data in the static partition (B), and verifies whether the hash value of the data in the static partition (B) is the same as the hash value of the full data in the static partition of version 1.2 in the system upgrade installation package used for upgrading from version 1.1 to version 1.2. If the two are the same, it indicates that the data writing is successful, and a subsequent operating system upgrade operation can be performed. If the two are different, it indicates that the data writing fails and the upgrade fails.

For another example, in an application scenario, the system upgrade installation package used for upgrading from version 1.1 to version 1.2 includes differential data in the static partition that is used for upgrading from version 1.1 to version 1.2, a hash value of full data in the static partition of version 1.1, and the hash value of full data in the static partition of version 1.2.

Before writing data into the static partition (B), the device first calculates a hash value of data in the static partition (A), verifies whether the hash value of the data in the static partition (A) is the same as the hash value of the full data in the static partition of version 1.1 in the system upgrade installation package used for upgrading from version 1.1 to version 1.2. If the two are the same, it indicates that the data in the current static partition (A) is static partition data in version 1.1, and the differential data in the static partition that is used for upgrading from version 1.1 to version 1.2 is available. If the two are different, the differential data in the static partition that is used for upgrading from version 1.1 to version 1.2 is unavailable, and the upgrade fails.

After the device determines that the differential data in the static partition that is used for upgrading from version 1.1 to version 1.2 is available, the device reads the data in the static partition (A), uses the differential data in the static partition that is used for upgrading from version 1.1 to version 1.2 and the data in the static partition (A) to perform restoration to obtain the full data in the static partition of version 1.2, and rewrites the full data in the static partition of version 1.2 into the static partition (B). After the data is written, the device calculates a hash value of data in the static partition (B), and verifies whether the hash value of the data in the static partition (B) is the same as the hash value of the full data in the static partition of version 1.2 in the system upgrade installation package used for upgrading from version 1.1 to version 1.2. If the two are the same, it indicates that the data writing is successful, and a subsequent operating system upgrade operation can be performed. If the two are different, it indicates that the data writing fails and the upgrade fails.

A "boot" sub-partition of a static partition is used as an example. In an application scenario, the system upgrade installation package used for upgrading from version 1.1 to version 1.2 includes the following data:

Name:boot (partition name, indicating that current data is upgrade data that points to the "boot" sub-partition of the static partition)

Start: 12222 (start address of a data block, indicating that a start location of upgrade data (differential data DELTA1) of the "boot" sub-partition of the static partition is 12222)

Size: 2410 (data size, indicating that a size of the upgrade data (differential data DELTA1) of the "boot" sub-partition of the static partition is 2410)

Original hash value: HASH11 (hash value of data of the "boot" sub-partition of the static partition of version 1.1)

Mirror target hash value: HASH12 (hash value of data of the "boot" sub-partition of the static partition of version 1.2)

Differential data delta: DELTA1 (differential data in the static partition that is used for upgrading from version 1.1 to version 1.2)

In S520, the device reads a fixed mount path of the device through a misc partition of the common partition, for example, /dev/block/by-name/misc; and reads a card slot number (slot-b) from a UFS component, and replaces the card slot number to obtain a sub-partition path, for example, /dev/block/by-name/boot_b.

The "boot" sub-partition is still used as an example. The device first calculates a hash value of data under /dev/block/by-name/boot_a, and verifies whether the hash value of the data under /dev/block/by-name/boot_a is the same as the hash value HASH11. If the two are the same, DELTA1 is available. If the two are different, the upgrade operation fails.

When the hash value of the data under /dev/block/by-name/boot_a is the same as the hash value HASH11, the device reads DELTA1 based on Start: 12222 and size: 2410, and uses DELTA1 and the data under /dev/block/by-name/boot_a to perform restoration to obtain full data of the "boot" sub-partition of the static partition of version 1.2. The device writes the full data of the "boot" sub-partition of the static partition of version 1.2 under /dev/block/by-name/boot_b.

After the data is written, the device calculates a hash value of data under /dev/block/by-name/boot_b, and verifies whether the hash value of the data under /dev/block/by-name/boot_b is the same as the hash value HASH12. If the two are the same, the "boot" sub-partition of the static partition is upgraded successfully, and a next sub-partition of the static partition may be upgraded. If the two are different, the upgrade operation fails.

In an application scenario, the device upgrades the sub-partition of the static partition based on upgrade data in a sub-partition of a static partition that is included in the system upgrade installation package. Specifically, if the system upgrade installation package includes upgrade data in a sub-partition of a static partition, the device upgrades the sub-partition of the static partition (B) according to an upgrade procedure of the foregoing boot sub-partition; or if the system upgrade installation package does not include upgrade data in a sub-partition of a static partition, the device directly synchronizes data from the sub-partition of the static partition (A) to the sub-partition of the static partition (B). During the upgrade process, if an upgrade error occurs in a sub-partition and a hash check fails, the upgrade operation is interrupted, and the upgrade fails. When all sub-partitions are upgraded successfully, the static partition is upgraded successfully and subsequent steps may be performed.

Further, when a static partition (the static partition (A) or the static partition (B)) fails to be upgraded, data in the static partition cannot be used to successfully start an operating system. To avoid an operating system startup error caused by loading the static partition that fails to be upgraded in an operating system startup process, in an application scenario, the static partition has a corresponding status mark ("bootable" or "unbootable"). The device first reads the static partition status mark before loading the static partition data, and loads the static partition data only when the status mark of the static partition is "bootable". Before the static partition data is upgraded, the static partition is marked as "unbootable". After the static partition data is upgraded successfully, the static partition is marked as "bootable". In this way, if the upgrade of the static partition fails, the status of the static partition is still "unbootable". The device does not load the data in the static partition that fails to be upgraded.

For example, in S520, before data in the static partition (B) is upgraded, the static partition (B) is marked as "unbootable". Specifically, the status mark of the static partition is stored in the Common partition. In S520, before the data in the static partition (B) is upgraded, slot-b in the status mark of the static partition in the Common partition is marked as "unbootable" ("unbootable"). After S520 is performed successfully (all hash checks are successful), the static partition (B) is marked as "bootable". For example, after S520, slot-b in the status mark of the static partition in the Common partition is marked as "bootable" ("bootable").

S530: The device creates a virtual dynamic partition in a user data partition (Userdata) based on the operating system upgrade package, and writes upgrade data in the dynamic partition (Super) into the virtual dynamic partition. For example, the operating system upgrade package includes data in the dynamic partition of version 1.2, and the device writes the data in the dynamic partition (Super) of version 1.2 into the virtual dynamic partition.

Further, in a virtual A/B upgrade solution, an incremental upgrade manner is used for the dynamic partition (Super). During the upgrade process, the virtual dynamic partition of the user data partition (Userdata) stores not all files of the dynamic partition (Super) of a new version after upgrade, but an upgrade result of the data that needs to be upgraded in the dynamic partition (Super) of the old version after upgrade. That is, update data in the dynamic partition is stored in the virtual dynamic partition of the user data partition (Userdata).

A "system" sub-partition is used as an example. It is assumed that in version 1.1, data in the "system" sub-partition may be divided into two parts: system1 and system2. From version 1.1 to version 1.2, the data system2 does not change, and the data system1 is upgraded to system3. Therefore, in S530, the device creates a virtual dynamic partition in the user data partition (Userdata), and writes the data system3 into the virtual dynamic partition.

For example, the system incremental upgrade installation package used for upgrading from version 1.1 to version 1.2 includes dynamic partition (Super) update data used for upgrading from version 1.1 to version 1.2, and the dynamic partition (Super) update data includes the data system3.

Further, in the virtual A/B upgrade solution, incremental upgrade of the dynamic partition (Super) is implemented based on a snapshot (snapshot) technology. Specifically, in the virtual dynamic partition of the user data partition (Userdata), the upgrade data in the dynamic partition (Super) is stored by using a Copy-On-Write (Copy-On-Write, COW) file.

Specifically, the upgrade data in the dynamic partition (Super) stored in the user data partition (Userdata) includes a plurality of COW files, each COW file is corresponding to a sub-partition of a dynamic partition (Super), and a name of the COW file is corresponding to a sub-partition of the dynamic partition (Super) specific to the COW file.

In the operating system upgrade package obtained in S510, the COW file of the upgrade data in the dynamic partition (Super) is compressed and stored in the form of binary code. In the operating system upgrade package, each COW file is named based on a dynamic partition (Super) sub-partition specific to the COW file. For example, a COW file specific to the "system" sub-partition is named system-cow-img.img.0000.

In S530, the device unpacks the operating system upgrade package to obtain all COW files, and appends an A/B partition tag to each COW file. Specifically, when the device currently starts from the static partition (A), it may be understood that a dynamic partition (Super) loaded by the device currently when running the operating system is the dynamic partition (A). When the operating system is being upgraded, the virtual dynamic partition created in the user data partition (Userdata) specific to the dynamic partition (B). Therefore, a name mark_b corresponding to the dynamic partition (B) is appended to the COW file. For example, _b is appended to system-cow-img.img.0000 to generate system_b-cow-img.img.0000.

Further, in S530, an Update folder is created in the user data partition (Userdata), and a renamed COW file is stored in the Update folder. For example, in an application scenario, after the COW file is written into the user data partition (Userdata), the Update folder of the user data partition (Userdata) includes the following files:

system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

Specifically, the COW file includes a COW file map (snapshot map) of the COW file and upgrade data.

The COW file map (snapshot) corresponds to a file map of the sub-partition of the dynamic partition (Super) specific to the COW file. The file map of the sub-partition of the dynamic partition (Super) is used to describe all files in the sub-partition of the dynamic partition (Super) of a current version of the operating system (version prior to the upgrade, for example, version 1.1) and a storage address of each file.

The upgrade data in the COW file is an updated file in the sub-partition data of a new version compared with the sub-partition data of a current version. The COW file map of the COW file is used to describe a correspondence between the updated file and the file in the sub-partition of the current version and a storage address of the updated file.

Based on the file map of the sub-partition of the dynamic partition (Super) and the COW file map of the COW file, upgrade data in the COW file may be used to replace the corresponding file in the sub-partition of the dynamic partition (Super), thereby implementing upgrade of the dynamic partition (Super) data. Specifically, when the file map of the sub-partition of the dynamic partition (Super) needs to be obtained, a snapshot operation may be performed on the data in the sub-partition of the dynamic partition (Super) based on the snapshot, so as to generate the file map of the sub-partition of the dynamic partition (Super). The file map of the sub-partition of the dynamic partition (Super) may also be generated in advance when creating the operating system upgrade package, and the file map is added to the COW file.

The "system" sub-partition is used as an example. It is assumed that the "system" sub-partition stores data in the following paths:

/system/app/A0.XXX;
/system/app/A1.XXX;
/system/app/A2.XXX;
/system/B0.XXX;
/system/B1.XXX;
/system/user/C0.XXX;
/system/user/C1.XXX;
/system/user/C2.XXX;
/system/user/C3.XXX.

A file map of the "system" sub-partition may be as follows:

/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044.

Numbers following the file name (for example, 024010~024013 in /system/app/A0.XXX: 024010~024013) indicate a physical storage address (block address) of the file in the "system" sub-partition of the dynamic partition (Super).

It is assumed that data in /system/app/A2.XXX and /system/user/C2.XXX needs to be updated when the current operating system is being upgraded.

It can be considered that:

/system/app/A2.XXX and /system/user/C2.XXX are system1 in the data of "system" sub-partition; and /system/app/A0.XXX, /system/app/A1.XXX, /system/B0.XXX, /system/B1.XXX, /system/user/C0.XXX, /system/user/C1.XXX and /system/user/C3.XXX are system2 in the data of the "system" sub-partition.

Then, the COW file (system_b-cow-img.img.0000) specific to the "system" sub-partition includes the latest version of /system/app/A2.XXX and /system/user/C2.XXX.

It may be considered that the latest version of /system/app/A2.XXX and /system/user/C2.XXX are system3. A purpose of the upgrade is to use the system3 to update system1.

The COW file map of the COW file (system_b-cow-img.img.0000) may be:

/system/app/A2.XXX:

Map 1 (address of to-be-updated data in an original super partition): start address start: 024018 (offset relative to the system start address); offset size: 2 (that is, data of 024018~024020 address segment)

Map 2 (address of update data stored in the cow file): start address start: 045033 (offset relative to the start address of cow file storage); offset size: 2 (that is, data of 045033~045035 address segment);

/system/user/C2.XXX:

Map 1 (address of to-be-updated data in an original super partition): start address start: 024036 (offset relative to the system start address); offset size: 4 (that is, data of 024036~024040 address segment);

Map 2 (address of update data stored in the cow file): start address start: 045036 (offset relative to the start address of cow file storage); offset size: 4 (that is, data of 045036~045040 address segment);

Numbers following file names (045033~045035 and 045036~045040) are respectively physical storage addresses (block address) of the latest version of /system/app/A2.XXX and /system/user/C2.XXX in the COW file (system_b-cow-img.img.0000) in the user data partition (Userdata).

In this way, if A2.XXX under the address 045033~045035 is used to replace A2.XXX under the address 024018~024020, and C2.XXX under the address 045036~045040 is used to replace C2.XXX under the address 024036~024040, data upgrade of the "system" sub-partition of the dynamic partition (Super) can be completed.

After the COW file is successfully written into the user data partition (Userdata), merging status information in metadata partition (/metadata) of the basic partition (Common) is changed from "merged (merged)" to "wait for merge (wait for merge)". The merging status information is used to indicate whether there is a COW file that needs to be merged to the dynamic partition (Super). Specifically, the merging status information includes an overall identifier specific to the dynamic partition (Super) and a sub-partition identifier specific to each sub-partition. When the overall identifier is "merged (merged)", a merging operation needs to be performed on all sub-partitions representing the dynamic partition (Super) do not need a merging operation. When the overall identifier is "wait for merge (wait for merge)", a merging operation needs to be performed on one or more sub-partitions representing the dynamic partition (Super). When the sub-partition identifier is "merged (merged)", it indicates that no merging operation needs to be performed on the sub-partition. When the sub-partition identifier is "wait for merge (wait for merge)", it indicates that a merging operation needs to be performed on the sub-partition.

Further, in some application scenarios, in S530, the device not only writes the COW file into the user data partition (Userdata), but also updates partition information in the metadata of the dynamic partition (Super).

Figure 5B:
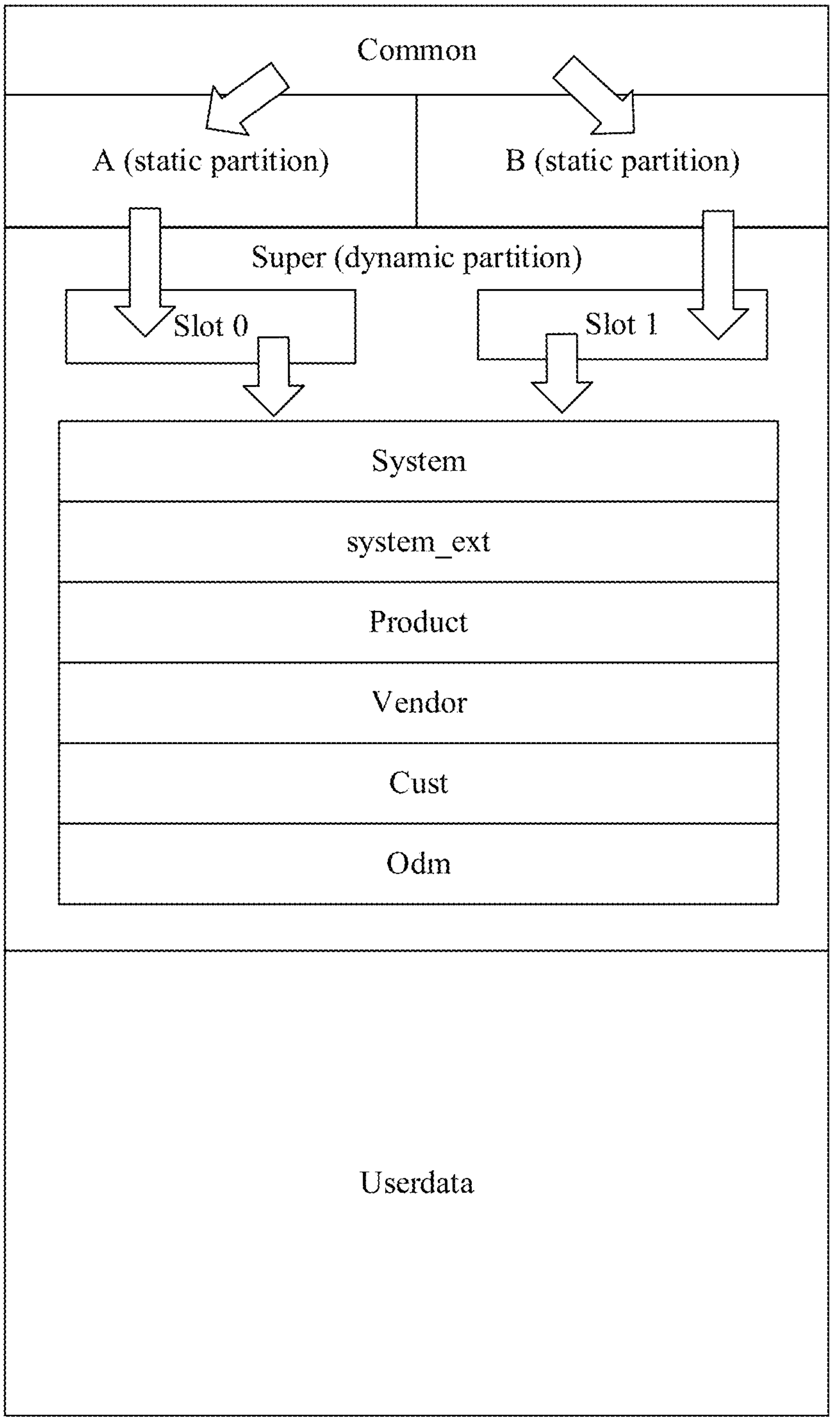
FIG. 5B is a schematic diagram of a structure of a programming system framework for system programming before a device leaves a factory in an application scenario.

Specifically, FIG. 5B is a schematic diagram of a structure of a programming system framework for system programming before a device leaves a factory in an application scenario. In an Android system in a virtual A/B upgrade manner, only the static partition uses the A/B solution, while the dynamic partition uses the solution of constructing a virtual dynamic partition during upgrade. Therefore, to match the static partition to the dynamic partition, as shown in FIG. 5B, in metadata (/supermetadata) of a header of the dynamic partition (Super), Slot 0 (data of a first slot) corresponding to the static partition (A) and Slot 1 (data of a second slot) corresponding to the static partition (B) are included. Slot 0 and Slot 1 are used to store a partition table of the Super partition.

For example, in the device startup sequence description in the MBR of the UFS, Slot 0 corresponds to starting from the static partition (A), and configuration Slot 1 corresponds to starting from the static partition (B). When the device starts, the device selects to obtain the partition information of the Super partition from either Slot 0 or Slot 1 based on different static partitions used for starting. For example, if the device starts from the static partition A, when the Super partition is loaded, the device first reads Slot 0 to obtain an address of a sub-partition of the Super partition; or if the device starts from the static partition B, when the Super partition is loaded, the device first reads Slot 1 to obtain an address of a sub-partition of the Super partition.

Specifically, Slot 0 and Slot 1 include a plurality of sub-partition description groups, and each sub-partition description group corresponds to a sub-partition of the Super partition. Each sub-partition description group includes the following items:

Name (Name), indicating a name of a sub-partition;

Group (Group), indicating a sub-partition type;

Attribute (Attributes), indicating a partition read-write attribute, for example, a readonly attribute (readonly);

Extents (Extents), indicating an address of a sub-partition (for example, a partition size and an offset).

In the Name item and the Group item, if a suffix of a value is _a, the value corresponds to the static partition (A); or if the suffix of the value is _b, the value corresponds to the static partition (B).

In case of starting from the static partition A, Slot 0 is read first when the Super partition is being loaded. When reading Slot 0, because a suffix _a corresponds to the static partition (A), the device reads a value of the Extents item in the partition description group whose Name item and/or Group item suffix is _a in Slot 0, so as to obtain the sub-partition address of the Super partition.

In case of starting from the static partition B, Slot 1 is read first when the Super partition is being loaded. When reading Slot 1, because a suffix_b corresponds to the static partition (B), the device reads values of the Extents item in the partition description group whose Name item and/or Group item suffix is _b in Slot 0, so as to obtain the sub-partition address of the Super partition.

The operating system upgrade package obtained in S510 includes partition information of the dynamic partition (Super) of version 1.2. In S530, the device extracts the partition information of the dynamic partition (Super) of version 1.2 from the operating system upgrade package, and updates partition information of Slot 1 corresponding to the static partition (B) by using the partition information of the dynamic partition (Super) of version 1.2.

The System sub-partition is used as an example. It is assumed that before S530, Slot 1 of /supermetadata of the dynamic partition (Super) includes the following content:

Metadata version: 10.2
Metadata size: 1300 bytes
Metadata max size: 65536 bytes
Metadata slot count: 3
Header flags: virtual_ab_device
Partition table: ------------------------
Name: system_b
Group: ry_dynamic_partitions_b
Attributes: readonly, updated
Extents: 0 . . . 6995967 linear super 2048

In the operating system upgrade package obtained in S510, the partition information of the dynamic partition (Super) of version 1.2 includes the following content:

Name: system
Group: ry_dynamic_partitions
Extents: 0 . . . 699XXXX linear super 2048

In S530, the device locates Slot 1 of /supermetadata of the dynamic partition (Super) corresponding to the static partition (B) by using the static partition (B) that currently needs to be upgraded, and updates content in Slot 1 by using the partition information of the dynamic partition (Super) of version 1.2. After S530, Slot 1 of the /supermetadata of the dynamic partition (Super) includes the following content:

Metadata version: 10.2
Metadata size: 1300 bytes
Metadata max size: 65536 bytes
Metadata slot count: 3
Header flags: virtual_ab_device
Partition table: ------------------------
Name: system_b
Group: ry_dynamic_partitions_b
Attributes: readonly, updated
Extents: 0 . . . 699XXXX linear super 2048

Further, in a process of performing S530, there is a case in which the performing of S530 fails. In this case, the device may interrupt an entire operating system upgrade operation, output an upgrade failure prompt (for example, displaying a dialog box indicating an upgrade failure) to the user, and automatically re-upgrade, or the user determines whether to upgrade again or abort the upgrade. (Refer to the writing failure of the static partition data in S520)

Specifically, when storage space of the user data partition (Userdata) is insufficient, the performing of S530 fails. In S530, in a process in which the device creates a virtual dynamic partition in the user data partition (Userdata) based on the operating system upgrade package, a size of the virtual dynamic partition is determined by a size of the data in the dynamic partition of version 1.2 in the operating system upgrade package. When free space in the user data partition (Userdata) is insufficient to create a virtual dynamic partition, the performing of S530 fails.

For example, in an application scenario, the device extracts the COW file from the operating system upgrade package, and writes the COW file into the Update folder of the user data partition (Userdata). The operating system upgrade package includes content of COW files and sizes of the COW files. In S530, the device first creates an empty COW file in the Update folder of the user data partition (Userdata) based on a COW file name and the COW file size in the operating system upgrade package, and then extracts COW file data from the operating system upgrade package and writes the COW file data into the empty COW file.

The "system" sub-partition is used as an example. In the operating system upgrade package, a COW file for the "system" sub-partition is named system-cow-img.img.0000, and a size of system-cow-img.img.0000 is XXXX. The device creates a system_b-cow file in the Update folder of the user data partition (Userdata). A size of the system_b-cow file is XXXX, and its content is empty. After the system_b-cow file is created, the device can extract system-cow-img.img.0000 from the system upgrade installation package, write system-cow-img.img.0000 into the system_b-cow file, and rename it as "system_b-cow-img.img.0000".

The device creates empty COW files system_b-cow, system_ext_b-cow, vendor_b-cow, product_b-cow, cust_b-cow, and odm_b-cow in the Update folder of the user data partition (Userdata). After all the empty COW files are created, the device may extract the COW file data from the system upgrade installation package, write it into the empty COW files, and rename the empty COW files.

The Update folder of the user data partition (Userdata) includes the following files:

system_b-cow-img.img.0000;
system_ext_b-cow-img.img.0000;
vendor_b-cow-img.img.0000;
product_b-cow-img.img.0000;
cust_b-cow-img.img.0000;
odm_b-cow-img.img.0000.

In a process of creating the empty COW files, the device creates one empty COW file each time, and creates a next empty COW file after one empty COW file is created successfully. In this process, when an empty COW file fails to be created, it indicates that the storage space of the user data partition (Userdata) is insufficient, the performing of S530 fails, and the operating system fails to be upgraded.

Further, in S530, a failure in extracting the COW file also causes that the performing of S530 fails. Specifically, in the operating system upgrade package, the COW file is stored in binary code. When the COW file is being written into the user data partition (Userdata), the COW file needs to be first extracted from the operating system upgrade package, the COW file is opened, and then the COW file data is written into the user data partition (Userdata). In the foregoing process, if a data error occurs to the operating system upgrade package and the COW file cannot be extracted or opened, the performing of S530 fails, and the operating system fails to be upgraded.

Further, in S530, a writing failure of the COW file also causes that the performing of S530 fails. To check whether the COW file is successfully written, in S530, after the COW file is written into the user data partition (Userdata), the dynamic partition (Super) and the COW file need to be verified as a whole to verify validity of the dynamic partition (Super) and the COW file, and verify whether a result of merging the dynamic partition (Super) data of a current version and the COW file is dynamic partition (Super) data of a new version.

Specifically, upgrading from version 1.1 to version 1.3 is used as an example. A hash value of a result merging data that does not need to be upgraded (data that does not change from version 1.1 to version 1.2) in the dynamic partition (Super) and data that needs to be upgraded (data that needs to be upgraded from version 1.1 to version 1.2) in the COW file is calculated to determine whether the hash value is the same as a hash value of complete data in the dynamic partition (Super) of version 1.3. If the two are the same, it indicates that the COW file is valid. If the two are different, it indicates that the COW file is invalid, the upgrade fails, the upgrade process is interrupted, and an error is reported. The hash value of the complete data in the dynamic partition (Super) of version 1.3 is stored in the operating system upgrade package.

Specifically, in a verification process, the dynamic partition (Super) and the COW file are merged based on the snapshot. In an implementation process of the snapshot, merging of the dynamic partition (Super) and the COW file is not physical merging, but merging of a whole file map of the "system" sub-partition and the COW file map of the COW file to generate a file map of sub-partition data of a new version.

For example, the file map of the "system" sub-partition:

/system/app/A0.XXX: 024010~024013;
/system/app/A1.XXX: 024014~024017;
/system/app/A2.XXX: 024018~024020;
/system/B0.XXX: 024021~024026;
/system/B1.XXX: 024027~024028;
/system/user/C0.XXX: 024029~024032;
/system/user/C1.XXX: 024033~024035;
/system/user/C2.XXX: 024036~024040;
/system/user/C3.XXX: 024041~024044 is merged with the COW file map:

/system/app/A2.XXX: 045033~045035;
/system/user/C2.XXX: 045036~045040 to obtain a file map of a new version of the "system" sub-partition:

/system/app/A0.XXX: 024010~024013;

(Point to A0.XXX under /system/app in the dynamic partition (Super))

/system/app/A1.XXX: 024014~024017;

(Point to A1.XXX under /system/app in the dynamic partition (Super))

/system/app/A2.XXX: 045033~045035;

(Point to A2.XXX in /Update/system_b-cow-img.img.0000 in the user data partition (Userdata))

/system/B0.XXX: 024021~024026;

(Point to B0.XXX under /system in the dynamic partition (Super))

/system/B1.XXX: 024027~024028;

(Point to B1.XXX under /system in the dynamic partition (Super))

/system/user/C0.XXX: 024029~024032;

(Point to C0.XXX under /system/user in the dynamic partition (Super))

/system/user/C1.XXX: 024033~024035;

(Point to C1.XXX under /system/user in the dynamic partition (Super))

/system/user/C2.XXX: 045036~045040;

(Point to C2.XXX in /Update/system_b-cow-img.img.0000 in the user data partition (Userdata))

/system/user/C3.XXX: 024041~024044.

(Point to C3.XXX under /system/user in the dynamic partition (Super))

In the file map of the new version of the "system" sub-partition, a storage address of /system/app/A2.XXX does not point to /system/app/A2.XXX in the dynamic partition (Super) in the memory, but to A2.XXX in system_b-cow-img.img.0000 in the user data partition (Userdata) in the memory. The storage address of /system/user/C2.XXX does not point to /system/user/C2.XXX in the dynamic partition (Super) in the memory, but to C2.XXX in the system_b-cow-img.img.0000 in the user data partition (Userdata) in the memory.

In a verification process, file maps of a new version of all sub-partitions of the dynamic partition (Super) are obtained in the foregoing merging manner (if a corresponding COW file of a sub-partition is not written into the user data partition (Userdata), a file map of the sub-partition is directly used as the file map of a new version). File maps of a new version of all sub-partitions are merged to generate a file system of a new version of the dynamic partition (Super).

The file system of a new version based on the dynamic partition (Super) reads data, reads all files included in the file system of a new version of the dynamic partition (Super), and calculates a hash value.

S531: Change a startup sequence of the device from starting from the static partition (A) to starting from the static partition (B).

For example, a start sequence identifier of a master boot record (Master Boot Record, MBR) is rewritten, and the start sequence identifier is rewritten from A to B. After the device is powered on, when the device reads that the startup sequence identifier is A, the device starts from the static partition (A), and loads the static partition (A) during startup; or when the device reads that the start sequence identifier is B, the device starts from the static partition (B), and loads the static partition (B) during startup.

Further, in S531, slot-b in the status mark of the static partition in the Common partition is marked as "bootable".

S532: The device restarts. Exit the current operating system, power off the device, and power on the device again.

S540: The device sequentially loads the basic partition (Common) and the static partition (B). Specifically, before loading the static partition (B), the device first determines, based on the status mark of the static partition (B), whether the static partition (B) can be used to start the operating system. For example, when the status mark of the static partition (B) is "bootable", the static partition (B) can be used to start the operating system; or when the status mark of the static partition (B) is "unbootable", the static partition (B) cannot be used to start the operating system.

S541: The device loads the dynamic partition (Super) and the virtual dynamic partition of the user data partition (Userdata).

Specifically, the device reads the merging status information in the metadata (/metadata), determines, based on the merging status information, whether to retrieve the COW file from a specified path of the user data partition (Userdata), and to load and merge the dynamic partition (Super) and the COW file by using the snapshot.

Further, in S541, the device does not load all COW files in the dynamic partition (Super) and the user data partition (Userdata), but loads a corresponding file based on an operating system startup requirement. Specifically, in S541, the device determines, based on the operating system startup requirement, a file that needs to be loaded, and extracts, based on the snapshot, a corresponding file from the COW file in the dynamic partition (Super) or the virtual dynamic partition for loading.

Specifically, in S541, when a corresponding COW file exists in the sub-partition of the dynamic partition (Super), a file map of a new version of each sub-partition of the dynamic partition (Super) is first generated based on the snapshot. For a process of generating a file map of a new version, refer to S530. The device determines a to-be-loaded file based on the operating system startup requirement, and loads the file based on the file map of a new version of the sub-partition of the dynamic partition (Super).

For example, when the operating system is starting, all data in a directory "user (/system/user)" under the "system" sub-partition needs to be loaded. The device reads the merging status information in the metadata (/metadata), and the sub-partition identifier of the "system" sub-partition in the merging status information is "wait for merge (wait for merge)". Therefore, the device searches for the COW file in /Update of the user data partition (Userdata), and after detecting the COW file system_b-cow-img.img.0000 in the Update, generates the file map of the new version of the "system" sub-partition based on the snapshot and the file map of the COW file in the system_b-cow-img.img.0000. The data is loaded based on storage addresses of all files under /system/user in the file map of the new version of the "system" sub-partition. For example, based on the file map of the new version of the "system" sub-partition:

/system/user/C0.XXX: 024029~024032;

/system/user/C1.XXX: 024033~024035;

/system/user/C2.XXX: 045036~045040;

/system/user/C3.XXX: 024041~024044.

C0.XXX under address 024029~024032, C1.XXX under address 024033~024035, C2.XXX under address 045036~045040, and C3.XXX under address 024041~024044 are loaded.

Further, when all data in the directory "user (/system/user)" under the "system" sub-partition is being loaded, if the sub-partition identifier of the "system" sub-partition in the merging status information is "merged (merged)", the device does not search for the COW file in the /Update in the user data partition (Userdata), but directly loads all data in the directory "user (/system/user)" under the "system" sub-partition.

Further, when all data in the directory "user (/system/user)" under the "system" sub-partition is loaded, when the sub-partition identifier of the "system" sub-partition in the "system" sub-partition in the merging status information is "wait for merge (wait for merge)", if the device does not find a COW file corresponding to the "system" sub-partition in the user data partition (Userdata) /Update, it indicates a data writing error (COW file writing error or writing error in the merging status information) in an upgrade process, and in this case, the device rolls back and reports an error.

Further, in S541, before loading a file, the device further needs to verify the to-be-loaded file. Different from S530, in S541, the dynamic partition (Super) and the COW file are not verified as a whole, but only the file that needs to be loaded is verified. For example, verification is performed based on dmverity (dm-verity is a target (target) of dm (device mapper), is a virtual block device, and is specifically used for verification of a file system). If the verification succeeds, the file is loaded. If the verification fails, the device is restarted, and the system is rolled back or the device attempts to reload the file.

S550: The device starts successfully and displays a user interaction interface.

S551: The device merges data in the virtual dynamic partition to the dynamic partition (Super).

In the description of the specification of this application, a merging operation means that in an operating system upgrade process, a dynamic partition (Super) upgrade file (COW file) stored in a virtual dynamic partition of the user data partition (Userdata) is written into the dynamic partition (Super), to upgrade data in the file in the dynamic partition (Super), so that the device does not need to load the dynamic partition (Super) and the virtual dynamic partition at a next startup, and device startup may be completed only by loading the dynamic partition (Super).

Specifically, the device performs a power-on broadcast after a successful startup, and starts an upgrade process after the power-on broadcast. The upgrade process reads the merging status information in the metadata (/metadata) of the basic partition (Common). If the merging status information is "merged (merged)", the device enters a normal startup mode.

If the merging status information is "wait for merge (wait for merge)", the upgrade process will merge the COW file in the user data partition (Userdata) to the dynamic partition (Super).

Specifically, in the upgrade process, the upgrade data in the COW file in the user data partition (Userdata) is written into a corresponding address in the dynamic partition (Super), so that all data in the dynamic partition (Super) is data of a new version after upgrade.

For example, data under address 045033~045035 is written into address 024014~024017 based on /system/app/A2.XXX: 024018~024020 in the file map of the "system" sub-partition and /system/app/A2.XXX: 045033~045035 in the COW file map, and data under address 045036~045040 is written into address 024036~024040 based on /system/user/C2.XXX: 024036~024040 in the file map of the "system" sub-partition and /system/user/C2.XXX: 045036~045040 in the COW file map.

After that, in the upgrade process, the COW file in the user data partition (Userdata) is deleted, and storage space is returned to the user data partition (Userdata). In addition, the merging status information in the metadata (/metadata) of the basic partition (Common) is changed from "wait for merge (wait for merge)" to "merged (merged)".

In S520, a data operation of a static partition upgrade is specific to operating system data in the static partition (B), which does not affect operating system data in a currently started static partition (A). In addition, in S530, a data operation of a dynamic partition upgrade is completed on the virtual dynamic partition created in the user data partition (Userdata), which does not affect the currently mounted dynamic partition (Super). Therefore, in an entire operating system upgrade process, the user may normally use the device. In addition, after S531 is completed, the device does not need to restart immediately, and the user may select a restart time. In this way, an upgrade process of the operating system does not affect a normal mobile phone operation of the user, thereby greatly improving user experience. Further, for the dynamic partition (Super), a virtual dynamic partition is created in the user data partition (Userdata) only when an upgrade needs to be performed. Therefore, utilization of data storage space is effectively improved.

A logically feasible application solution for rewriting VC for an operating system with a partition structure shown in FIG. 4 as follows: Based on the procedure shown in FIG. 3, an operating system upgrade package is stored in the user data partition (Userdata), where the operating system upgrade package includes new VC and mirror data in each partition in the data storage structure shown in FIG. 4. After the device restarts, the device enters a recovery (Recovery) mode. In the recovery (Recovery) mode, the device reads the operating system upgrade package stored in the user data partition (Userdata), restores the mirror data in the operating system upgrade package to each partition, and rewrites VC stored in the Common partition by using VC in the operating system upgrade package.

However, in an Android system in a virtual A/B upgrade manner, to ensure security of user data, data stored in the user data partition (Userdata) is encrypted, and the data stored in the user data partition (Userdata) can be accessed only when an Android system is normally started. That is, after the device restarts and enters the recovery (Recovery) mode, the device cannot access the data stored in the user data partition (Userdata). In this way, the device cannot read the operating system upgrade package in the recovery (Recovery) mode.

Figure 6A:
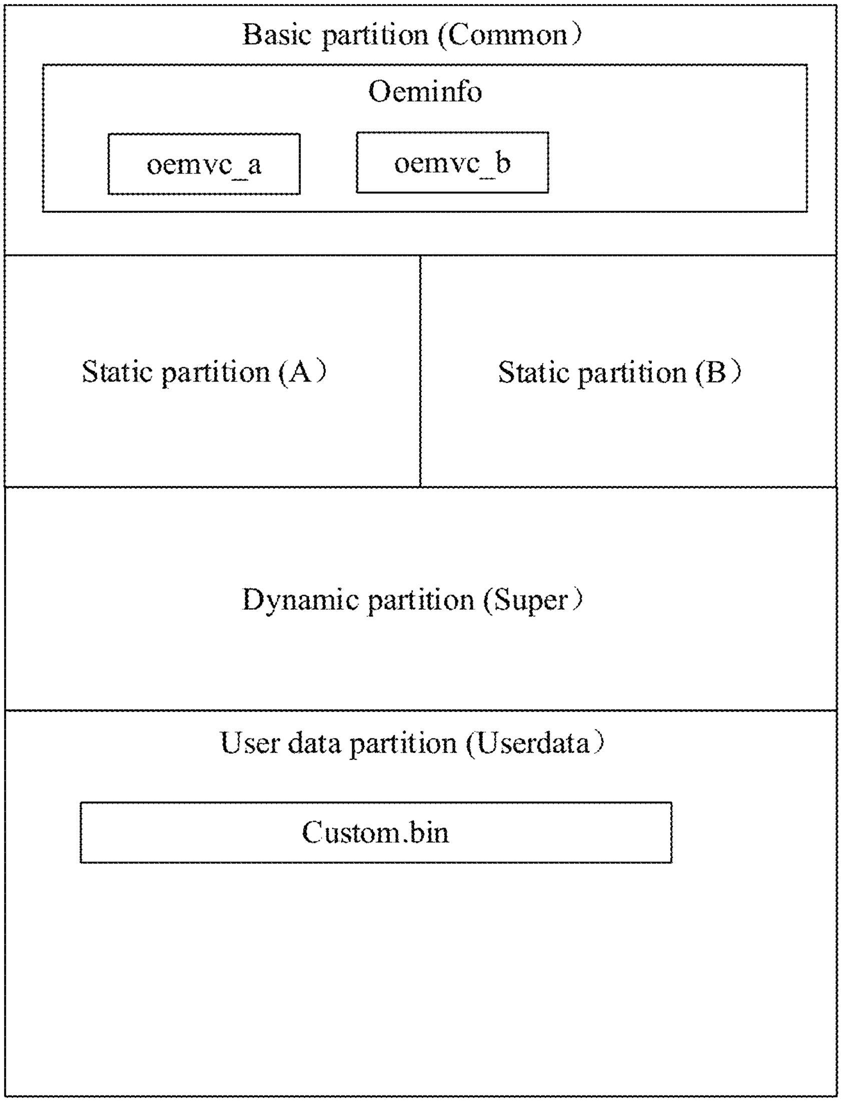
FIG. 6A is a schematic diagram of a data storage structure according to an embodiment of this application.

To resolve the foregoing problem, this application provides a method for upgrading an operating system based on a virtual A/B upgrade. Two sets of VC are stored in the Common partition. For example, as shown in FIG. 6A, oemvc_a (the first vendor country file) and oemvc_b (the second vendor country file) are stored in an oeminfo sub-partition. In a process of starting an operating system, if the operating system is started from a static partition (A) (the first static partition), oemvc_a is read and loaded when VC needs to be loaded. If the operating system is started from a static partition (B) (the second static partition), oemvc_b is read and loaded when VC needs to be loaded.

Specifically, an operation upgrade operation is completed by an operating system update program installed on the device. Specifically, an upgrade package obtaining tool (update apk clent) and an upgrade engine (update engine) are two modules in the operating system. The upgrade package obtaining tool (update apk clent) is used to obtain an upgrade installation package of an operating system, download the upgrade package of the operating system, and store the upgrade package to the user data partition (Userdata). Refer to S210.

For example, the upgrade package obtaining tool (update apk clent) periodically initiates a packet search request to a packet search server, where the packet search request includes information such as a current operating system version number (for example, version 1.1) of the device, a device SN number, a product number, and a vendor country (for example, version 1.1). The package search server retrieves, based on the operating system version number in the package search request, whether an operating system installation package (for example, version 1.2) with an updated version number exists on an installation package server. When an operating system installation package of an updated version exists, the packet search server feeds back a download address (for example, a URL address) of the operating system upgrade package (for example, an operating system upgrade package used for upgrading from version 1.1 to version 1.2) and a filelist file corresponding to the system upgrade installation package to the upgrade package obtaining tool (update apk clent). The upgrade package obtaining tool (update apk clent) downloads the operating system upgrade package from the installation package server based on the download address of the operating system upgrade package.

After the upgrade package obtaining tool (update apk clent) obtains the operating system upgrade package, the upgrade engine (update engine) is started, and the upgrade engine (update engine) upgrades the operating system based on the operating system upgrade package.

Specifically, after the upgrade package obtaining tool (update apk clent) obtains the operating system upgrade package, the upgrade package obtaining tool (update apk clent) sets a start attribute of the upgrade engine (update engine), and sets the start attribute to "true". A service servicemanger that resides in a background of the operating system monitors the startup attribute of the upgrade engine (update engine) 302. When the servicemanger detects that the startup attribute of the upgrade engine (update engine) is "true", the servicemanger starts the upgrade engine (update engine).

The upgrade package obtaining tool (update apk clent) obtains a status of the upgrade engine (update engine) through binder communication. When the upgrade package obtaining tool (update apk clent) determines that the upgrade engine (update engine) is successfully started, the upgrade package obtaining tool (update apk clent) transfers an upgrade parameter to the upgrade engine (update engine) (for example, the current upgrade operation is a file update operation or a file merging operation), and triggers the upgrade engine (update engine) to enter an upgrade procedure. For a specific upgrade procedure, refer to S520 to S551.

FIG. 6B(1)-FIG. 6B(2) are a flowchart of upgrading an operating system according to an embodiment of this application. Current VC of the device is a first vendor country, for example, all cn. Specifically, as shown in FIG. 6A, oemvc_a in a sub-partition (for example, an oeminfo sub-partition) of the Common partition of the device is the first vendor country (all cn). In a process in which the device normally starts the operating system, the device loads the Common partition, the static partition (A), and a dynamic partition, and starts the operating system from the static partition (A). In a process of loading the static partition (A), an initialization (init) step is performed. In the initialization step, VC content in oemvc_a is read and loaded. For example, all cn is read from oemvc_a, and all cn is written into a global variable cmdline).

When VC of the device needs to be rewritten into a second vendor country, for example, cmcc cn, the device needs to write VC content in oemvc_b as cmcc cn, and the device starts from the static partition (B) when the device starts. The device performs the procedure shown in FIG. 6B(1)-FIG. 6B(2) to rewrite VC.

S1400: The upgrade server pushes and releases an operating system upgrade package used to modify VC.

Specifically, VC data in the operating system upgrade package is stored in a root directory of the operating system upgrade package in a form of a targe_vendor_country.mbn file, and content of the targe_vendor_country.mbn file is the VC data, for example, "all/cn" and "cmcc/cn".

Specifically, the operating system upgrade package includes VC data (cmcc cn) of the second vendor country. That is, the targe_vendor_country.mbn file (the third-vendor country file) exists in the root directory of the operating system upgrade package, and the content of the targe_vendor_country.mbn file is "cmcc/cn".

Further, in some application scenarios, when the operating system performs customization processing on different VC, the operating system upgrade package further includes operating system upgrade data (including static partition upgrade data and dynamic partition upgrade data). An operating system version corresponding to the operating system upgrade data matches the VC data in the operating system upgrade package.

For example, for All cn (the first vendor country), an operating system corresponding to All cn is a general-purpose operating system: an operating system of version 1.0 (no customized application of any network service provider is embedded) (the first operating system). For cmcc cn (the second vendor country), an operating system corresponding to cmcc cn is a customized operating system (the second operating system) of China Mobile: an operating system of version 1.01 (a customized application of China Mobile is embedded). Therefore, the operating system upgrade package includes corresponding operating system upgrade data used to upgrade the operating system of version 1.0 to the operating system of version 1.01. For specific content of the operating system upgrade data, refer to content of the operating system upgrade package in the upgrade procedure shown in FIG. 5A(1)-FIG. 5A(2).

The device sequentially loads the basic partition (Common), the static partition (A), and the dynamic partition (Super), and starts from the static partition (A). S1400 may be performed after the device starts, or may be performed before the device starts. When the device starts from the static partition (A), the update apk clent performs S1410 to obtain the operating system upgrade package. For a process of obtaining the operating system upgrade package, refer to S510.

The update apk clent performs S1411 to trigger the update engine to enter the upgrade process.

In the upgrade process, the update engine performs S1420 to verify the operating system upgrade package. Specifically, it is verified whether a digital signature of the operating system upgrade package is valid, to determine whether the operating system upgrade package is a valid upgrade package.

After the operating system upgrade package passes the verification, the update engine performs S1421 to upgrade the data in the static partition (B) and the dynamic partition, and to modify a device startup sequence based on the operating system upgrade package. For details, refer to S520, S530, and S531.

The update engine performs S1422 to determine whether the current operating system upgrade package is an operating system upgrade package used to modify VC.

If the current operating system upgrade package is the operating system upgrade package used to modify VC, the update engine performs S1423, and writes the latest version of VC in the operating system upgrade package into oemvc_b.

After the update engine completes the upgrade operation in S1423, the update engine performs S1424, and returns status information of the upgrade operation to the update apk clent.

S1430: The update apk clent triggers a device restart (restart for the first time) (the third restart). For example, the update apk clent prompts the user with a pop-up box, and the user chooses to restart immediately or later.

The device starts the operating system (the second operating system) from the static partition (B) after the restart for the first time. Refer to S540 and S541.

In a process of loading the static partition (B), the device performs the initialization (init) step. In the initialization step, the device performs S1440 to determine VC that needs to be loaded currently. Specifically, it is determined that oemvc_a needs to be loaded or that oemvc_b needs to be loaded.

In S1440, the device determines to-be-loaded VC based on the currently loaded static partition. The device starts from the static partition (B) after the restart for the first time. Therefore, in S1440, it is determined that oemve_b corresponding to the static partition (B) needs to be loaded currently. The device performs S1441 to load oemvc_b.

Then, the device performs S1442 to start supervision of initialization (cust_init), to determine whether factory settings need to be restored.

In the upgrade process of the operating system, a merging operation is to merge the dynamic partition upgrade data in the user data partition (Userdata) to the dynamic partition. After factory settings are restored, the data in the user data partition (Userdata) may be cleared. This makes it impossible to complete the subsequent merging operation if factory settings are restored without merging. Therefore, in S1442, the device first determines, based on a current operating system startup status, whether factory settings need to be restored. Currently, a merging operation has not been performed, and upgrading of the operating system is not completed. Therefore, in S1442, it is determined that the device does not need to restore factory settings. Therefore, the device may perform S1443 to continue to perform subsequent initialization and data loading operations, to complete loading of the static partition (B) and the dynamic partition (Super), so as to start the operating system from the static partition (B).

After the device starts from the static partition (B), the device performs S1450 to send a power-on broadcast.

In this case, if merging status information is "wait for merge (wait for merge)", the update apk clent performs S1451, and the update apk clent triggers the update engine to enter a merge procedure.

S1452: The update engine performs the merge procedure. Refer to S551.

After the merge is completed, the update engine performs S1455, and the update engine triggers a device restart (restart for the second time) (the fourth restart).

After the restart for the second time, the device sequentially loads the basic partition (Common), the static partition (B), and the dynamic partition (Super), and starts from the static partition (B).

After the restart for the second time, in a process of loading the static partition (B), the device performs the initialization (init) step. The device performs S1440 again to determine VC that needs to be loaded currently. Refer to the description about performing S1440 for the first time. After the restart for the second time, the device starts from the static partition (B). Therefore, oemvc_b needs to be loaded currently. The device performs S1441 to load oemvc_b.

Then, the device performs S1442 again to start the supervision of initialization (cust_init), to determine whether factory settings need to be restored.

Because the merging operation is currently performed, in S1442, it is further determined, based on other conditions, whether factory settings need to be restored.

Specifically, in a process in which the device starts the operating system, when VC (oem vc) of the device operating system does not match Custom.bin stored in the Userdata, an error may occur in running the operating system. Therefore, in the supervision of initialization (cust_init) step, when the status of the current operating system is "merged", it is required to verify whether VC of the operating system matches Custom.bin stored in the Userdata. If VC does not match Custom.bin, it is required to restore factory settings and reconfigure an operating system parameter.

Specifically, in S1442, when the current merging status is "merged", it is determined whether currently loaded oemvc_b matches the current configuration of the device (Custom.bin stored in the Userdata).

Current oemvc_b has been updated with VC of a new version (the second vendor country). However, a current configuration of the device (Custom.bin stored in the Userdata) is generated based on original oemvc_a (the first vendor country) of the operating system. Therefore, oemvc_b does not match Custom.bin, and the Custom.bin device needs to restore factory settings.

Therefore, the device performs S1460 to trigger a device restart (restart for the third time) (the first restart).

After the restart for the third time, the device enters a recovery (Recovery) mode. In the Recovery mode, the device performs S1461 to restore factory settings.

After the device completes factory settings, the device performs S1462 to trigger a device restart (restart for the fourth time) (the second restart).

After the restart for the fourth time, the device loads the basic partition (Common), the static partition (B), and the dynamic partition (Super), and starts from the static partition (B).

After the restart for the fourth time, in a process of loading the static partition (B), the device performs the initialization (init) step. The device performs S1440 again to determine VC that needs to be loaded currently.

After the restart for the fourth time, the device starts from the static partition (B). Therefore, oemvc_b needs to be loaded currently. The device performs S1441 to load oemvc_b.

Then, the device performs S1442 again to start the supervision of initialization (cust_init), to determine whether factory settings need to be restored.

Because a merging operation is currently performed, in S1442, it is further determined whether currently loaded oemvc_b matches the current configuration (Custom.bin stored in Userdata) of the device. At this step, because the device restores factory settings in S1461, Custom.bin stored in the Userdata is deleted during factory settings restoration. Therefore, the device cannot read Custom.bin, and Custom.bin does not exist in the current Userdata. When the device cannot read Custom.bin, the device does not need to restore factory settings.

When the device cannot read Custom.bin, the device performs S1445 to create Custom.bin, and to write oemvc_b into Custom.bin.

Then, the device performs S1443 to continue to perform subsequent initialization and data loading operations, to complete loading of the static partition (B) and the dynamic partition (Super), so as to start from the static partition (B).

After the device starts from the static partition (B), the device performs S1450 to send a power-on broadcast. The update apk clent determines that the merge is completed and the operating system is upgraded.

According to the method of the embodiment shown in FIG. 6B(1)-FIG. 6B(2), modification may be implemented for an operating system using a virtual A/B upgrade solution. According to the method in the embodiment shown in FIG. 6B(1)-FIG. 6B(2), no additional modification tool needs to be configured. The device may perform a modification operation by downloading the operating system upgrade package, thereby greatly simplifying a modification procedure and reducing difficulty of the modification.

Further, according to the method in the embodiment shown in FIG. 6B(1)-FIG. 6B(2), data in the static partition and the dynamic partition may be updated at the same time of vendor country modification, so that the operating system is upgraded to a corresponding customized operating system version at the same time of vendor country modification, thereby avoiding a plurality of operating system upgrade operations, greatly simplifying the operating system upgrade procedure, and improving user experience.

Figure 7A:
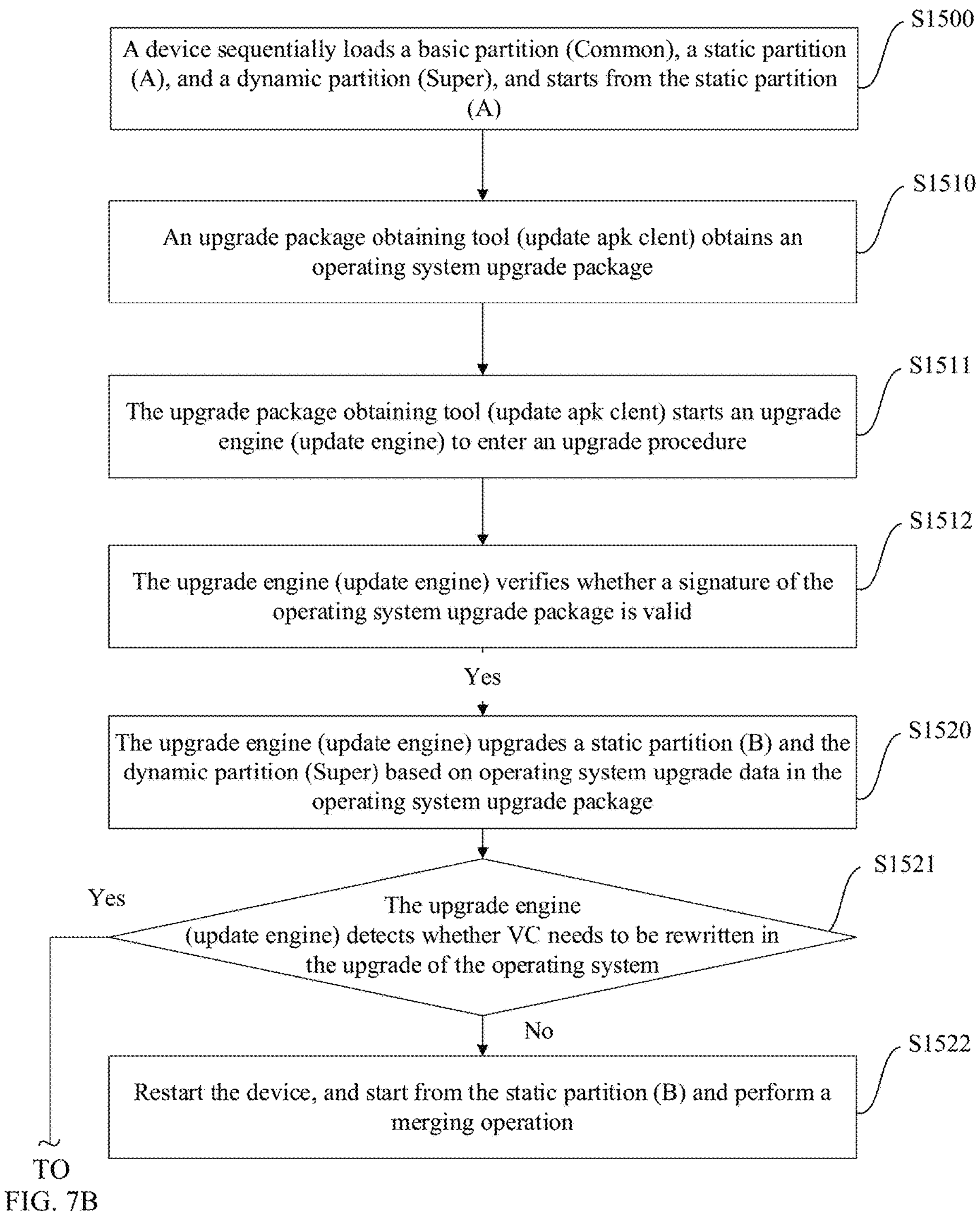
FIG. 7A-FIG. 7B are a partial flowchart of upgrading an operating system according to an embodiment of this application.
Figure 7B:
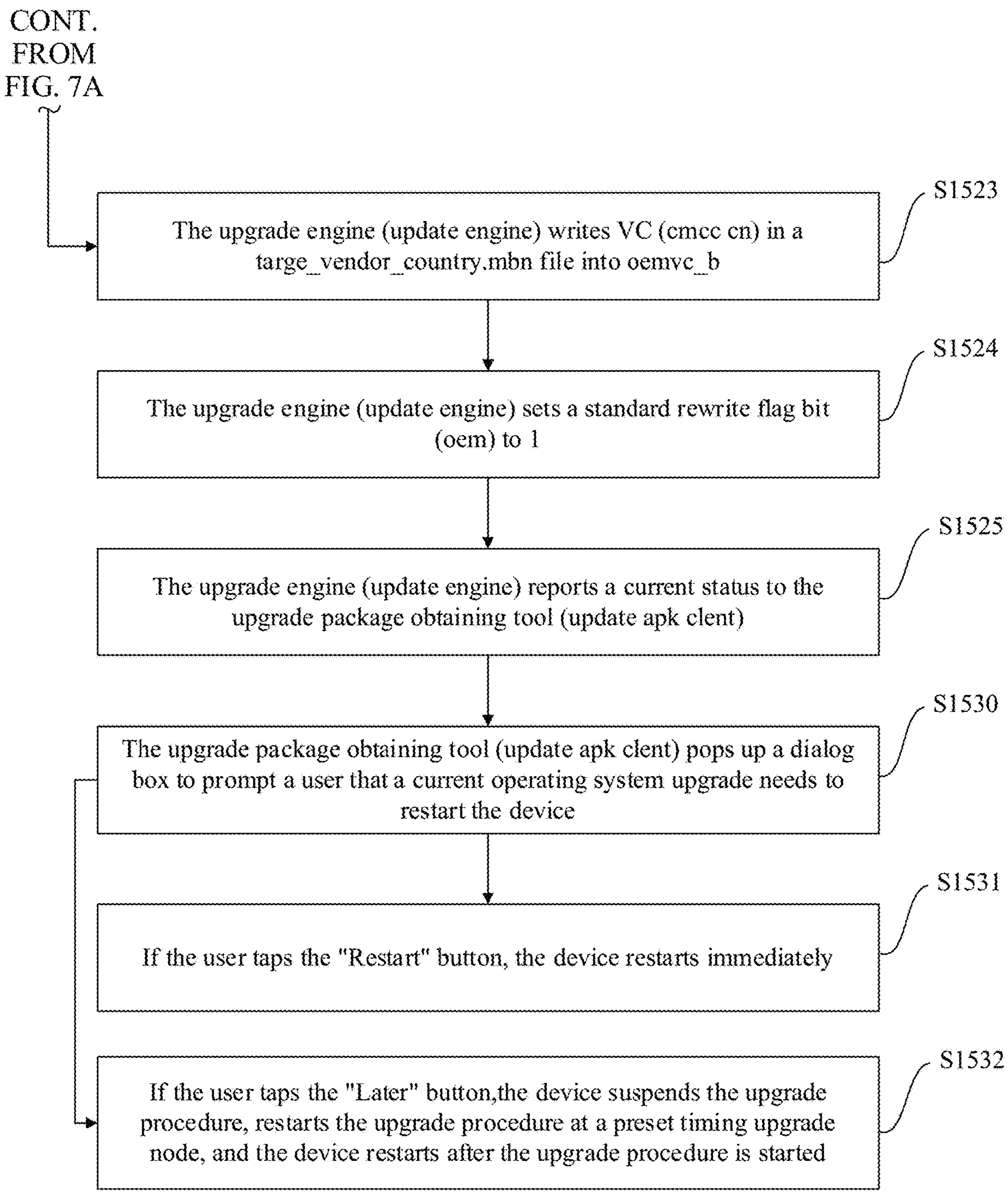

Specifically, FIG. 7A-FIG. 7B are a partial flowchart of upgrading an operating system according to an embodiment of this application. The device performs the procedure shown in FIG. 7A-FIG. 7B to implement an operation before the restart for the first time in the procedure shown in FIG. 6B(1)-FIG. 6B(2).

S1500: A device sequentially loads a basic partition (Common), a static partition (A), and a dynamic partition (Super), and starts from the static partition (A).

S1510: An upgrade package obtaining tool (update apk clent) obtains an operating system upgrade package. For a process of obtaining the operating system upgrade package, refer to S510. For a specific file structure of the operating system upgrade package, refer to the description in S600.

S1511: The upgrade package obtaining tool (update apk clent) starts an upgrade engine (update engine) to enter an upgrade procedure.

S1512: The upgrade engine (update engine) verifies whether a signature of the operating system upgrade package is valid.

After the operating system upgrade package passes signature verification, the upgrade engine (update engine) performs S1520, and upgrades the static partition (B) and the dynamic partition (Super) based on the operating system upgrade data in the operating system upgrade package. For details, refer to S520, S530, and S531.

After S1520 (after the upgrade engine (update engine) performs S520, S530, and S531), the upgrade engine (update engine) further performs the following steps:

S1521: Determine whether the current operating system upgrade package is an operating system upgrade package used to modify VC. Specifically, it is detected whether a targe_vendor_country.mbn file (the third vendor country file) exists in a root directory of the operating system upgrade package obtained in S1510.

If the targe_vendor_country.mbn file does not exist in the root directory of the operating system upgrade package, it indicates that VC does not need to be rewritten in the operating system upgrade, and S1522 is performed to restart the device, to start from the static partition (B), and to perform the merging operation. Refer to S532 to S551.

If the targe_vendor_country.mbn file exists in the root directory of the operating system upgrade package, it indicates that VC needs to be rewritten in the operating system upgrade, and S1523 is performed to write VC (cmcc cn) of the targe_vendor_country.mbn file into oemvc_b.

S1524: Set a vendor country rewrite flag bit (oem) to 1 (the first value).

The vendor country rewrite flag bit (oem) is used to identify whether a new vendor country is written. That the vendor country rewrite flag bit (oem) is set to 1 (the first value) indicates that the new vendor country is written. That the vendor country rewrite flag bit (oem) is set to 0 (the second value) indicates that the new vendor country is not written.

The vendor country rewrite flag bit (oem) may be stored in metadata (/metadata) of the Common partition, or may be stored in a sub-partition (for example, an oeminfo sub-partition) that is used to store oem-vc in the Common partition.

Further, in an actual application scenario, an execution sequence of S1523 and S1524 does not need to be limited. In another embodiment, S1524 may be performed before S1523.

After S1524, the upgrade engine (update engine) performs S1525 to report a current status (oemvc_b write is completed) to the upgrade package obtaining tool (update apk clent).

After receiving the status report of the upgrade engine (update engine), the upgrade package obtaining tool (update apk clent) performs S1530 to pop up a dialog box to prompt the user that a current operating system upgrade needs to restart the device.

Specifically, S1511 to S1524 may be performed in a background while the user is normally using the mobile phone.

Figure 8A:
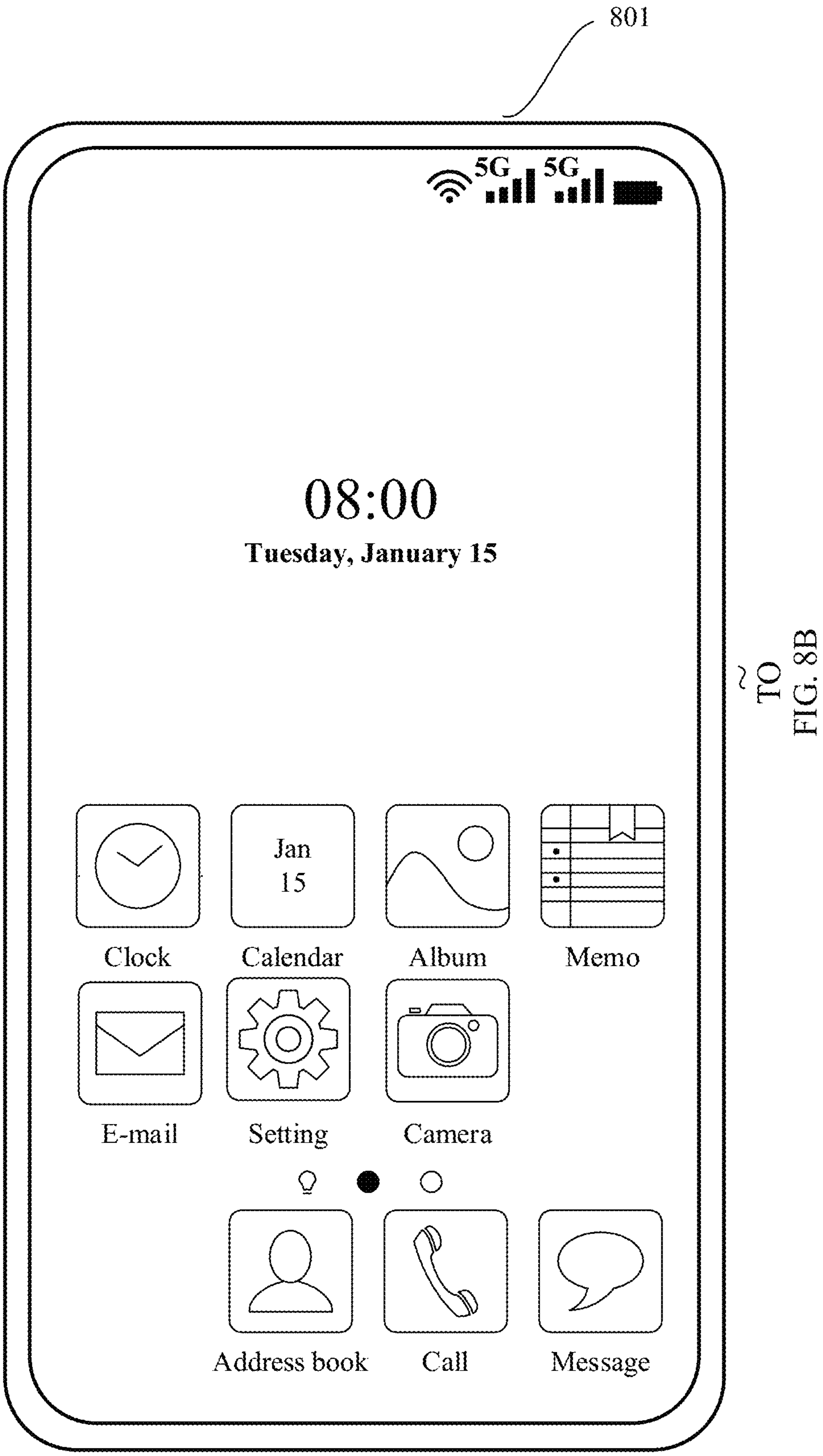
FIG. 8A-FIG. 8C are a schematic diagram of running interfaces of a mobile phone according to an embodiment of this application.
Figure 8B:
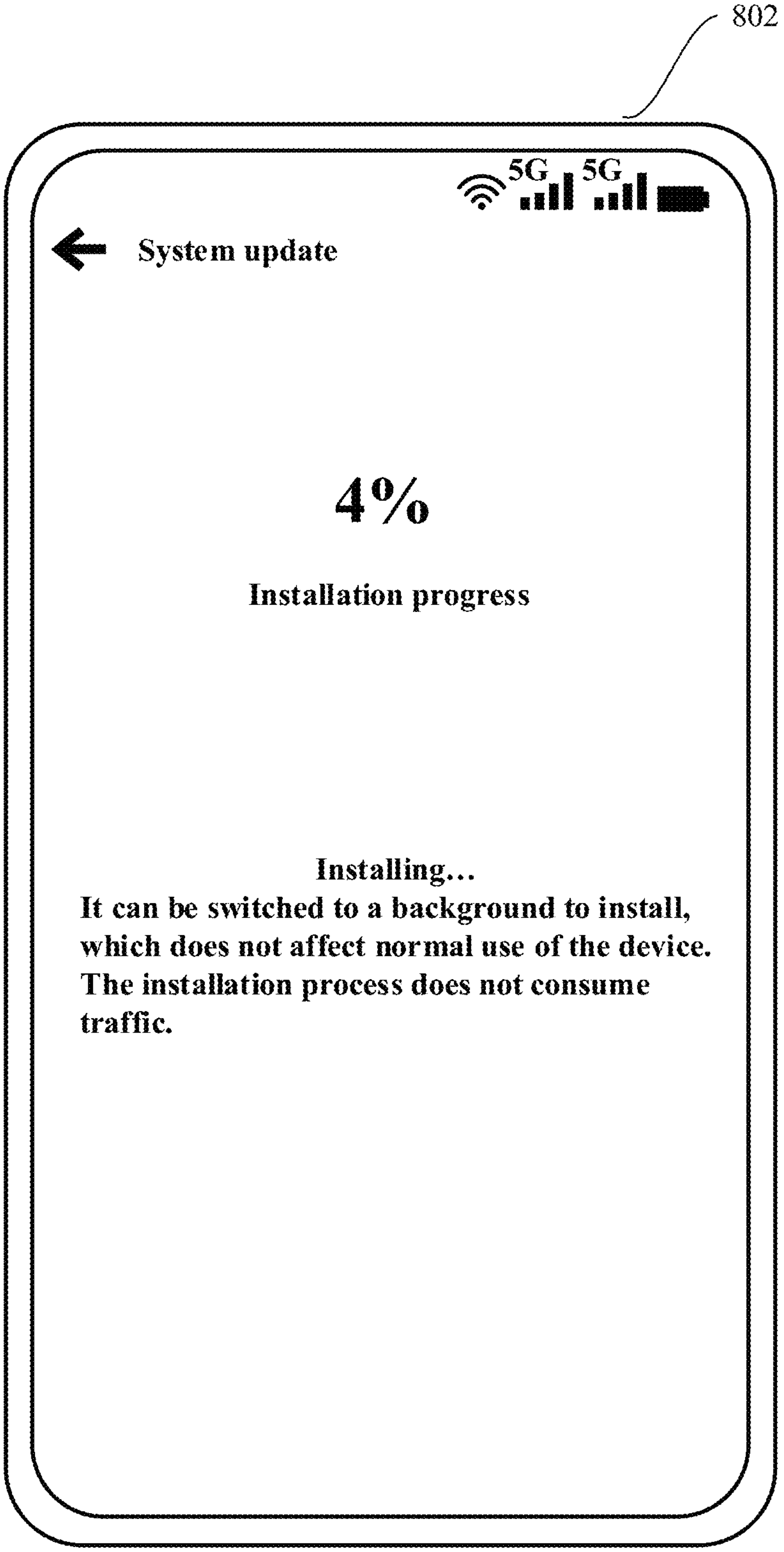
Figure 8C:
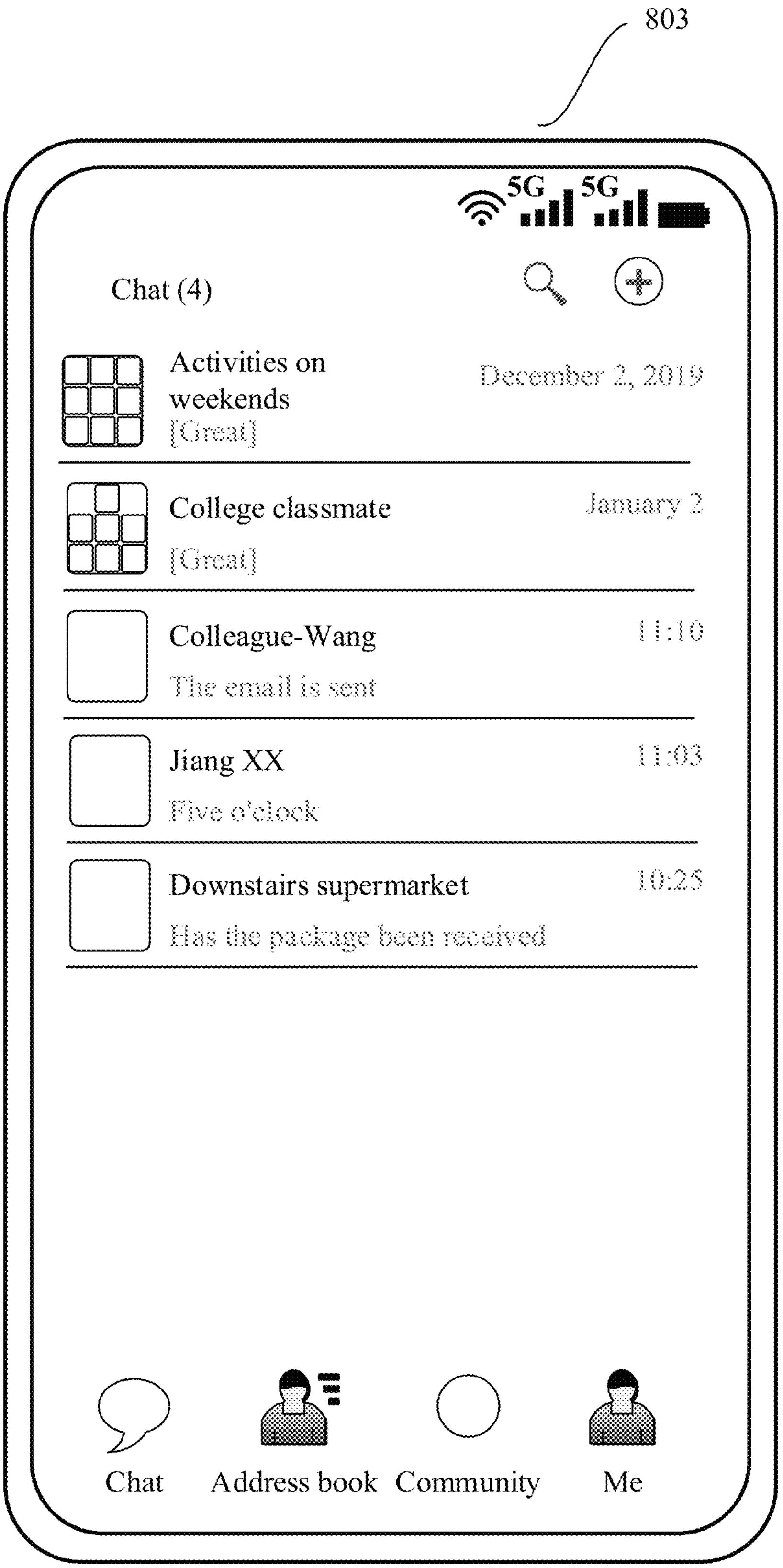

Specifically, FIG. 8A-FIG. 8C are a schematic diagram of running interfaces of a mobile phone according to an embodiment of this application. After the mobile phone successfully starts the operating system, the mobile phone displays a system interface shown in 801 in FIG. 8A-FIG. 8C. When the mobile phone upgrades the operating system, the user may invoke an interface shown in 802 in FIG. 8A-FIG. 8C, so as to display an operating system upgrade progress to the user. The user may also close the operation interface shown in 802 in FIG. 8A-FIG. 8C, and normally use the mobile phone. After the user closes the interface shown in 802, S711 to S724 are performed in the background. For example, the mobile phone displays an interface shown in 801 or 803.

In S730, when the mobile phone needs to be restarted, the mobile phone outputs a restart prompt to the user, and the user determines whether to restart immediately.

Figure 9A:
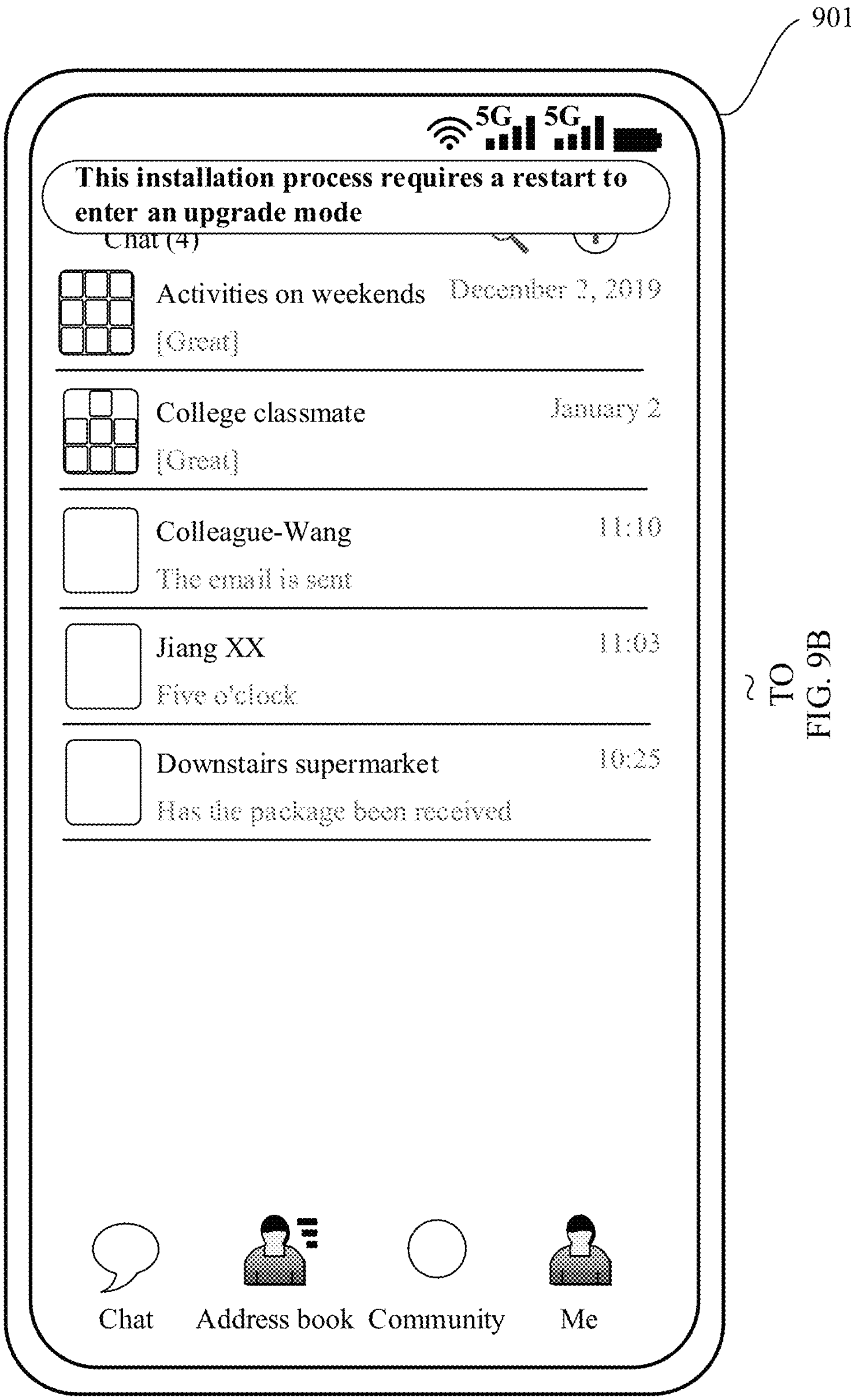
FIG. 9A-FIG. 9C are a schematic diagram of running interfaces of a mobile phone according to an embodiment of this application.
Figure 9B:
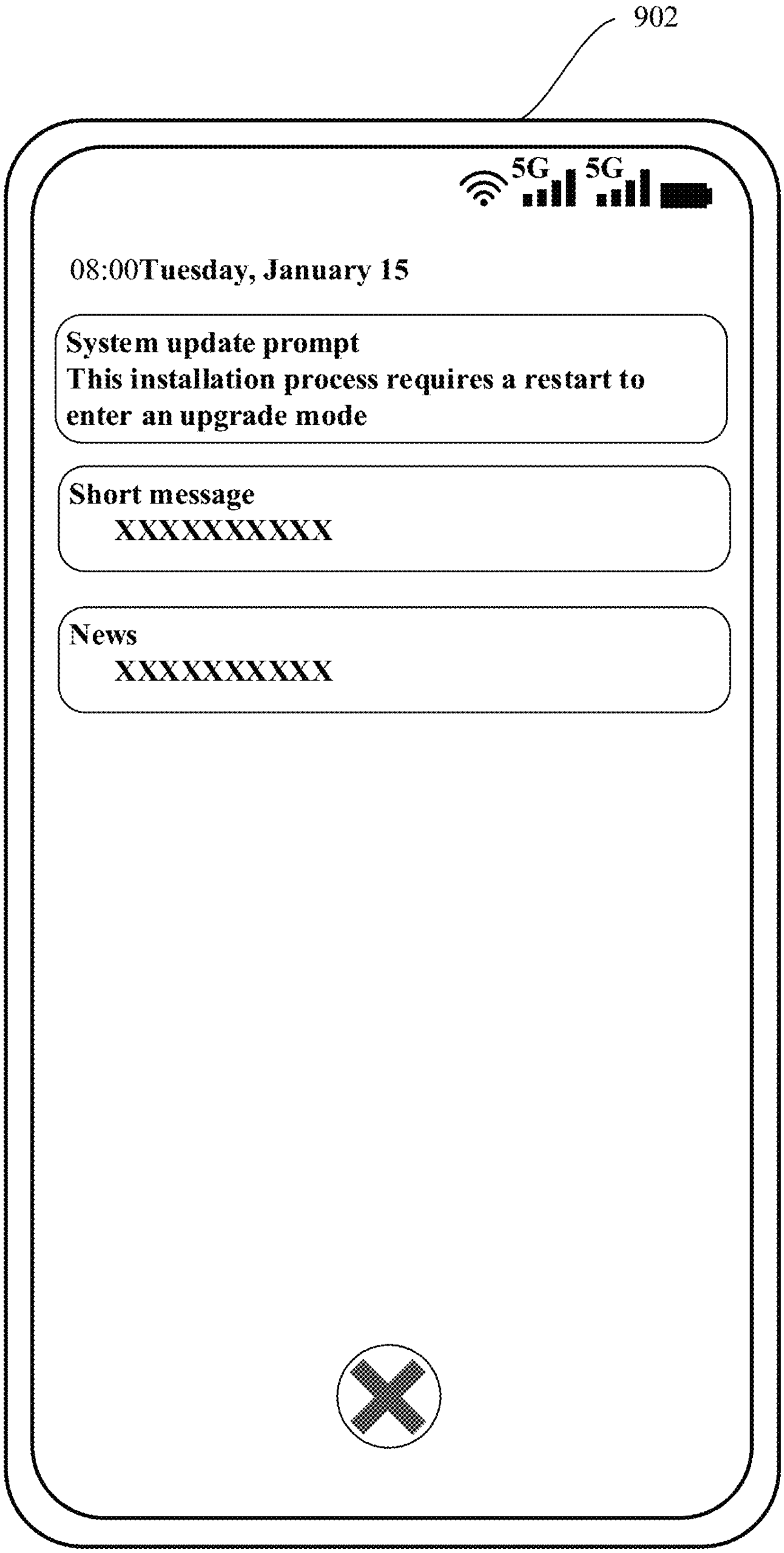
Figure 9C:
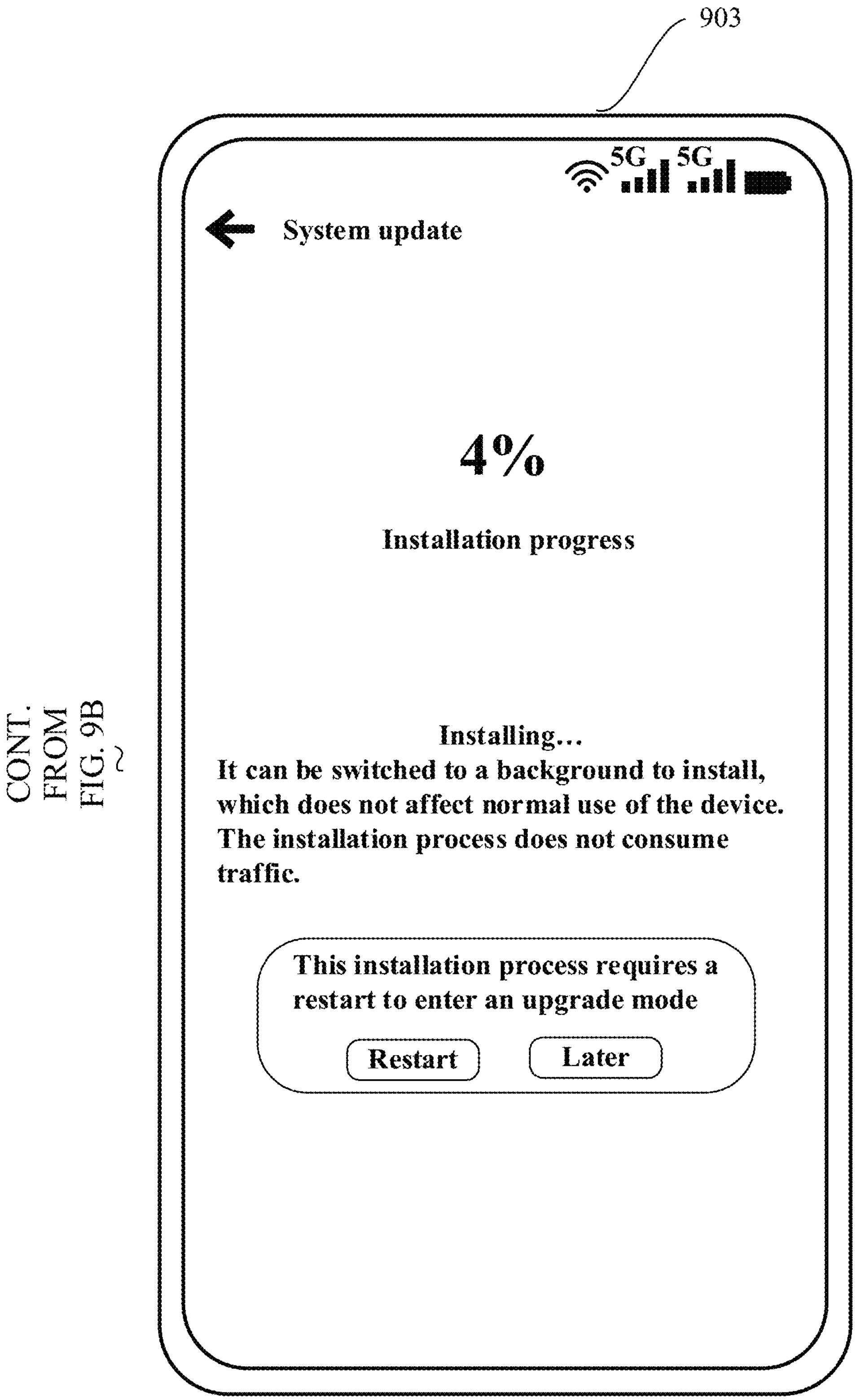

For example, FIG. 9A-FIG. 9C are a schematic diagram of running interfaces of a mobile phone according to an embodiment of this application. The mobile phone currently displays the interface shown in 802 in FIG. 8A-FIG. 8C, and displays the operating system upgrade progress to the user. In S730, the mobile phone displays an interface shown in 903 in FIG. 9A-FIG. 9C, and the user determines to restart immediately or later.

For another example, the mobile phone currently displays the interface shown in 803 in FIG. 8A-FIG. 8C, and the user uses a chat application. In S730, the mobile phone displays an interface shown in 901 in FIG. 9A-FIG. 9C, and a prompt notification is popped up. The user taps the prompt notification to enter the interface shown in 903 in FIG. 9A-FIG. 9C, and the user determines to restart immediately or to restart later. Alternatively, the user opens a drop-down notification bar, and the mobile phone displays an interface shown in 902 in FIG. 9A-FIG. 9C. In the drop-down notification bar, the user taps a prompt notification to enter the interface shown in 903 in FIG. 9A-FIG. 9C, and the user determines to restart immediately or later.

Further, in S730, if the user taps the "Restart" button to perform S731, the device restarts immediately.

In S730, if the user taps the "Later" button to perform S732, the device suspends the upgrade procedure, restarts the upgrade procedure at a preset timing upgrade node, and the device restarts after the upgrade procedure is started.

Figure 10:
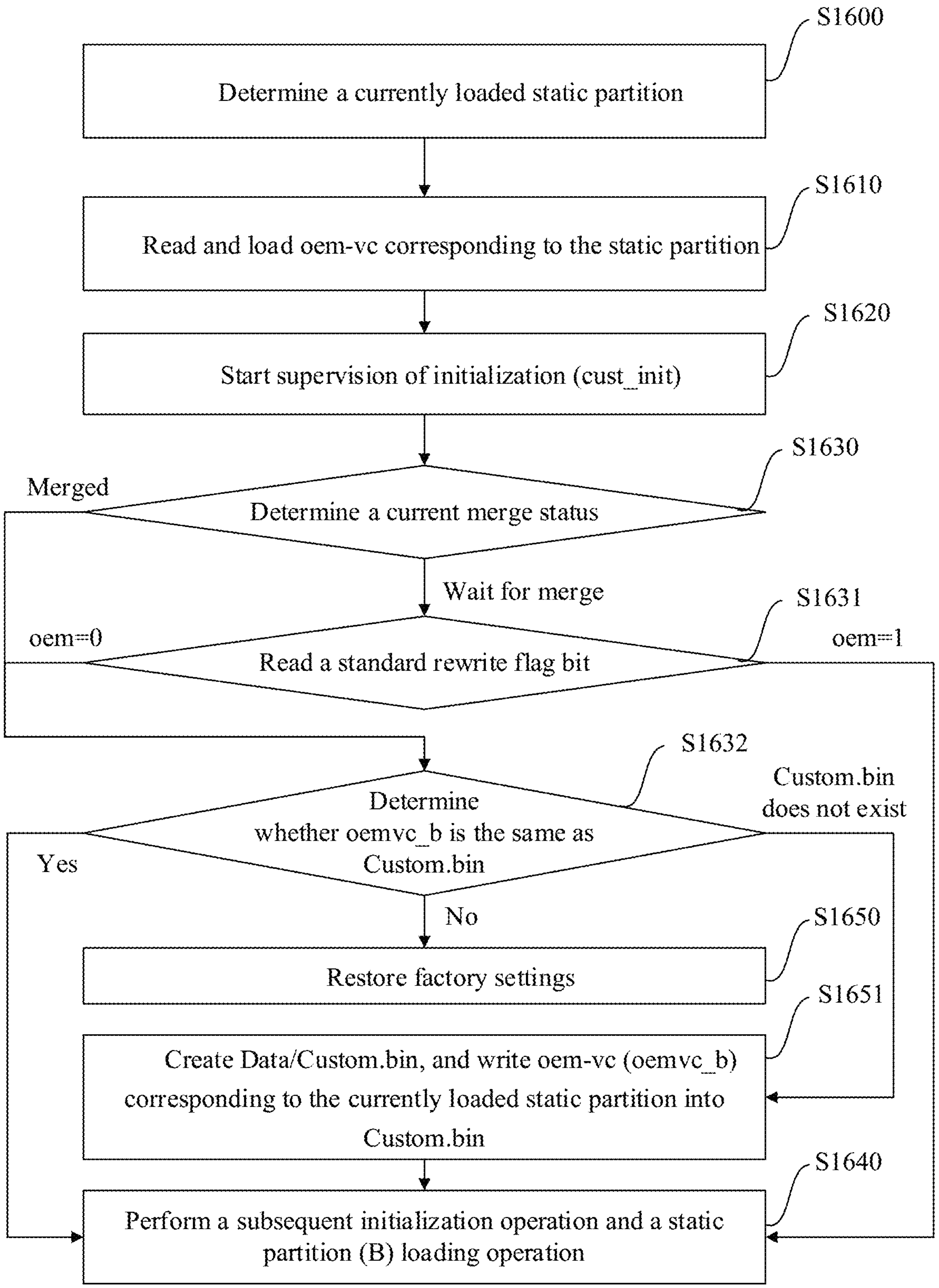
FIG. 10 is a partial flowchart of upgrading an operating system according to an embodiment of this application.

FIG. 10 is a partial flowchart of upgrading an operating system according to an embodiment of this application. The device performs steps shown in FIG. 10 to implement an initialization step in the procedure shown in FIG. 6B(1)-FIG. 6B(2).

Specifically, in S1520, the upgrade engine (update engine) upgrades the static partition (B) and the dynamic partition (Super) (the upgrade engine (update engine) performs S531) based on the operating system upgrade data in the operating system upgrade package. Therefore, after S1531 or S1132, the device starts the operating system from the static partition (B) after a restart. For a startup procedure of the operating system, refer to S540 and S541. In a process in which the device loads the static partition (B), the device performs the initialization (init) step, and in the initialization (init) step, the device performs the following steps shown in FIG. 10:

S1600: Determine a currently loaded static partition. For example, the currently loaded static partition is the static partition (B).

S1610: Read and load oem-vc corresponding to the static partition. Specifically, the currently loaded static partition is the static partition (B), and oemvc_b (cmcc cn) is written into a global variable cmdline.

S1620: Start supervision of initialization (cust_init). For performing of S1620, refer to S1442.

Further, to avoid that the device accidentally skips a factory settings restoration step due to misjudgment, in S1620, it is determined, based on a merging status, whether to restore the factory settings (determining, based on whether operating system VC and Custom.bin are the same, whether to restore the factory settings), and it is further determined whether to restore the factory settings based on whether a new vendor country needs to be written before the startup. Specifically, in S1620, the following steps are performed.

S1630: Determine a current merging status, for example, read the merging status information in the metadata partition (/metadata) of the basic partition (Common). In S1520, the upgrade engine (update engine) upgrades the static partition (B) and the dynamic partition (Super) based on the operating system upgrade data in the operating system upgrade package (the upgrade engine (update engine) performs S530). Therefore, in S1630, the merging status information is "wait for merge (wait for merge)".

When the merging status information is "wait for merge (wait for merge)", S1631 is performed to read the vendor country rewrite flag bit (oem). In S1524, the vendor country rewrite flag bit (oem) is set to 1. Therefore, in S1631, the vendor country rewrite flag bit "oem" is 1.

When oem=1, the device performs S1640 to perform subsequent initialization operation and static partition (B) loading operation (and does not further determine whether to restore factory settings).

After the device loads the static partition (B), the device continues to load the dynamic partition to start the operating system. Refer to S541 and S550.

Figure 11A:
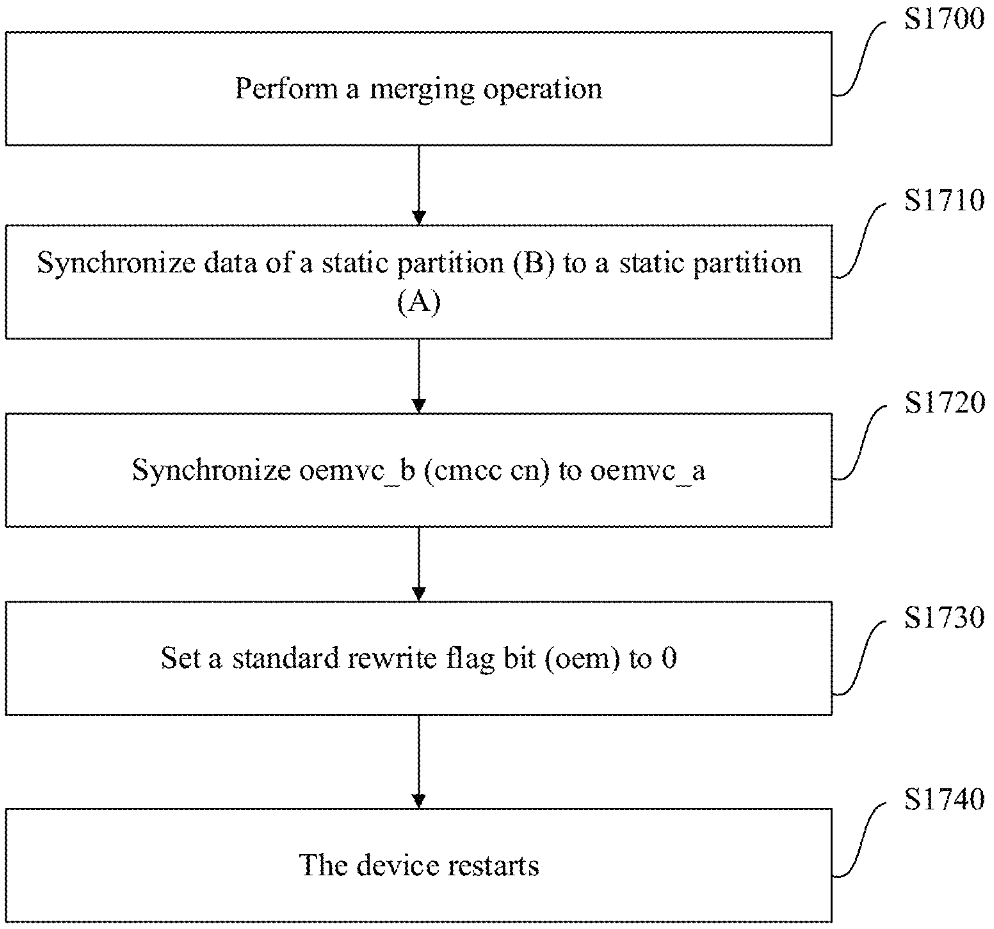
FIG. 11A is a partial flowchart of upgrading an operating system according to an embodiment of this application.

FIG. 11A is a partial flowchart of upgrading an operating system according to an embodiment of this application. The device performs the procedure shown in FIG. 11A to implement an operation before the restart for the second time in the procedure shown in FIG. 6B(1)-FIG. 6B(2). After the operating system starts running (after S550 or S643), the system sends a power-on broadcast to start the upgrade package obtaining tool (update apk clent). Because the merging status information is "wait for merge (wait for merge)", the upgrade package obtaining tool (update apk clent) triggers and performs the merging operation. The upgrade package obtaining tool (update apk clent) starts the upgrade engine (update engine), and the upgrade engine (update engine) performs the following operations as shown in FIG. 11A:

S1700: Perform a merging operation. Refer to S551 (after S551, the merging status information is "merged (merged)"). S1730: Set a vendor country rewrite flag bit (oem) to 0 (the second value).

After S1730, the upgrade engine (update engine) triggers a device restart (S1740).

Further, to start from both the static partition (A) and the static partition (B) successfully after the operating system is upgraded, before S1740, the upgrade engine (update engine) further performs the following steps.

S1710: Synchronize data in a static partition (B) to a static partition (A). Refer to 1110.

S1720: Synchronize oemvc_b (cmcc cn) to oemvc_a. Specifically, oemvc_a is rewritten from All cn to cmcc cn.

Specifically, this application imposes no specific limitation on a specific implementation of S1710, and a person skilled in the art may implement S1710 in a plurality of feasible implementations.

For example, FIG. 11B(1)-FIG. 11B(2) are a partial flowchart of upgrading an operating system according to an embodiment of this application. The device performs the following procedure shown in FIG. 11B(1)-FIG. 11B(2) to implement S1710.

S1800: Read description data (the parameter is pre-stored in the device before the device leaves the factory) related to partition tables in a memory of the device, and synthesize a total partition table of the memory.

A universal flash storage (Universal Flash Storage, UFS) in a master boot record (Master Boot Record, MBR) format is used as an example. The partition table (Dpt) is obtained by reading a size and location information of each partition in the UFS from the MBR (master boot sector, a first sector of the UFS, that is, 0 cylinder 0 head 1 sector of a C/H/S address) of the UFS.

S1810: Read all static sub-partitions with suffix _b from the total partition table, and generate a list 1 for describing each sub-partition of a static partition (B), where the list 1 includes a name and an address of each sub-partition of the static partition (B). For example:

TABLE 1

| Number | Sub-partition name | Sub-partition address (file path) | Selected status |
|---|---|---|---|
| 1 | bootloader__b | /dev/block/by-name/bootloader__b | 0 |
| 2 | boot__b | /dev/block/by-name/boot__b | 0 |
| 3 | vendor__boot__b | /dev/block/by-name/vendor__boot__b | 0 |
| 4 | dtbo__b | /dev/block/by-name/dtbo__b | 0 |
| 5 | vbmeta__b | /dev/block/by-name/vbmeta__b | 0 |

S1820: Read all static sub-partitions with suffix _a from the total partition table, and generate a list 2 for describing each sub-partition of the static partition (A), where the list 2 includes a name and an address of each sub-partition of the static partition (A). For example:

TABLE 2

| Number | Sub-partition name | Sub-partition address (file path) |
|---|---|---|
| 1 | bootloader_a | /dev/block/by-name/bootloader_a |
| 2 | boot_a | /dev/block/by-name/boot_a |
| 3 | vendor_boot_a | /dev/block/by-name/vendor_boot_a |
| 4 | dtbo_a | /dev/block/by-name/dtbo_a |
| 5 | vbmeta_a | /dev/block/by-name/vbmeta_a |

It should be noted herein that, in Table 1 and Table 2, addresses of the sub-partitions are represented in a file path manner. In an actual application scenario, a person skilled in the art may describe the addresses of the sub-partitions in a plurality of manners. For example, a linear address description is used.

S1830: Select an unselected sub-partition (the first sub-partition) from the list 1 to obtain a name (name of the first sub-partition) and an address (the first file path) of the sub-partition.

Specifically, before S1830, none of sub-partitions in the list 1 is selected. In S1830, sub-partitions may be sequentially selected based on a sequence (number sequence) of sub-partitions in list 1, or may be randomly selected from all sub-partitions that are not selected.

Further, after a sub-partition is selected, the sub-partition is marked for subsequently determining whether the sub-partition has been selected. For example, as shown in Table 1, a selected status column is added to Table 1, and an initial value of a selected state is 0. If a sub-partition is selected, the selected state is changed to 1.

S1840: Perform suffix-removal matching on the selected sub-partitions in S1830 and each sub-partition in the list 2; and determine a sub-partition name (name of the second sub-partition) in the list 2 that is the same as a name of the selected sub-partition in S1830 after suffixes are removed, and a sub-partition address (the second file path) corresponding to the second sub-partition name in the list 2.

S1841: Read data under a first file path.

S1842: Rewrite the read data into a second file path.

S1850: Determine whether there is an unselected sub-partition in the list 1; and if yes, return to step S1830 and reselect the first sub-partition; or if no, synchronization of the static partition is completed.

Table 1 and Table 2 are used as examples. In an application scenario, the device performs the following procedure:

selecting the first sub-partition (bootloader_b sub-partition of number 1) whose selected state is 0 in Table 1, and modifying the selected state of the number 1 to 1;

performing, by using bootloader_b, suffix-removal matching on all sub-partition names in Table 2. Because bootloader_a is the same as bootloader_b after _a and _b are removed respectively, bootloader_a (the second sub-partition) is matched according to bootloader_b;

reading a file path /dev/block/by-name/bootloader_b (the first file path) corresponding to bootloader_b from Table 1;

reading a file path /dev/block/by-name/bootloader_a (the second file path) corresponding to bootloader_a from Table 2;

reading data under /dev/block/by-name/bootloader_b and rewriting the read data into /dev/block/by-name/bootloader_a;

because a sub-partition whose selected state is 0 still exists in Table 1, selecting a first sub-partition whose selected state is 0 in Table 1 (boot_b sub-partition of number 2), and changing the selected state of number 2 to 1;

performing, by using boot_b, suffix-removal matching on all sub-partition names in Table 2. Because boot_a is the same as boot_b are after _a and_b are removed respectively, boot_a is matched according to boot_b;

reading a file path /dev/block/by-name/boot_b corresponding to boot_b from Table 1;

reading a file path /dev/block/by-name/boot_a corresponding to boot_a from Table 2;

reading data under /dev/block/by-name/boot_b and rewriting the read data into /dev/block/by-name/boot_a;

because a sub-partition whose selected state is 0 still exists in Table 1, selecting a first sub-partition whose selected state is 0 in Table 1 (vendor_boot_b sub-partition of number 3), and changing the selected state of number 3 to 1;

performing, by using vendor_boot_b, suffix-removal matching on all sub-partition names in Table 2. Because vendor_boot_a is the same as vendor_boot_b after _a and _b are removed respectively, vendor_boot_a is matched according to vendor_boot_b;

reading a file path /dev/block/by-name/vendor_boot_b corresponding to vendor_boot_b from Table 1;

reading a file path /dev/block/by-name/vendor_boot_a corresponding to vendor_boot_a from Table 2;

reading data under /dev/block/by-name/vendor_boot_b and rewriting the read data into /dev/block/by-name/vendor_boot_a;

because a sub-partition whose selected state is 0 still exists in Table 1, selecting a first sub-partition whose selected state is 0 in Table 1 (dtbo_b sub-partition of number 4), and changing the selected state of number 4 to 1;

performing, by using dtbo_b, suffix-removal matching on all sub-partition names in Table 2. Because dtbo_a is the same as dtbo_b after_a and_b are removed respectively, dtbo_a is matched according to dtbo_b;

reading a file path /dev/block/by-name/dtbo_b corresponding to dtbo_b from Table 1;

reading a file path /dev/block/by-name/dtbo_a corresponding to vendor_boot_a from Table 2;

reading data under /dev/block/by-name/dtbo_b and rewriting the read data into /dev/block/by-name/dtbo_a;

because a sub-partition whose selected state is 0 still exists in Table 1, selecting a first sub-partition whose selected state is 0 in Table 1 (vbmeta_b sub-partition of number 5), and changing the selected state of number 5 to 1;

performing, by using vbmeta_b, suffix-removal matching on all sub-partition names in Table 2. Because vbmeta_a is the same as vbmeta_b after_a and _b are removed respectively, vbmeta_a is matched according to vbmeta_b;

reading a file path /dev/block/by-name/vbmeta_b corresponding to vbmeta_b from Table 1;

reading a file path /dev/block/by-name/vbmeta_a corresponding to vendor_boot_a from Table 2;

reading data under /dev/block/by-name/vbmeta_b and rewriting the read data into /dev/block/by-name/vbmeta_a; and because a sub-partition whose selected state is 0 does not exist in Table 1, synchronization of the static partition is completed.

After S1740, in S1520, the upgrade engine (update engine) upgrades the static partition (B) and the dynamic partition (Super) based on the operating system upgrade data in the operating system upgrade package (the upgrade engine (update engine) performs S531). In addition, in the procedure shown in FIG. 10 and FIG. 11A, a start sequence of the device is not modified. Therefore, after S1740, the device starts the operating system from the static partition (B) after a restart. For a startup procedure of the operating system, refer to S540 and S541. In a process in which the device loads the static partition (B), the device performs the initialization (init) step, and in the initialization (init) step, the device performs the steps shown in FIG. 10 again.

Specifically, the merging operation is performed in S1700, and the merging status information is "merged (merged)". Therefore, after S1650, in S1630 that is performed again, the merging status information is "merged (merged)".

When the merging status information is "merged (merged)", S1632 is performed to determine whether VC corresponding to the currently loaded static partition is the same as customized information (Data/Custom.bin) in the user data partition (Userdata). Specifically, the currently loaded static partition is the static partition (B), and the corresponding VC is oemvc_b (cmcc cn). Because Data/Custom.bin has not been rewritten in the previous procedure, in S1632, Custom.bin corresponds to oemvc_a (All cn) before S1720, and oemvc_b (cmcc cn) is different from Custom.bin.

Further, when the merging status information is "wait for merge (wait for merge)", S1631 is performed to read the vendor country rewrite flag bit (oem). When oem=0, S1632 is also performed.

When VC (oemvc_b) corresponding to the currently loaded static partition (static partition (B)) is different from the customized information (Data/Custom.bin) in the user data partition (Userdata), the device performs S1650 to restore factory settings.

Figure 12:
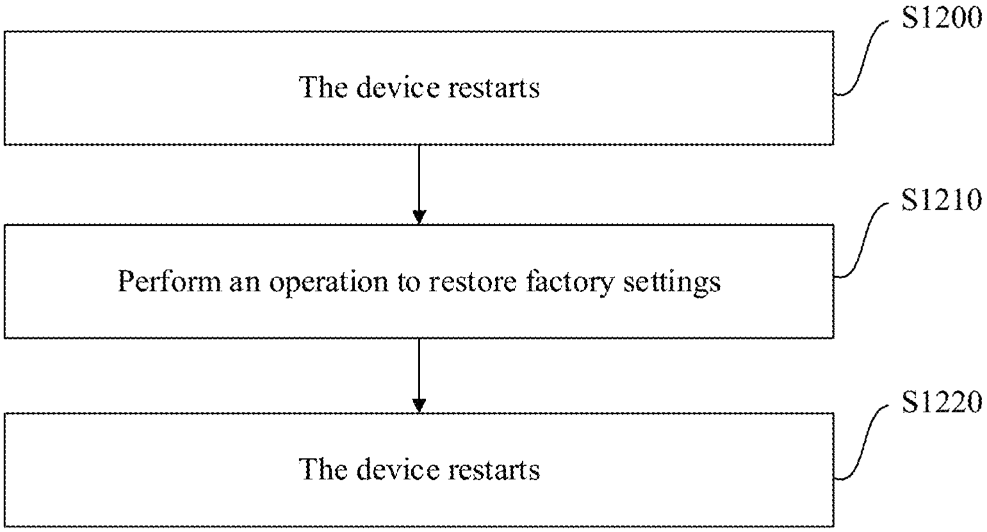
FIG. 12 is a partial flowchart of upgrading an operating system according to an embodiment of this application.

FIG. 12 is a partial flowchart of upgrading an operating system according to an embodiment of this application. In S1650, the device performs the following steps shown in FIG. 12:

S1200: The device restarts.

S1210: Perform an operation to restore factory settings, including:

formatting data/metadata/cache; and deleting data/Custom.bin.

S1220: The device restarts after factory settings are restored.

After S1220, the device starts the operating system from the static partition (B) after restart. For a startup procedure of the operating system, refer to S540 and S541. In a process in which the device loads the static partition (B), the device performs the initialization (init) step, and in the initialization (init) step, the device performs the steps shown in FIG. 10 again.

Specifically, because Data/Custom.bin is deleted in S1650, Data/Custom.bin does not exist in S1632 that is performed again.

When Data/Custom.bin does not exist, the device performs S1651 to create Data/Custom.bin, and to write oem-vc (oemvc_b) corresponding to the currently loaded static partition into Custom.bin.

After S1651, the device performs S1640 to perform a subsequent initialization operation and a static partition (B) loading operation. In S1700, the device completes the merging operation. Therefore, after the device loads the static partition (B), the device loads the dynamic partition (Super) normally, and the operating system starts normally.

Further, in the embodiment shown in FIG. 6, in the initialization step after the restart for the second time, it is determined whether factory settings need to be restored, and it is determined that factory settings need to be restored. In another feasible solution, the determining, whether factory settings need to be restored may be skipped after the restart for the second time. After the restart for the second time, the device directly enters the recovery (Recovery) mode. In the Recovery mode, the device restores factory settings.

Figure 13A:
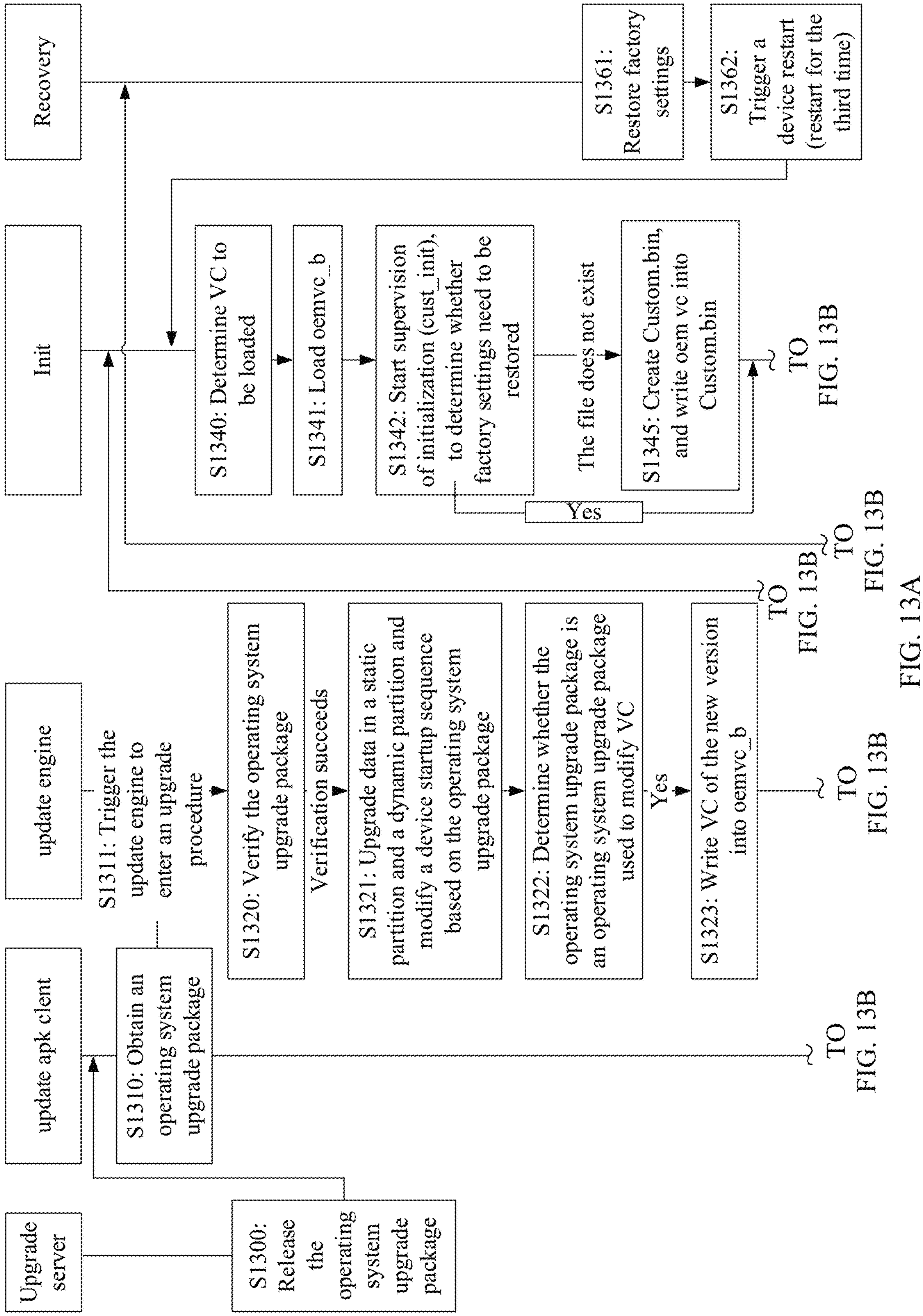
FIG. 13A-FIG. 13B are a flowchart of upgrading an operating system according to an embodiment of this application.
Figure 13B:
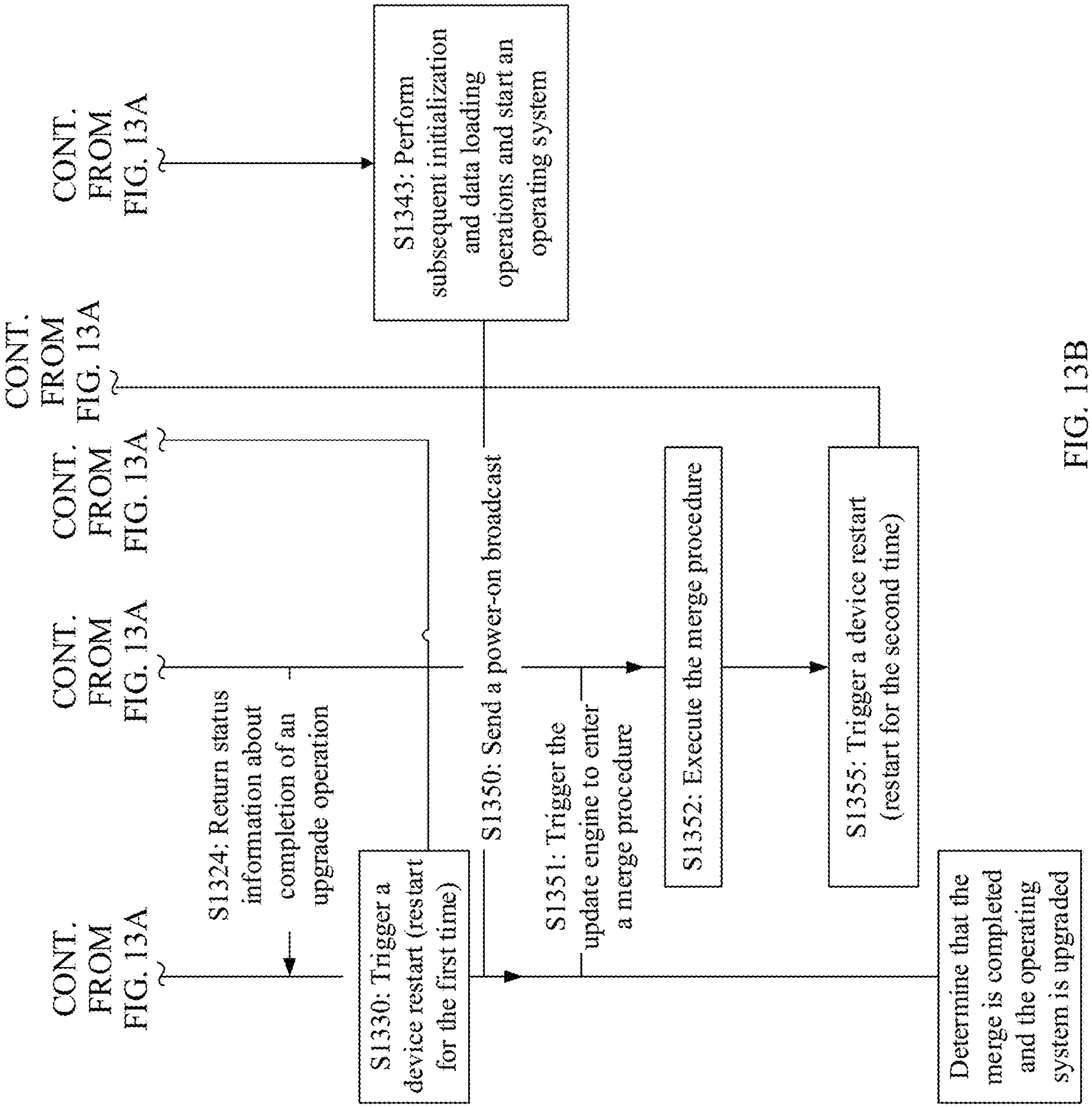

FIG. 13A-FIG. 13B are a flowchart of upgrading an operating system according to an embodiment of this application. Current VC of the device is a first vendor country, for example, all cn. Specifically, as shown in FIG. 6A, oemvc_a in a sub-partition (for example, an oeminfo sub-partition) of the Common partition of the device is the first vendor country (all cn). In a process in which the device normally starts the operating system, the device loads the Common partition, the static partition (A), and a dynamic partition, and starts the operating system from the static partition (A). In a process of loading the static partition (A), an initialization (init) step is performed. In the initialization step, VC content in oemvc_a is read and loaded. For example, all cn is read from oemvc_a, and all cn is written into a global variable cmdline).

When VC of the device needs to be rewritten into a second vendor country, for example, cmcc cn, the device needs to write VC content in oemvc_b as cmcc cn, and the device starts from the static partition (B) when the device starts. The device performs the procedure shown in FIG. 13A-FIG. 13B to rewrite VC.

For S1300, S1310, S1321, S1320, S1321, S1322, S1323, S1324 and S1330, refer to S1400, S1410, S1421, S1420, S1421, S1422, S1423, S1424 and S1430.

After S1324, update apk clent performs S1330 to trigger a device restart (restart for the first time) (the third restart).

After S1330, the operating system (the second operating system) is started from the static partition (B). Refer to S540 and S541.

In a process of loading the static partition (B), the device performs the initialization (init) step. In the initialization step, the device performs S1340 to determine VC that need to be loaded currently. Specifically, it is determined that oemvc_a needs to be loaded or that oemvc_b needs to be loaded. Refer to S1440.

The device performs S1341 to load oemvc_b.

Then, the device performs S1342 to start the supervision of initialization (Cust_init), to determine whether factory settings need to be restored.

Currently, a merging operation has not been performed, and upgrading of the operating system is not completed. Therefore, the device does not need to restore factory settings. Therefore, the device may perform S1343 to continue to perform subsequent initialization and data loading operations, to complete loading of the static partition (B) and the dynamic partition (Super), so as to start the operating system from the static partition (B).

After the device starts from the static partition (B), the device performs S1350 to send a power-on broadcast.

In this case, if merging status information is "wait for merge (wait for merge)", the update apk clent performs S1351, and the update apk clent triggers the update engine to enter a merge procedure.

S1352: The update engine performs the merge procedure. Refer to S551.

After the merge is completed, the update engine performs S1355, and the update engine triggers a device restart (restart for the second time) (the first restart).

After the restart for the second time, the device enters the Recovery mode. In the Recovery mode, the device performs S1361 to restore factory settings.

After the device completes factory settings, the device performs S1362 to trigger a device restart (restart for the third time) (the second restart).

After the restart for the third time, the device sequentially loads the basic partition (Common), the static partition (B), and the dynamic partition (Super), and starts from the static partition (B).

After the restart for the third time, in a process of loading the static partition (B), the device performs the initialization (init) step. The device performs S1340 again to determine VC that needs to be loaded currently. The device performs S1441 to load oemvc_b.

Then, the device performs S1342 again to start the supervision of initialization (cust_init), to determine whether factory settings need to be restored. Refer to S1442.

Custom.bin does not exist in the current Userdata. Therefore, the device does not need to restore factory settings.

The device performs S1345 to create Custom.bin, and to write oemvc_b into Custom.bin.

Then, the device performs S1343 to continue to perform subsequent initialization and data loading operations, to complete loading of the static partition (B) and the dynamic partition (Super), so as to start from the static partition (B).

After the device starts from the static partition (B), the device performs S1350 to send a power-on broadcast. The update apk clent determines that the merge is completed and the operating system is upgraded.

Further, in some application scenarios, when the operating system does not perform customization processing on different VC, the operating system upgrade package does not include operating system upgrade data (does not include static partition upgrade data and dynamic partition upgrade data). Therefore, in a process of rewriting VC, the device does not need to perform a merging operation (S1452). Based on this, in another feasible solution, a merging operation may be skipped after the restart for the first time. After the restart for the first time, the device directly enters the recovery (Recovery) mode. In the Recovery mode, the device restores factory settings.

Figure 14A:
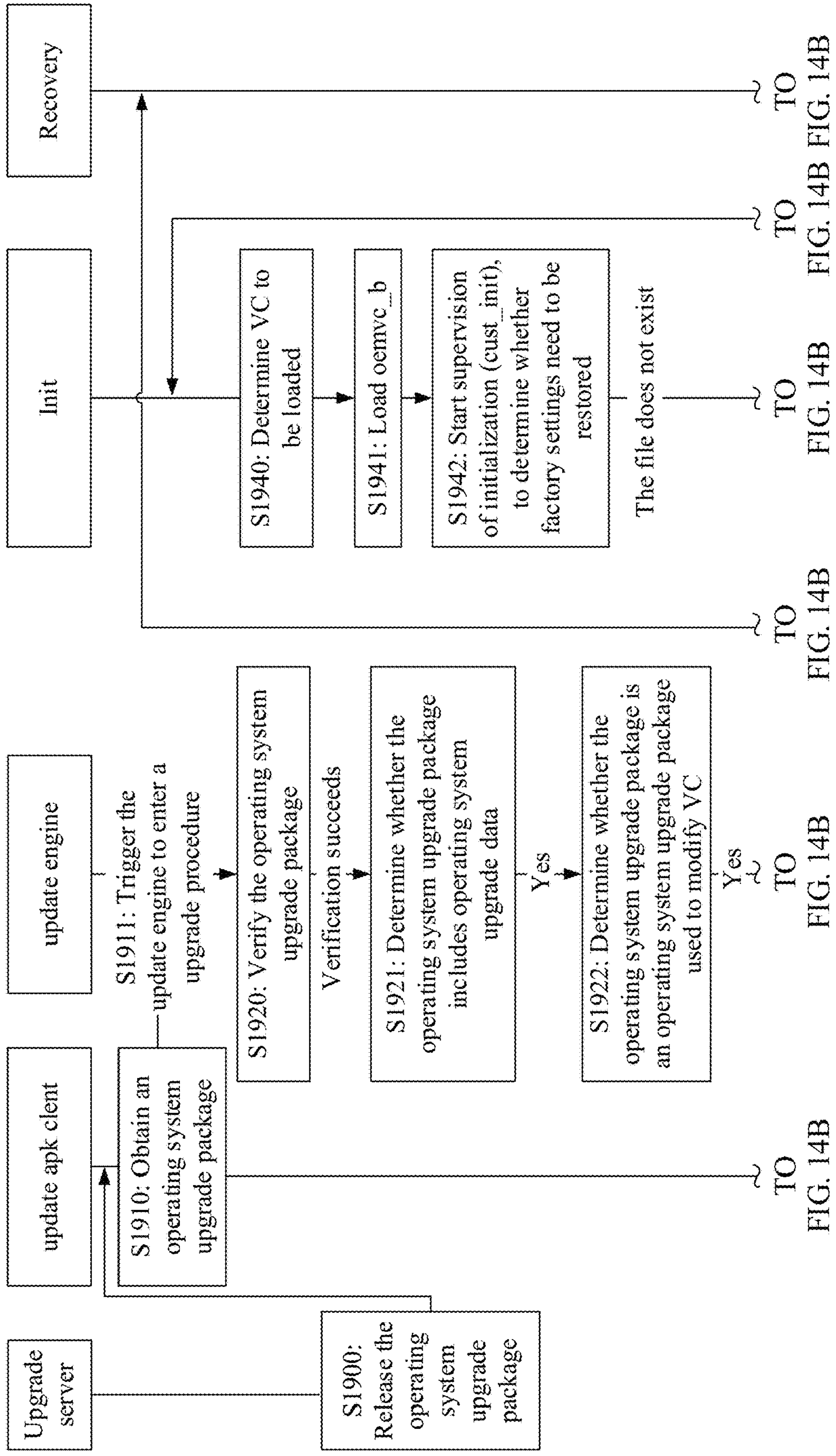
FIG. 14A-FIG. 14B are a flowchart of upgrading an operating system according to an embodiment of this application.
Figure 14B:
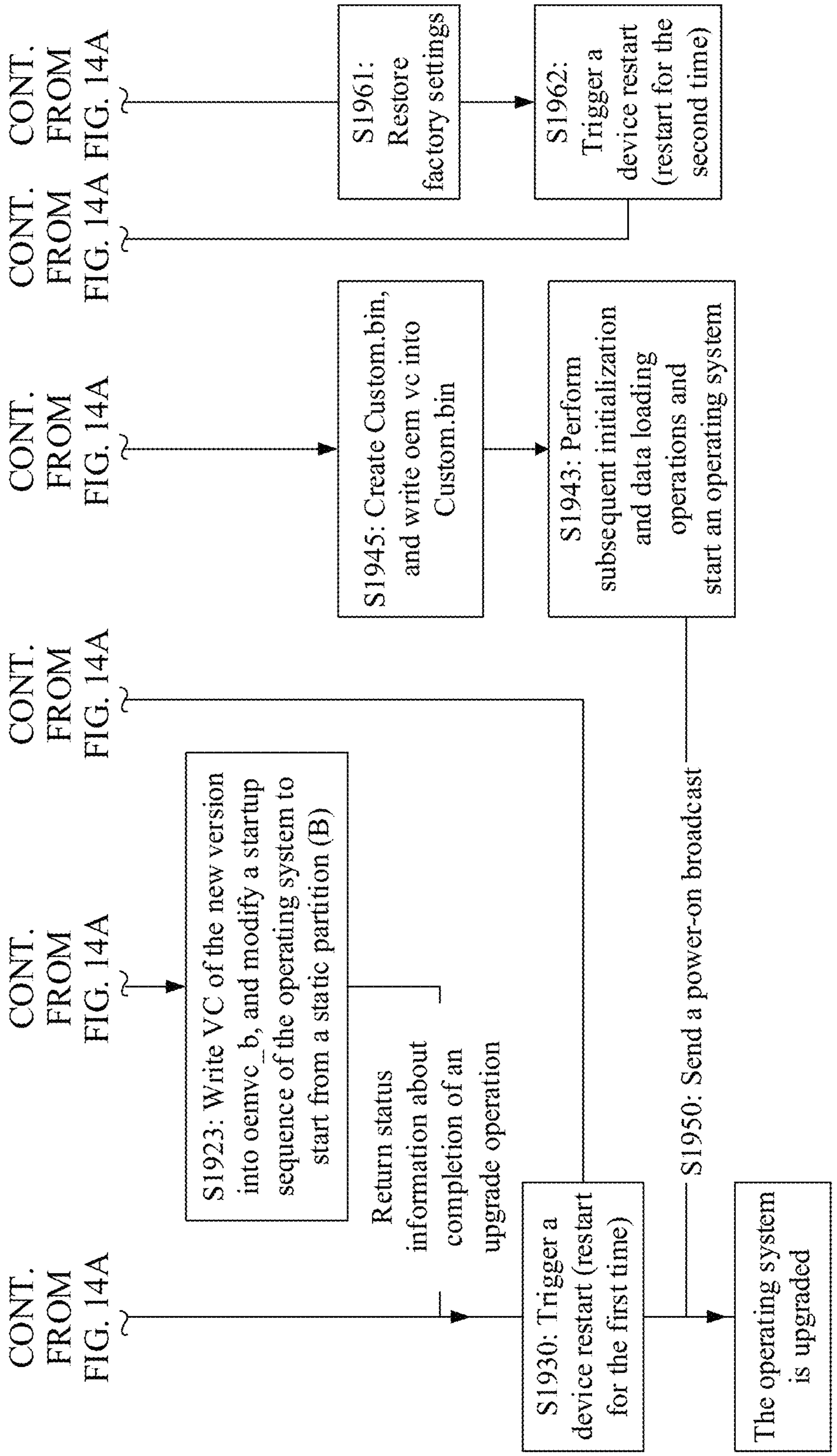

FIG. 14A-FIG. 14B are a flowchart of upgrading an operating system according to an embodiment of this application. Current VC of the device is a first vendor country, for example, all cn. Specifically, as shown in FIG. 6A, oemvc_a in a sub-partition (for example, an oeminfo sub-partition) of the Common partition of the device is the first vendor country (all cn). In a process in which the device normally starts the operating system, the device loads the Common partition, the static partition (A), and a dynamic partition, and starts the operating system from the static partition (A). In a process of loading the static partition (A), an initialization (init) step is performed. In the initialization step, VC content in oemvc_a is read and loaded. For example, all cn is read from oemvc_a, and all cn is written into a global variable cmdline).

When VC of the device needs to be rewritten into a second vendor country, for example, cmcc cn, the device needs to write VC content in oemvc_b as cmcc cn, and the device starts from the static partition (B) when the device starts. The device performs the procedure shown in FIG. 14A-FIG. 14B to rewrite VC.

S1900: The upgrade server pushes and releases an operating system upgrade package used to modify VC. Specifically, the operating system upgrade package does not include operating system upgrade data. For a format of VC data in the operating system upgrade package, refer to S1900.

The device sequentially loads the basic partition (Common), the static partition (A), and the dynamic partition (Super), and starts from the static partition (A). The update apk clent performs S1910 to obtain the operating system upgrade package. For a process of obtaining the operating system upgrade package, refer to S510.

The update apk clent performs S1911 to trigger the update engine to enter the upgrade process.

In the upgrade process, the update engine performs S1920 to verify the operating system upgrade package. Specifically, it is verified whether a digital signature of the operating system upgrade package is valid, to determine whether the operating system upgrade package is a valid upgrade package.

After the operating system upgrade package passes the verification, the update engine performs S1921 to determine whether the operating system upgrade package includes the operating system upgrade data.

When the operating system upgrade package does not include the operating system upgrade data, the update engine performs S1922 to determine whether the current operating system upgrade package is an operating system upgrade package used to modify VC.

If the current operating system upgrade package is an operating system upgrade package used to modify VC, the update engine performs S1923 to write VC of the latest version in the operating system upgrade package into oemvc_b, and to modify a startup sequence of the operating system to start from a static partition (B).

After the update engine completes the upgrade operation in S1923, the update engine performs S1924 to return status information of the upgrade operation to update apk clent.

In S1930, update apk clent triggers a device restart (restart for the first time) (the first restart). For example, the update apk clent prompts the user with a pop-up box, and the user chooses to restart immediately or later.

After the restart for the first time, the device enters the Recovery mode. In the Recovery mode, the device performs S1961 to restore factory settings.

After the device completes factory settings, the device performs S1962 to trigger a device restart (restart for the second time) (the second restart).

After the restart for the second time, the device sequentially loads the basic partition (Common), the static partition (B), and the dynamic partition (Super), and starts from the static partition (B).

After the restart for the second time, in a process of loading the static partition (B), the device performs the initialization (init) step. The device performs S1940 to determine VC that needs to be loaded currently. After the restart for the second time, the device starts from the static partition (B). Therefore, oemvc_b needs to be loaded currently. The device performs S1941 to load oemvc_b.

Then, the device performs S1942 to start the supervision of initialization (Cust_init), to determine whether factory settings need to be restored.

The device determines whether currently loaded oemvc_b matches a current configuration of the device (stored in Custom.bin of the Userdata). Because the device restores factory settings in S1961, Custom.bin stored in the Userdata is deleted during the process of restoring factory settings. Custom.bin does not exist in the current Userdata. Therefore, the device does not need to restore factory settings. The device performs S1945 to create Custom.bin, and to write oemvc_b into Custom.bin.

Then, the device performs S1943 to continue to perform subsequent initialization and data loading operations, to complete loading of the static partition (B) and the dynamic partition (Super), so as to start from the static partition (B).

After the device starts from the static partition (B), the device performs S1950 to send a power-on broadcast. The update apk clent determines that the merge is completed and the operating system is upgraded.

It may be understood that some or all of the steps or operations in the foregoing embodiment are merely examples. In this embodiment of this application, other operations or variations of various operations may also be performed. In addition, the steps may be performed in an order different than the order presented in the foregoing embodiment, and it may not be necessary to perform all the operations in the foregoing embodiment.

Further, generally, improvements on a technology can be clearly distinguished as improvements on hardware (for example, improvements on circuit structures such as a diode, a transistor, or a switch) or improvements on software (improvements on methods or processes). However, with development of technologies, many current improvements on methods or processes may be considered as direct improvements on a hardware circuit structure. Almost all designers obtain a corresponding hardware circuit structure by programming an improved method or process into a hardware circuit. Therefore, it cannot be said that the improvement of a method or a process cannot be realized by a hardware entity module. For example, a programmable logic device (Programmable Logic Device, PLD) (for example, a field programmable gate array (Field Programmable Gate Array, FPGA)) is an integrated circuit, and a logical function of the programmable logic device is determined by programming a component by an accessor. Designers program a digital device to be "integrated" on a PLD, and there is no need for a chip manufacturer to design and manufacture an application-specific integrated circuit chip. In addition, instead of manually manufacturing an integrated circuit chip, this programming is mostly implemented by using "logic compiler (logic compiler)" software, which is similar to the software compiler used in program development and writing. The original code to be compiled needs to be written in a specific programming language, which is referred to as a hardware description language (Hardware Description Language, HDL). There are many HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, VHDL (Very-High-Speed Integrated Circuit Hardware Description Language) and Verilog are most commonly used. It should also be clear to a person skilled in the art that a hardware circuit for implementing a logic method procedure can be easily obtained by simply programming the logic of the method procedure into an integrated circuit by using the foregoing several hardware description languages.

Therefore, the method procedure provided in this embodiment of this application may be implemented in a hardware manner. For example, a controller is used to control a touchscreen to implement the method procedure provided in this embodiment of this application.

The controller may be implemented in any suitable manner. For example, the controller may use a microprocessor or a processor and a computer-readable medium storing computer readable program code (for example, software or firmware) executable by the (micro)processor, a logic gate, a switch, an application specific integrated circuit (Application Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller may further be implemented as a part of control logic of the memory. A person skilled in the art also knows that, in addition to implementing a controller by using only computer-readable program code, a method step may be logically programmed, so that the controller implements a same function in a form of a logic gate, a switch, an application-specific integrated circuit, a programmable logic controller, an embedded microcontroller, or the like. Therefore, the controller may be considered as a hardware component, and an apparatus included in the controller for implementing various functions may also be considered as a structure in the hardware component. Alternatively, an apparatus for implementing various functions may be considered as a software module implementing a method or a structure in a hardware component.

Corresponding to the foregoing embodiment, this application further provides an electronic device. The electronic device includes a memory configured to store a computer program instruction and a processor configured to execute the program instruction. When the computer program instruction is executed by the processor, the electronic device is triggered to perform the method steps described in the embodiments of this application.

This application further provides a computer program product. The computer program product includes a computer program. When the computer program product runs on a computer, the computer is enabled to perform some or all steps provided in the embodiments of this application.

A person skilled in the art may clearly understand that the technology in the embodiments of the present invention may be implemented by using software and a required universal hardware platform. Based on such an understanding, the technical solutions in the embodiments of the present invention essentially or the part contributing to a conventional technology may be implemented in a form of a software product. The computer software product may be stored in a storage medium, such as a ROM/RAM, a magnetic disk, or an optical disc, and the computer software product may include several instructions for instructing a computer device (which may be a personal computer, a server, or a network device) to perform the methods described in the embodiments or some parts of the embodiments of the present invention.

For the same or similar parts in the embodiments in this specification, reference may be made to each other. In particular, for an apparatus embodiment and a terminal embodiment, because the apparatus embodiment and the terminal embodiment are basically similar to a method embodiment, descriptions are relatively simple. For related parts, refer to descriptions in the method embodiment.

What is claimed is:

1. A method for configuring an operating system vendor country, applied to an electronic device, wherein the electronic device comprises a processor and a memory, and the memory comprises a basic partition, a first static partition, a second static partition, a dynamic partition, and a user data partition; the basic partition stores a first vendor country file and a second vendor country file; current vendor country content of the first vendor country file is a first vendor country; and the method comprises:

starting an operating system from the first static partition by loading data from the basic partition, the first static partition, and the dynamic partition, wherein starting the operating system from the first static partition comprises a first initialization step, and the first initialization step comprises loading the first vendor country file;

after starting the operating system from the first static partition, obtaining an operating system upgrade package, wherein the operating system upgrade package comprises a third vendor country file, and vendor country content of the third vendor country file is a second vendor country;

extracting the third vendor country file;

writing the vendor country content of the third vendor country file into the second vendor country file;

triggering a first restart of the electronic device;

entering, by the electronic device, a recovery mode after the first restart;

restoring factory settings of the electronic device in the recovery mode, the restoring factory settings comprising: deleting a vendor country configuration file stored in the user data partition;

triggering a second restart of the electronic device; and starting the operating system from the second static partition after the second restart, wherein starting the operating system from the second static partition comprises a second initialization step, the second initialization step comprises loading the second vendor country file, and loading the second vendor country file comprises: creating the vendor country configuration file in the user data partition, and writing vendor country content of the second vendor country file into the vendor country configuration file.

2. The method according to claim 1, wherein after obtaining the operating system upgrade package, the method further comprises:

determining whether the operating system upgrade package is used to rewrite a vendor country, and when the operating system upgrade package is used to rewrite the vendor country, performing the step of extracting the third vendor country file; and modifying a startup sequence of the electronic device to start from the second static partition.

3. The method according to claim 2, wherein the determining whether the operating system upgrade package is used to rewrite the vendor country comprises: determining whether the third vendor country file exists in the operating system upgrade package.

4. The method according to claim 2, wherein a first operating system and a second operating system are operating systems corresponding to different vendor countries, the first operating system is corresponding to the first vendor country, and the second operating system is corresponding to the second vendor country; the operating system upgrade package further comprises dynamic partition upgrade data, and the dynamic partition upgrade data is used to update dynamic partition data of the first operating system to dynamic partition data of the second operating system; and before obtaining the operating system upgrade package, the electronic device loads data from the basic partition, the first static partition, and the dynamic partition after being started, so as to start the first operating system from the first static partition; and the method further comprises:

creating a virtual dynamic partition in the user data partition, and writing the dynamic partition upgrade data into the virtual dynamic partition;

after the writing the vendor country content of the third vendor country file into the second vendor country file, and before triggering the first restart of the electronic device, the method further comprises:

triggering a third restart of the electronic device; and a process in which the electronic device starts the operating system from the second static partition after the third restart comprises: loading data from the basic partition, the second static partition, the dynamic partition, and the virtual dynamic partition to start the second operating system; and after the electronic device starts the second operating system after the third restart, merging data in the virtual dynamic partition to the dynamic partition.

5. The method according to claim 4, wherein the operating system upgrade package further comprises static partition upgrade data, and the static partition upgrade data is used to update static partition data of the first operating system to static partition data of the second operating system; and before modifying the startup sequence of the electronic device to start from the second static partition, the method further comprises: updating data in the second static partition based on the static partition upgrade data.

6. The method according to claim 5, wherein the method further comprises:

after the electronic device starts the second operating system after the third restart, synchronizing data in the second static partition to the first static partition.

7. The method according to claim 4, wherein after the merging the data in the virtual dynamic partition to the dynamic partition, the first restart is triggered.

8. The method according to claim 4, wherein in a process of writing the vendor country content of the third vendor country file into the second vendor country file, the electronic device starts the operating system from the second static partition after the third restart, wherein it is determined, in a third initialization step after the third restart, whether factory settings need to be restored, and when it is determined that factory settings do not need to be restored, a subsequent operating system startup operation is continued.

9. The method according to claim 8, wherein after obtaining the operating system upgrade package, the method further comprises: determining whether the operating system upgrade package is used to rewrite a vendor country, and when the operating system upgrade package is used to rewrite the vendor country, marking a vendor country rewrite flag bit as a first value;

the determining, in the third initialization step after the third restart, whether factory settings need to be restored comprises: when a merging status is "wait for merge", and the vendor country rewrite flag bit is the first value, determining that factory settings of the electronic device do not need to be restored; and after the merging the data in the virtual dynamic partition to the dynamic partition, marking the vendor country rewrite flag bit as a second value.

10. The method according to claim 4, wherein after the merging the data in the virtual dynamic partition to the dynamic partition, and before triggering the first restart of the electronic device, the method further comprises:

triggering a fourth restart of the electronic device, and starting, by the electronic device, the operating system from the second static partition after the fourth restart, wherein it is determined, in a fourth initialization step after the fourth restart, whether factory settings need to be restored, and when it is determined that factory settings need to be restored, an operating system startup operation is interrupted, and the first restart is triggered.

11. The method according to claim 10, wherein the determining, in the fourth initialization step after the fourth restart, whether factory settings need to be restored comprises:

determining whether the vendor country configuration file stored in the user data partition matches the second vendor country file; and when the two do not match, determining that factory settings of the electronic device need to be restored.

12. The method according to claim 10, wherein after obtaining the operating system upgrade package, the method further comprises: determining whether the operating system upgrade package is used to rewrite a vendor country, and when the operating system upgrade package is used to rewrite the vendor country, marking a vendor country rewrite flag bit as a first value;

after the merging the data in the virtual dynamic partition to the dynamic partition, marking the vendor country rewrite flag bit as a second value; and the determining, in the fourth initialization step after the fourth restart, whether factory settings need to be restored comprises: when a merging status is "wait for merge", or when the vendor country rewrite flag bit is the second value, determining whether the vendor country configuration file stored in the user data partition matches the second vendor country file; and when the two match, determining that factory settings of the electronic device do not need to be restored; or when the two do not match, determining that factory settings of the electronic device need to be restored.

13. The method according to claim 1, wherein the second initialization step further comprises:

determining whether the vendor country configuration file exists in the user data partition, and when the vendor country configuration file does not exist in the user data partition, creating the vendor country configuration file in the user data partition, and writing the vendor country content of the second vendor country file into the vendor country configuration file.

14. The method according to claim 1, wherein the operating system comprises an upgrade package obtaining tool and an upgrade engine, a first operating system and a second operating system are operating systems corresponding to different vendor countries, the first operating system is corresponding to the first vendor country, and the second operating system is corresponding to the second vendor country; before obtaining the operating system upgrade package, the electronic device loads data from the basic partition, the first static partition, and the dynamic partition after being started, so as to start the first operating system from the first static partition; and after the first operating system is started, the method further comprises:

obtaining, by the upgrade package obtaining tool, the operating system upgrade package, wherein the operating system upgrade package comprises the third vendor country file, static partition upgrade data, and dynamic partition upgrade data;

triggering, by the upgrade package obtaining tool, the upgrade engine to enter an upgrade procedure;

updating, by the upgrade engine, the data in the second static partition based on the static partition upgrade data;

creating, by the upgrade engine, a virtual dynamic partition in the user data partition, writing the dynamic partition upgrade data to the virtual dynamic partition, and marking a merging status as "wait for merge";

modifying, by the upgrade engine, a startup sequence of the electronic device to start from the second static partition;

determining, by the upgrade engine, whether the operating system upgrade package is used to rewrite a vendor country;

when the operating system upgrade package is used to rewrite the vendor country, writing, by the upgrade engine, the vendor country content of the third vendor country file into the second vendor country file, and marking a vendor country rewrite flag bit as a first value;

returning, by the upgrade engine, status information of upgrade operation completion to the upgrade package obtaining tool;

triggering, by the upgrade package obtaining tool, a third restart of the electronic device, wherein after the third restart, the electronic device loads data from the basic partition, the second static partition, the dynamic partition, and the virtual dynamic partition to start the second operating system;

in a fifth initialization step of starting the second operating system after the third restart: after the second vendor country file is loaded, when the merging status is "wait for merge", and the vendor country rewrite flag bit is the first value, it is determined that factory settings of the electronic device do not need to be restored, and an operating system startup operation is continued;

after the second operating system is started after the third restart, triggering, by the upgrade package obtaining tool, the upgrade engine to enter a merging procedure;

in the merging procedure, merging, by the upgrade engine, data in the virtual dynamic partition to the dynamic partition, and marking the merging status as "wait for merge";

synchronizing the data in the second static partition to the first static partition; and marking the vendor country rewrite flag bit as a second value;

triggering, by the upgrade engine, a fourth restart of the electronic device, wherein after the fourth restart, the electronic device loads the data from the basic partition, the second static partition, and the dynamic partition to start the second operating system;

in a sixth initialization step in which the second operating system is started after the fourth restart: after the second vendor country file is loaded, when the merging status is "wait for merge", or when the vendor country rewrite flag bit is the second value, it is determined whether the vendor country configuration file stored in the user data partition matches the second vendor country file; and when the two do not match, it is determined that factory settings of the electronic device need to be restored, the operating system startup operation is interrupted, and the first restart is triggered; and entering, by the electronic device, a recovery mode after the first restart; restoring factory settings of the electronic device in the recovery mode; triggering the second restart, and starting, by the electronic device, the operating system from the second static partition after the second restart, and in a seventh initialization step after the second restart: creating the vendor country configuration file in the user data partition, and writing the vendor country content of the second vendor country file into the vendor country configuration file.

15. An electronic device, wherein the electronic device comprises a processor and a memory, the memory comprises a basic partition, a first static partition, a second static partition, a dynamic partition, and a user data partition; the basic partition stores a first vendor country file and a second vendor country file; current vendor country content of the first vendor country file is a first vendor country; and the memory stores software code that, when executed by the processor, causes the electronic device to perform operations comprising:

starting an operating system from the first static partition by loading data from the basic partition, the first static partition, and the dynamic partition, wherein starting the operating system from the first static partition comprises a first initialization step, and the first initialization step comprises loading the first vendor country file;

after starting the operating system from the first static partition, obtaining an operating system upgrade package, wherein the operating system upgrade package comprises a third vendor country file, and vendor country content of the third vendor country file is a second vendor country;

extracting the third vendor country file;

writing the vendor country content of the third vendor country file into the second vendor country file;

triggering a first restart of the electronic device;

entering, by the electronic device, a recovery mode after the first restart;

restoring factory settings of the electronic device in the recovery mode, comprising: deleting a vendor country configuration file stored in the user data partition;

triggering a second restart of the electronic device; and starting the operating system from the second static partition after the second restart, wherein starting the operating system from the second static partition comprises a second initialization step, the second initialization step comprises loading the second vendor country file, and loading the second vendor country file comprises: creating the vendor country configuration file in the user data partition, and writing vendor country content of the second vendor country file into the vendor country configuration file.

16. The electronic device according to claim 15, wherein after obtaining the operating system upgrade package, the operations further comprise:

determining whether the operating system upgrade package is used to rewrite a vendor country, and when the operating system upgrade package is used to rewrite the vendor country, performing the step of extracting the third vendor country file; and modifying a startup sequence of the electronic device to start from the second static partition.

17. The electronic device according to claim 16, wherein the determining whether the operating system upgrade package is used to rewrite the vendor country comprises: determining whether the third vendor country file exists in the operating system upgrade package.

18. The electronic device according to claim 15, wherein the second initialization step further comprises:

determining whether the vendor country configuration file exists in the user data partition, and when the vendor country configuration file does not exist in the user data partition, creating the vendor country configuration file in the user data partition, and writing the vendor country content of the second vendor country file into the vendor country configuration file.

19. The electronic device according to claim 16, wherein a first operating system and a second operating system are operating systems corresponding to different vendor countries, the first operating system is corresponding to the first vendor country, and the second operating system is corresponding to the second vendor country; the operating system upgrade package further comprises dynamic partition upgrade data, and the dynamic partition upgrade data is used to update dynamic partition data of the first operating system to dynamic partition data of the second operating system; and before obtaining the operating system upgrade package, the electronic device loads data from the basic partition, the first static partition, and the dynamic partition after being started, so as to start the first operating system from the first static partition; and the operations further comprise:

creating a virtual dynamic partition in the user data partition, and writing the dynamic partition upgrade data into the virtual dynamic partition;

after the writing the vendor country content of the third vendor country file into the second vendor country file, and before triggering the first restart of the electronic device, the operations further comprise:

triggering a third restart of the electronic device; and a process in which the electronic device starts the operating system from the second static partition after the third restart comprises: loading data from the basic partition, the second static partition, the dynamic partition, and the virtual dynamic partition to start the second operating system; and after the electronic device starts the second operating system after the third restart, merging data in the virtual dynamic partition to the dynamic partition.

20. A non-transitory computer-readable storage medium, wherein the non-transitory computer-readable storage medium stores a computer program, and when the computer program is run on a computer, the computer is enabled to perform the following operations:

obtaining an operating system upgrade package, wherein a basic partition of the computer stores a first vendor country file and a second vendor country file, the operating system upgrade package comprises a third vendor country file, and vendor country content of the third vendor country file is a second vendor country;

extracting the third vendor country file;

writing the vendor country content of the third vendor country file into the second vendor country file;

triggering a first restart;

entering a recovery mode after the first restart;

restoring factory settings in the recovery mode, comprising: deleting a vendor country configuration file stored in a user data partition; and triggering a second restart, wherein the operating system is started from a second static partition after the second restart, and an initialization step after the second restart at least comprises: creating the vendor country configuration file in the user data partition, and writing vendor country content of the second vendor country file into the vendor country configuration file.

* * * * *